US012482384B2

(12) United States Patent
Otose

(10) Patent No.: US 12,482,384 B2
(45) Date of Patent: Nov. 25, 2025

(54) DISPLAY DEVICE AND METHOD FOR INSPECTING DISPLAY DEVICE

(71) Applicant: Shanghai Tianma Micro-Electronics Co., Ltd., Shanghai (CN)

(72) Inventor: Tomohiko Otose, Kanagawa (JP)

(73) Assignee: Shanghai Tianma Micro-Electronics Co., Ltd., Shanghai (CN)

(*) Notice: Subject to any disclaimer, the term of this patent is extended or adjusted under 35 U.S.C. 154(b) by 0 days.

(21) Appl. No.: 18/130,158

(22) Filed: Apr. 3, 2023

(65) Prior Publication Data

US 2023/0316967 A1 Oct. 5, 2023

(30) Foreign Application Priority Data

Apr. 4, 2022 (JP) ................................ 2022-062684

(51) Int. Cl.
*G09G 3/00* (2006.01)
*G09G 3/36* (2006.01)

(52) U.S. Cl.
CPC ........... *G09G 3/006* (2013.01); *G09G 3/3648* (2013.01); *G09G 2310/08* (2013.01); *G09G 2330/12* (2013.01)

(58) Field of Classification Search
CPC .. G09G 3/006; G09G 3/3648; G09G 2310/08; G09G 2330/12
See application file for complete search history.

(56) References Cited

U.S. PATENT DOCUMENTS

| | | | | |
|---|---|---|---|---|
| 5,309,108 A | 5/1994 | Maeda et al. | | |
| 2006/0226866 A1 | 10/2006 | Ando | | |
| 2007/0024560 A1* | 2/2007 | Kim | G09G 3/3655 | 345/94 |
| 2011/0148825 A1* | 6/2011 | Ueno | G09G 3/3677 | 345/204 |
| 2013/0307557 A1* | 11/2013 | Lee | G09G 3/3233 | 324/537 |
| 2014/0204199 A1 | 7/2014 | Yamada | | |
| 2017/0278441 A1* | 9/2017 | Ooki | G09G 3/3648 | |
| 2019/0279585 A1 | 9/2019 | Suzuki et al. | | |
| 2019/0285691 A1* | 9/2019 | Ryu | G09G 3/006 | |
| 2020/0184904 A1* | 6/2020 | Jung | G02B 27/017 | |
| 2021/0248939 A1* | 8/2021 | Ahn | G09G 3/2092 | |
| 2022/0046201 A1* | 2/2022 | Asakura | H04N 25/79 | |

FOREIGN PATENT DOCUMENTS

| | | |
|---|---|---|
| JP | 2019-113710 A | 7/2019 |
| WO | 2018/079636 A1 | 5/2018 |

* cited by examiner

*Primary Examiner* — Krishna P Neupane
(74) *Attorney, Agent, or Firm* — Sughrue Mion, PLLC

(57) ABSTRACT

In a display device and a method for inspecting the display device, precharge circuits are arranged on both sides of gate lines. Precharge circuits are arranged on both sides of data lines. A common electrode inspection circuit is connected to a common electrode. An inspection data processing circuit is arranged at one end of the gate lines. An inspection data processing circuit is arranged at one end of the data lines. In a first period, a first voltage is supplied to some of the gate lines, the data lines, and the common electrode. In a second period, a second voltage is supplied to some of the gate lines, the data lines, and the common electrode. The inspection data processing circuits acquire the voltage levels of the gate lines and the data lines based on the supply of the second voltage.

20 Claims, 37 Drawing Sheets

DISPLAY DEVICE AND METHOD FOR INSPECTING DISPLAY DEVICE

CROSS-REFERENCE TO RELATED APPLICATIONS

This application claims the benefit of Japanese Patent Application No. 2022-062684, filed on Apr. 4, 2022, the entire disclosure of which is incorporated by reference herein.

FIELD OF THE INVENTION

This disclosure relates to a display device and a method for inspecting the display device.

BACKGROUND OF THE INVENTION

Liquid crystal displays using thin film transistors are applicable to in-vehicle display devices. A certain type of in-vehicle display device requires a function to detect a line defect that is an abnormality in wiring. A circuit to achieve this functionality is prone to problems such as increasing the size of the device and increasing the cost of manufacturing and inspecting.

International Publication No. WO2018/079636 discloses a failure inspection circuit connected to source lines and gate lines. FIG. 29 illustrates a circuit configuration of an active matrix substrate disclosed in International Publication No. WO2018/079636. The active matrix substrate A1 in FIG. 29 has a failure inspection circuit A100. The failure inspection circuit A100 includes determination circuits A105 and A114 and expected value comparison circuits A106 and A115.

The determination circuit A105 is input with a monitor output signal from a source line A11 via a monitor output signal line A104. The voltage level of the monitor output signal detected by the determination circuit A105 is compared with an expected value in the expected value comparison circuit A106. The determination circuit A114 is input with a monitor output signal from a gate line A12 via a monitor output signal line A112. The voltage level of the monitor output signal detected by the determination circuit A114 is compared with an expected value in the expected value comparison circuit A115.

Unexamined Japanese Patent Application Publication No. 2019-113710 discloses an abnormality detection circuit that detects an abnormality in a gate signal that is a scanning signal. FIG. 30 illustrates the configuration of a liquid crystal display device disclosed in Unexamined Japanese Patent Application Publication No. 2019-113710. In the liquid crystal display device B10 in FIG. 30, an abnormality detection circuit unit including a scanning signal abnormality detection circuit B400 and an abnormality determination circuit B800 is provided outside the liquid crystal display unit B100. The scanning signal abnormality detection circuit B400 shifts a start signal STV when the gate signals GLs are supplied sequentially. The shifted pulse is sent to the abnormality determination circuit B800. The abnormality determination circuit B800 latches the shifted pulse. The presence or absence of an abnormality is determined based on the latched data output.

FIG. 31 illustrates a circuit example of an abnormality determination circuit disclosed in Unexamined Japanese Patent Application Publication No. 2019-113710. In the abnormality determination circuit B800 illustrated in FIG. 31, the comparator B810 compares the output value of the scanning signal abnormality detection circuit B400 with a predetermined reference voltage value Vref.

U.S. Patent Application Publication No. 2006/0226866 discloses a test circuit for detecting a short-circuit in a gate line and a data line. FIG. 32 illustrates the configuration of a liquid crystal display device disclosed in U.S. Patent Application Publication No. 2006/0226866. In the liquid crystal display device C1A in FIG. 32, a gate line test circuit C10A and a data line test circuit C20A are provided on the sides of a gate line drive circuit C2A and a data line drive circuit C3A, respectively, and are connected to the gate lines Gm and the data lines Dn, respectively, in order to detect a short circuit in the gate lines Gm and the data lines Dn.

FIG. 33 is a schematic diagram of a data line test circuit disclosed in U.S. Patent Application Publication No. 2006/0226866. FIG. 34 is a circuit diagram illustrating an equivalent circuit of the data line test circuit C20A in FIG. 33. The data line potential Vd in FIG. 34 is determined by the resistance partial voltage of the power supply potential VDD based on the short circuit resistance Rs. The detector logic circuit C21 outputs the presence or absence of a short circuit in the data line Dn in accordance with the input data line potential Vd. FIG. 35 is a circuit diagram illustrating a detector logic circuit C21 including an inverter circuit C22*n*.

U.S. Patent Application Publication No. 2014/0204199 discloses a wiring inspecting apparatus for locating a short circuit. FIG. 36 illustrates the configuration of a wiring inspecting apparatus disclosed in U.S. Patent Application Publication No. 2014/0204199. The wiring inspecting apparatus D1 in FIG. 36 includes an image capturing means D6 and an image processing means D7. The image capturing means D6 captures an infrared image of a substrate member D2. The image data of the infrared image is provided to the image processing means D7. The image processing means D7 generates the infrared image and a binary image and locates a short-circuit position from the binary image.

U.S. Pat. No. 5,309,108 discloses an inspection apparatus for a thin film transistor liquid crystal substrate. FIG. 37 illustrates the configuration of an inspection apparatus disclosed in U.S. Pat. No. 5,309,108. In FIG. 37, probes E36*a* and E36*b* are brought into contact with the wiring pattern of the substrate E30. The potential difference between the scan line and the signal line is detected as an infrared image by an infrared image detector E5. The difference image detection circuit E55 and the coordinate detection circuit E56 locate a short circuit defect by image processing.

In the failure inspection circuit described in International Publication No. WO2018/079636, a first monitor output signal Gout at one gate line selected from a plurality of gate lines is input to a first determination circuit, and a second monitor signal Sout at one source line selected from a plurality of source lines is input to a second determination circuit. In this configuration, connections of the wiring and circuits become complex, increasing the size of the circuit. Further, when a comparator is used as an analog circuit for an expected value comparison circuit, the size of the circuit increases. Furthermore, it becomes difficult to set expected values when the properties of a large number of thin film transistors differ. Thus, the technique described in International Publication No. WO2018/079636 is difficult to perform a stable inspection using a small circuit.

The abnormality determination circuit described in Unexamined Japanese Patent Application Publication No. 2019-113710, uses a comparator as an analog circuit, which increases the size of the circuit. In addition, it becomes difficult to set a reference voltage value when the properties of a large number of thin film transistors differ. Thus, the technique described in Unexamined Japanese Patent Application Publication No. 2019-113710 is difficult to perform a stable inspection using a small circuit. The increase in circuit size increases the area in the periphery of the display device, known as the "picture frame." In addition, the cost of manufacturing and inspection is likely to increase in order to achieve stable inspection.

In the test circuit described in U.S. Patent Application Publication No. 2006/0226866, the power supply potential and the ground potential are connected by way of series resistors. These series resistors generate a through current. The generation of a through current increases power consumption of the device. Providing a configuration for suppressing power consumption increases an inspection cost.

The apparatuses described in U.S. Patent Application Publication No. 2014/0204199 and U.S. Pat. No. 5,309,108 require special image processing. This increases the size of the apparatuses and increases the cost of manufacturing and inspection. In addition, while the apparatuses can locate a short circuit, they cannot inspect a line break, making them difficult to perform a variety of inspections.

SUMMARY OF THE INVENTION

The display device according to the present disclosure includes:

- a pixel section;
- wiring and an electrode that are connected to the pixel section; and
- an inspection circuit configured to inspect an abnormality in the wiring,
- wherein the inspection circuit
  - supplies a first voltage to one or both of the wiring and the electrode in a first period,
  - supplies a second voltage to one of the wiring and the electrode in a second period following the first period, and
  - is configured to detect an occurrence of an abnormality in accordance with a voltage level of the wiring based on the supply of the second voltage.

A method for inspecting a display device according to the present disclosure includes:

- supplying, by an inspection circuit for wiring and an electrode that are connected to a pixel section of the display device, a first voltage to one or both of the wiring and the electrode in a first period;
- supplying, by the inspection circuit, a second voltage to one of the wiring and the electrode in a second period following the first period; and
- detecting, by the inspection circuit, an occurrence of an abnormality in accordance with a voltage level of the wiring based on the supply of the second voltage.

It is to be understood that both the foregoing general description and the following detailed description are exemplary and explanatory and are not restrictive of this disclosure.

BRIEF DESCRIPTION OF DRAWINGS

A more complete understanding of this application can be acquired when the following detailed description is considered in conjunction with the following drawings, in which.

DETAILED DESCRIPTION OF THE INVENTION

The following describes a display device and a method of inspecting the display device according to the embodiment with reference to drawings.

Figure 1:
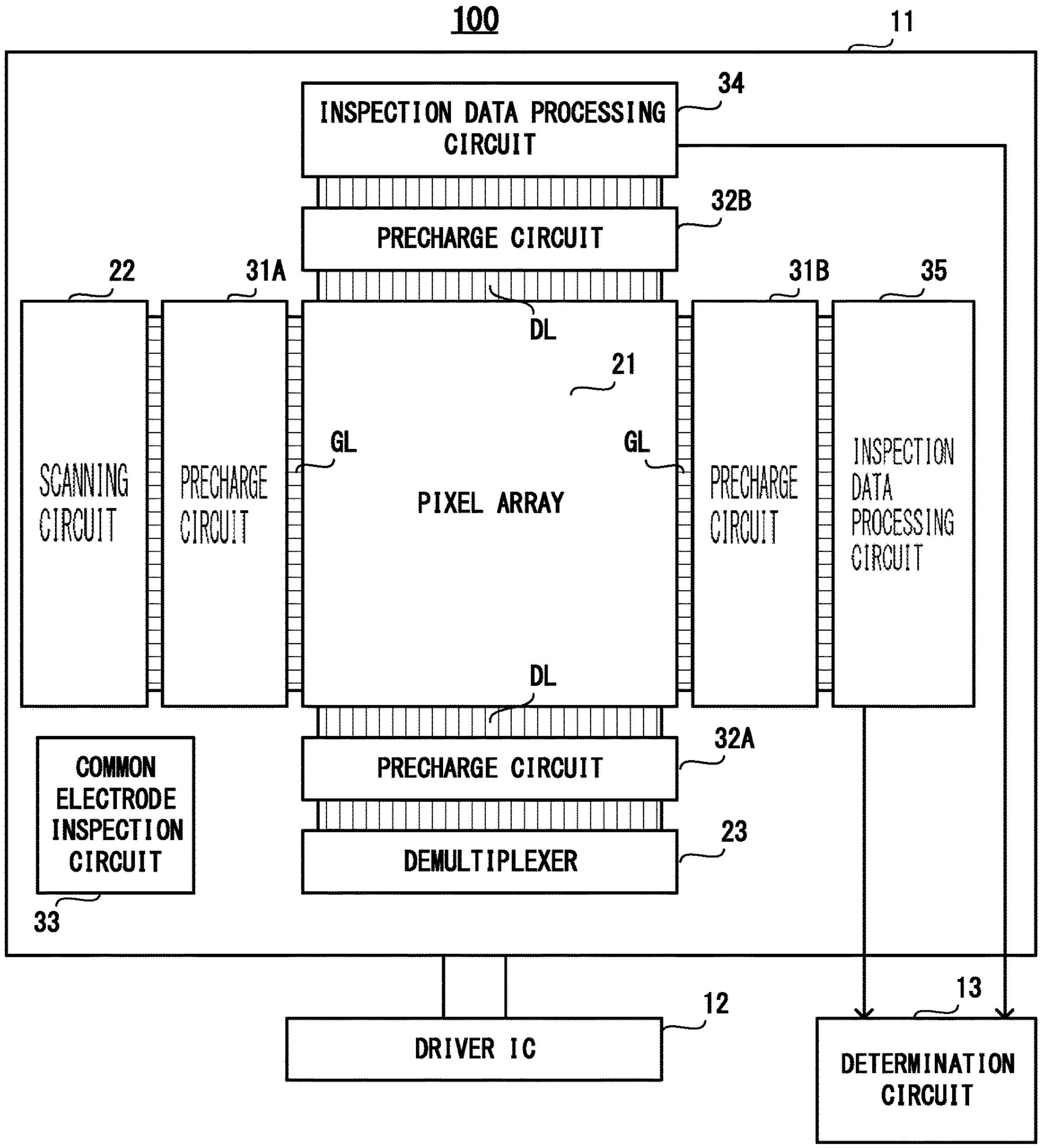
FIG. 1 is a schematic configuration diagram of a display device according to the present disclosure.

FIG. 1 illustrates a schematic configuration of a display device 100. The display device 100 includes a substrate 11, a driver IC 12, and a determination circuit 13. The substrate 11 may be any thin film transistor (TFT) substrate or the like. The driver IC 12 is electrically connected with wiring arranged on the substrate 11. The driver IC 12 supplies a drive signal of the display device 100 to each element on the substrate 11. The driver IC 12 may be a semiconductor device, a discrete circuit, or a processor controlled by software. The driver IC 12 may be mounted on the substrate 11 using Chip-On-Glass (COG) technology. Alternatively, the driver IC 12 may be externally mountable on the substrate 11. The determination circuit 13 determines the presence or absence of an abnormality using inspection data that is output from the substrate 11.

A plurality of circuit elements is mounted on the substrate 11. For example, a pixel array 21, a scanning circuit 22, and a demultiplexer 23 that are mounted on the substrate 11 may be any circuit configurations that can be mounted on a typical TFT substrate. The pixel array 21 is a pixel section including a plurality of pixel circuits. Each pixel circuit in the pixel array 21 includes a transistor for a switch and a liquid crystal element. The pixel array 21 is connected with the scanning circuit 22 through a plurality of gate lines GL that serves as scan lines. The pixel array 21 is connected with the demultiplexer 23 through a plurality of data lines DL that serves as video signal lines. The gate lines GL and the data lines DL are wiring connected to the pixel array 21. The plurality of pixel circuits included in the pixel array 21 is connected to a common electrode CB as a counter electrode. The common electrode CB is an electrode connected to the pixel array 21.

The precharge circuits 31A and 31B mounted on the substrate 11 are arranged on both sides of the gate lines GL. The pixel array 21 is connected to the gate lines GL between the precharge circuit 31A and the precharge circuit 31B. The precharge circuit 31A is connected to one side of the gate lines GL connected to the pixel array 21 and the precharge circuit 31B is connected to the other side of the gate lines GL connected to the pixel array 21. The outputs of the precharge circuits 31A and 31B are connected to each other via the gate lines GL connected to the pixel array 21. The precharge circuits 31A and 31B can supply an inspection voltage to the gate lines GL included in the wiring connected to the pixel array 21. The precharge circuit 31A is connected to the gate lines GL on the same side as the scanning circuit 22 as viewed from the pixel array 21. The precharge circuit 31B is connected to the gate lines GL on the opposite side of the scanning circuit 22 as viewed from the pixel array 21. The same side as the scanning circuit 22 is the side on which a normal signal is input to the gate lines GL.

The precharge circuits 32A and 32B mounted on the substrate 11 are arranged on both sides of the data lines DL. The pixel array 21 is connected to the data lines DL between the precharge circuit 32A and the precharge circuit 32B. The precharge circuit 32A is connected to one side of the data lines DL connected to the pixel array 21 and the precharge circuit 32B is connected to the other side of the data lines DL connected to the pixel array 21. The outputs of the precharge circuits 32A and 32B are connected to each other via the data lines DL connected to the pixel array 21. The precharge circuits 32A and 32B can supply an inspection voltage to the data lines DL included in the wiring connected to the pixel array 21. The precharge circuit 32A is connected to the data lines DL on the same side as the demultiplexer 23 as viewed from the pixel array 21. The precharge circuit 32B is connected to the data lines DL on the opposite side of the demultiplexer 23 as viewed from the pixel array 21. The same side as the demultiplexer 23 is the side on which a normal signal is input to the data lines DL.

The precharge circuits 31A, 31B, 32A, and 32B each include a voltage generator and a switch circuit. The voltage generators included in the precharge circuits 31A and 31B generate a low level or high level voltage that can be supplied to the gate lines GL. The switch circuits included in the precharge circuits 31A and 31B switch off or on the connection between the voltage generators included in the precharge circuits 31A and 31B and the gate lines GL. The voltage generators included in the precharge circuits 32A and 32B generate a low level or high level voltage that can be supplied to the data lines DL. The switch circuits included in the precharge circuits 32A and 32B switch off or on the connection between the voltage generators included in the precharge circuits 32A and 32B and the data lines DL. The wiring including the gate lines GL and the data lines DL has an input end on the side to which a normal signal is input. The wiring including the gate lines GL and the data lines DL has an output end on the opposite side of the input end. The precharge circuit 31A is connected to the input end side of the gate lines GL. The precharge circuit 31B is connected to the output end side of the gate lines GL. The precharge circuit 32A is connected to the input end side of the data lines DL. The precharge circuit 32B is connected to the output end side of the data lines DL.

The switch circuit is configured using a switch element such as a metal oxide semiconductor field-effect transistor (MOSFET). When the switch circuit is on, the switch element is in a conductive state. When the switch circuit is off, the switch element is in a non-conducting state. The MOS transistor as a switch element may be a P-channel type MOS (PMOS) transistor or an N-channel type MOS (NMOS) transistor. The switch circuit may be a complementary MOS (CMOS) transmission gate using a combination of PMOS and NMOS transistors. The type of switch circuit may be selectable in accordance with the thin film transistor formed on the substrate 11.

A common electrode inspection circuit 33 mounted on the substrate 11 has a plurality of outputs connected to predetermined positions of the common electrode CB. The plurality of outputs of the common electrode inspection circuit 33 is connected to each other through the common electrode CB connected to the pixel array 21. The common electrode inspection circuit 33 can supply an inspection voltage to the common electrode CB included in the electrodes connected to the pixel array 21. The common electrode inspection circuit 33 includes a voltage generator and a switch circuit. The voltage generator included in the common electrode inspection circuit 33 generates a low level or high level voltage that can be supplied to the common electrode CB. The switch circuit included in the common electrode inspection circuit 33 switches off or on the connection between the voltage generator included in the common electrode inspection circuit 33 and the common electrode CB.

The inspection data processing circuit 35 mounted on the substrate 11 is arranged at one end of the gate lines GL. The inspection data processing circuit 35 is connected to the gate lines GL at the output end side opposite the scanning circuit 22 and the precharge circuit 31A as viewed from the pixel array 21. The inspection data processing circuit 34 mounted on the substrate 11 is arranged at one end of the data lines DL. The inspection data processing circuit 34 is connected to the data lines DL at the output end side opposite the demultiplexer 23 and the precharge circuit 32A as viewed from the pixel array 21. The inspection data processing circuit 35 can acquire the voltage levels of the gate lines GL. The inspection data processing circuit 34 can acquire the voltage levels of the data lines DL. The inspection data processing circuit 35 allows detection of the voltage levels of the gate lines GL included in the wiring connected to the pixel array 21. The inspection data processing circuit 34 allows detection of the voltage levels of the data lines DL included in the wiring connected to the pixel array 21.

The precharge circuits 31A, 31B, 32A, and 32B, the common electrode inspection circuit 33, and the inspection data processing circuits 34 and 35 are mounted on the substrate 11 and can be included in the inspection circuit of the display device 100. The display device 100 includes the pixel array 21 as a pixel section. The pixel array 21 is connected to the gate lines GL and the data lines DL as wiring and the common electrode CB as an electrode. The inspection circuit of the display device 100 is connected to the wiring including the gate lines GL and the data lines DL and electrodes such as the common electrode CB. The inspection circuit of the display device 100 can inspect the wiring including the gate lines GL and data lines DL for an abnormality.

The inspection data processing circuits 34 and 35 use digital logic circuits instead of analog circuits such as comparators. Using digital logic circuits, instead of analog circuits, can increase the degree of integration of the circuit. In addition, there is no need to calibrate the characteristic variations of thin film transistors. The inspection data processing circuits 34 and 35 have a configuration that does not generate a through current. According to such inspection data processing circuits 34 and 35, the circuit scale is reduced and the inspection cost is reduced. Therefore, the inspection circuit of the display device 100 can appropriately inspect for an abnormality such as a line defect.

Examples of inspections performed by the inspection circuit of the display device 100 are outlined in FIGS. 2 to 6. FIGS. 2A and 2B illustrate a first example of inspecting for a short circuit between a gate line GL and a data line DL. FIGS. 3A and 3B illustrate a second example of inspecting the gate lines GL for a break. FIGS. 4A and 4B illustrate a third example of inspecting the data lines DL for a break. FIGS. 5A and 5B illustrate a fourth example of inspecting for a short circuit between a data line DL and the common electrode CB. FIGS. 6A and 6B illustrate a fifth example of inspecting for a short circuit between a gate line GL and the common electrode CB.

Figure 2A:
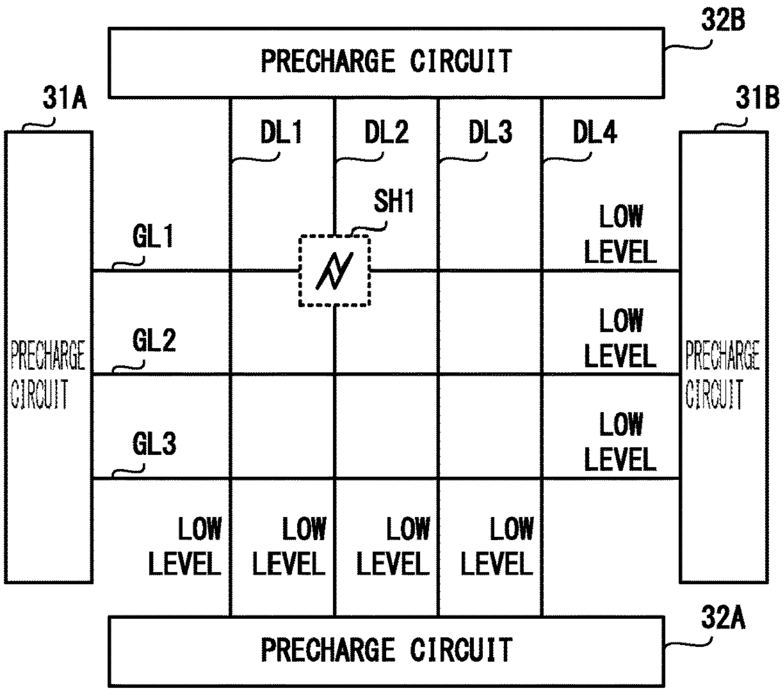
FIGS. 2A and 2B illustrate an example of inspecting for a short circuit between a gate line and a data line.
Figure 2B:
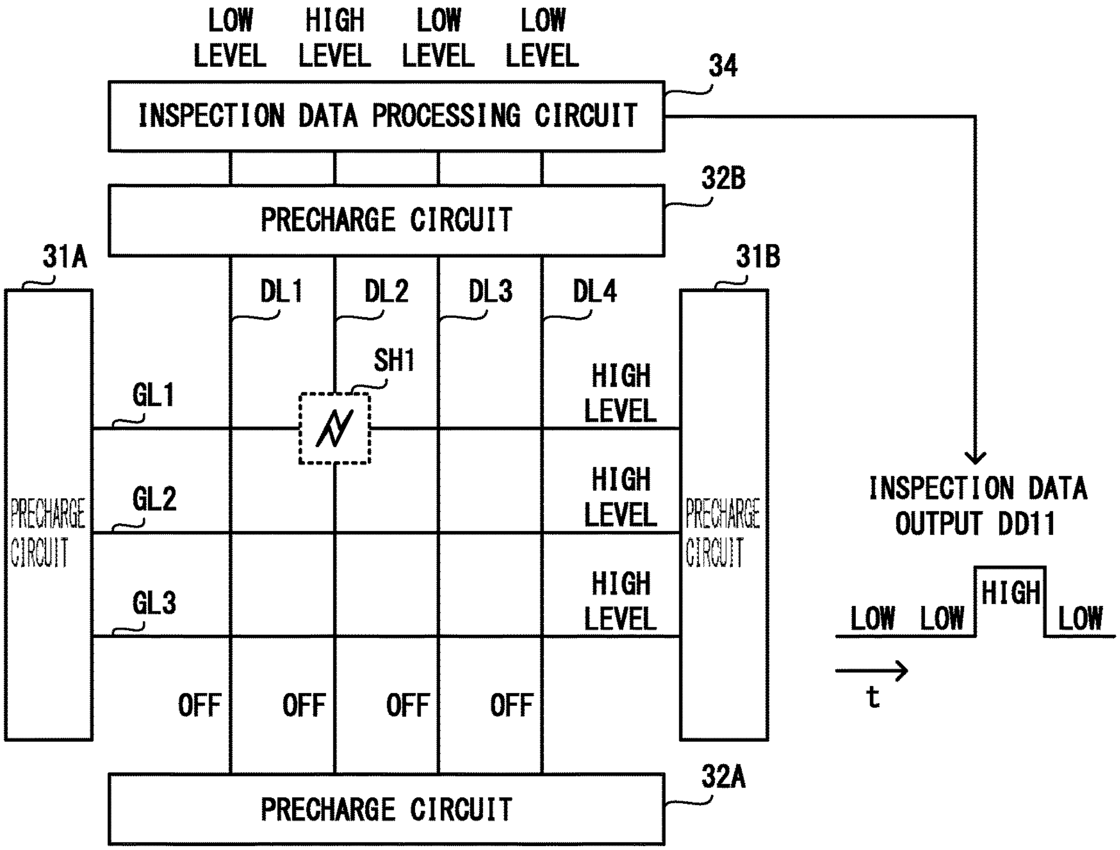

The gate lines GL1 to GL3 illustrated in FIGS. 2A and 2B are included in the plurality of gate lines GL. The data lines DL1 to DL4 illustrated in FIGS. 2A and 2B are included in the plurality of data lines DL. FIG. 2A illustrates a first step in a first example of inspection. In the first example, a line defect due to a short circuit SH1 has occurred between the gate line GL1 and the data line DL2. The precharge circuits 31A and 31B in FIG. 2A supply low level voltages to the gate lines GL1 to GL3. The precharge circuits 32A and 32B in FIG. 2A supply low level voltages to the data lines DL1 to DL4. More generally, the plurality of gate lines GL is supplied with low level voltages from the precharge circuits 31A and 31B on both sides as a common voltage for the same period of time. The plurality of data lines DL is supplied with low level voltages from the precharge circuits 32A and 32B on both sides as a common voltage for the same period of time. The low level voltages supplied from the precharge circuits 31A and 31B to the gate lines GL1 to GL3 in FIG. 2A are included in the first voltage supplied during the first period. The low level voltages supplied from the precharge circuits 32A and 32B to the data lines DL1 to DL4 in FIG. 2A are included in the first voltage supplied during the first period.

FIG. 2B illustrates second and third steps in the first example of inspection. The precharge circuits 31A and 31B in FIG. 2B supply high level voltages to the gate lines GL1 to GL3. The precharge circuits 32A and 32B in FIG. 2B are in an off state and do not supply voltage to the data lines DL1 to DL4. More generally, the plurality of gate lines GL is supplied with high level voltages from the precharge circuits 31A and 31B on both sides as a common voltage for the same period of time. The data lines DL are in a floating state where voltage is not supplied from the precharge circuits 32A and 32B on both sides. The high level voltages supplied from the precharge circuits 31A and 31B to the gate lines GL1 to GL3 in FIG. 2B are included in the second voltage supplied during the second period. Note that the precharge circuit 31B may be in an off state during the second period.

Based on the first and second steps in the above first example, the inspection data processing circuit 34 acquires the voltage levels of the data lines DL1 to DL4. For example, when the data lines DL1, DL3 and DL4 are normal, the inspection data processing circuit 34 acquires low level voltages. In contrast, when the data line DL2 includes a line defect due to a short circuit SH1 with the gate line GL1, the inspection data processing circuit 34 acquires a high level voltage. More generally, when the data line DL2 is shorted with at least one of the plurality of gate lines GL, the inspection data processing circuit 34 acquires a high level voltage. At a third step, the inspection data processing circuit 34 provides an inspection data output DD11 to the determination circuit 13. The determination circuit 13 can determine the occurrence of an abnormality using the inspection data received from the inspection data processing circuit 34.

Figure 3A:
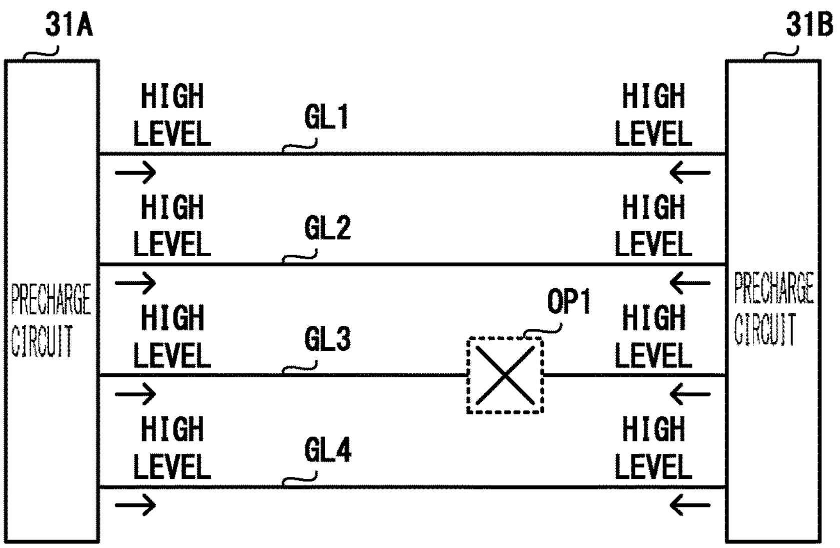
FIGS. 3A and 3B illustrate an example of inspecting gate lines for a break.
Figure 3B:
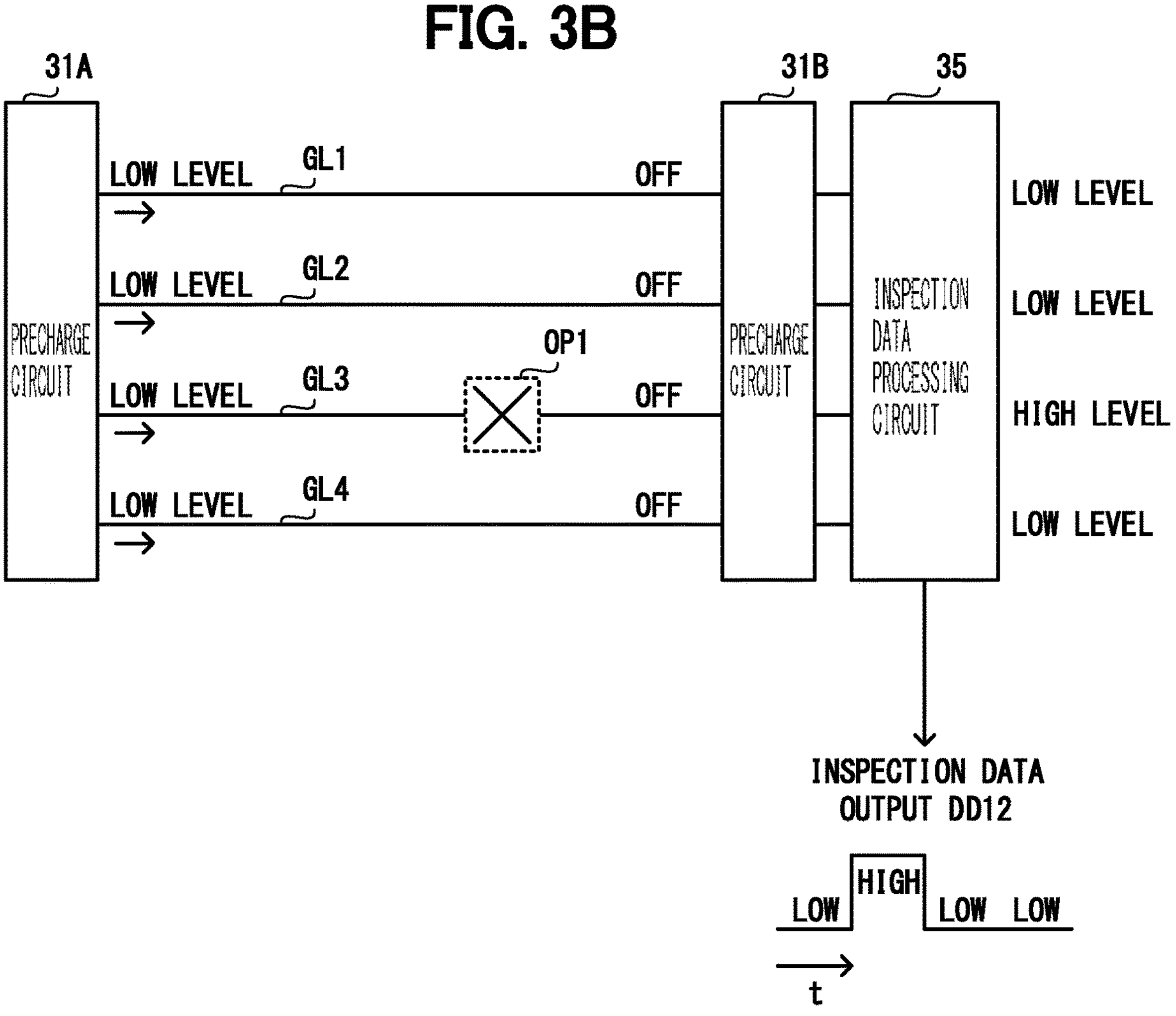

The gate lines GL1 to GL4 illustrated in FIGS. 3A and 3B are included in the plurality of gate lines GL. FIG. 3A illustrates a first step in a second example of inspection. In the second example, a line defect due to a break OP1 has occurred in the gate line GL3. The precharge circuits 31A and 31B in FIG. 3A supply high level voltages to the gate lines GL1 to GL4. More generally, the plurality of gate lines GL is supplied with high level voltages from the precharge circuits 31A and 31B on both sides as a common voltage for the same period of time. The high level voltages supplied from the precharge circuits 31A and 31B to the gate lines GL1 to GL4 in FIG. 3A are included in the first voltage supplied during the first period.

FIG. 3B illustrates second and third steps in the second example of inspection. The precharge circuit 31A in FIG. 3B supplies a low level voltage to the gate lines GL1 to GL4. The precharge circuit 31B in FIG. 3B is in an off state and does not supply voltage to the gate lines GL1 to GL4. More generally, the plurality of gate lines GL is supplied with a low level voltage as a common voltage for the same period from the precharge circuit 31A arranged on the input end side opposite the inspection data processing circuit 35. At this time, the plurality of gate lines GL is not supplied with voltage from the precharge circuit 31B arranged on the output end side. The low level voltage supplied from the precharge circuit 31A to the gate lines GL1 to GL4 in FIG. 3B is included in the second voltage supplied during the second period.

Based on the first and second steps in the second example described above, the inspection data processing circuit 35 acquires the voltage levels of the gate lines GL1 to GL4. For example, when the gate lines GL1, GL2, and GL4 are normal, the inspection data processing circuit 35 acquires low level voltages. In contrast, when the gate line GL3 includes a line defect due to a break OP1, the inspection data processing circuit 35 acquires a high level voltage. At a third step, the inspection data processing circuit 35 provides an inspection data output DD13 to the determination circuit 13. The determination circuit 13 can determine the occurrence of an abnormality using the inspection data received from the inspection data processing circuit 35.

Figure 4A:
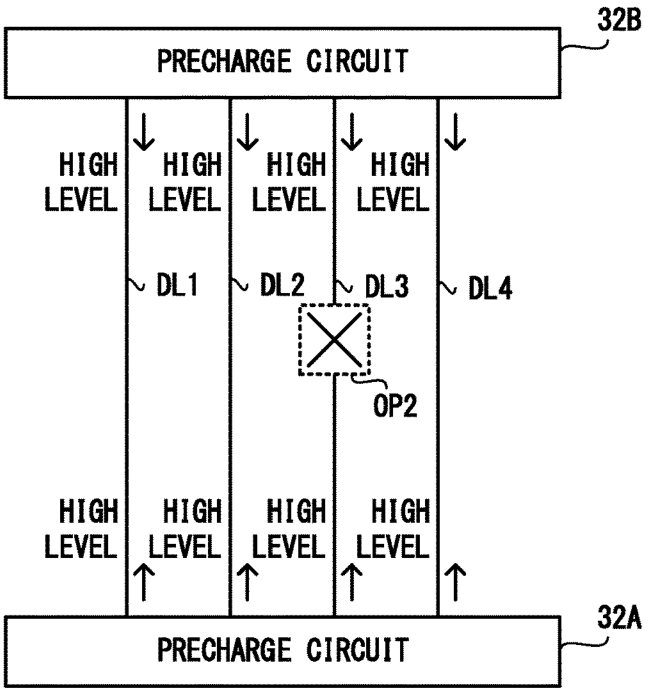
FIGS. 4A and 4B illustrate an example of inspecting data lines for a break.
Figure 4B:
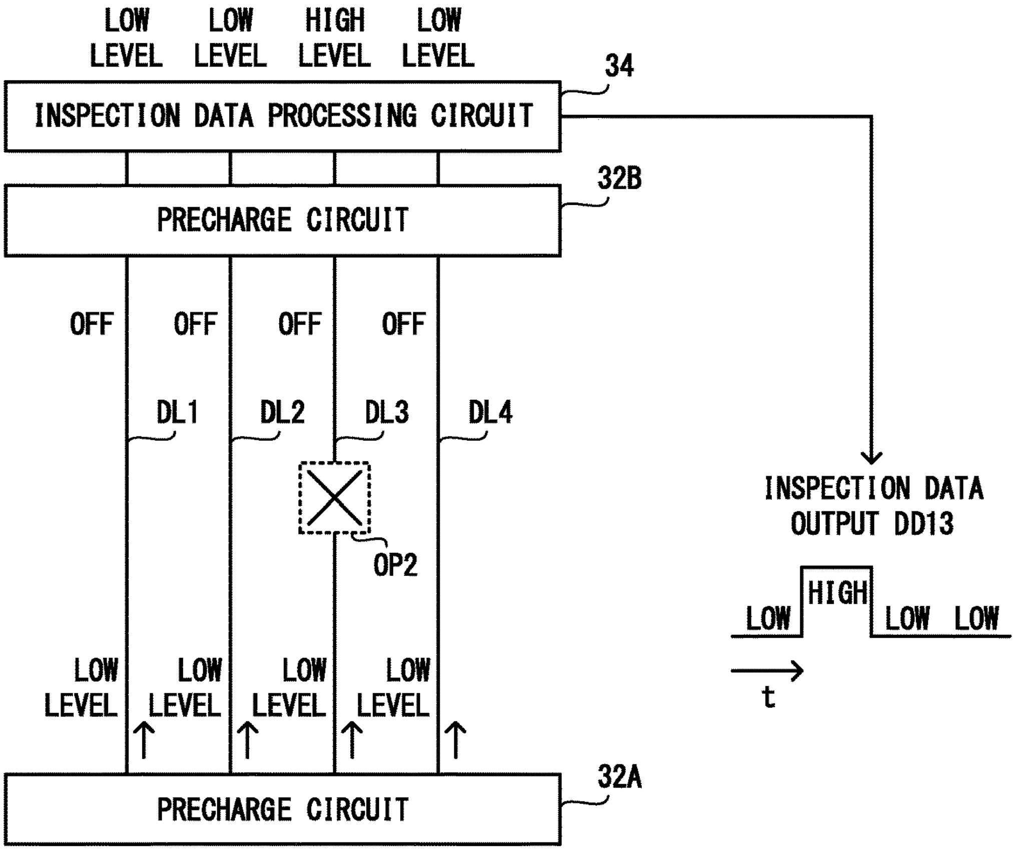

The data lines DL1 to DL4 illustrated in FIGS. 4A and 4B are included in the plurality of data lines DL. FIG. 4A illustrates a first step in a third example of inspection. In the third example, a line defect due to a break OP2 has occurred in the data line DL3. The precharge circuits 32A and 32B in FIG. 4A supply high level voltages to the data lines DL1 to DL4. More generally, the plurality of data lines DL is supplied with high level voltages from the precharge circuits 32A and 32B on both sides as a common voltage for the same period of time. The high level voltages supplied from the precharge circuits 32A and 32B to the data lines DL1 to DL4 in FIG. 4A are included in the first voltage supplied during the first period.

FIG. 4B illustrates second and third steps in the third example of inspection. The precharge circuit 32A in FIG. 4B supplies a low level voltage to the data lines DL1 to DL4. The precharge circuit 32B in FIG. 4B is in an off state and does not supply voltage to the data lines DL1 to DL4. More generally, the plurality of data lines DL is supplied with a low level voltage as a common voltage for the same period of time from the precharge circuit 32A arranged on the input end side opposite the inspection data processing circuit 34. At this time, the plurality of data lines DL is not supplied with voltage from the precharge circuit 32B arranged on the output end side. The low level voltage supplied from the precharge circuit 32A to the data lines DL1 to DL4 in FIG. 4B is included in the second voltage supplied during the second period.

Based on the first and second steps in the third example described above, the inspection data processing circuit 34 acquires the voltage levels of the data lines DL1 to DL4. For example, when the data lines DL1, DL2, and DL4 are normal, the inspection data processing circuit 34 acquires low level voltages. In contrast, when the data line DL3 includes a line defect due to a break OP2, the inspection data processing circuit 34 acquires a high level voltage. At a third step, the inspection data processing circuit 34 provides an inspection data output DD 13 to the determination circuit 13. The determination circuit 13 can determine the occurrence of an abnormality using the inspection data received from the inspection data processing circuit 34.

In the second example of inspection, the gate lines GL are to be inspected. The gate lines GL are inspected for a break using the inspection data processing circuit 35. In the second example, the data lines DL are not to be inspected. The inspection data processing circuit 34 is not used when the gate lines GL are inspected for a break. In the third example of inspection, the data lines DL are to be inspected. The data lines DL are inspected for a break using the inspection data processing circuit 34. In the third example, the gate lines GL are not to be inspected. The inspection data processing circuit 35 is not used when the data lines DL are inspected for a break. Therefore, the gate lines GL and the data lines DL can be simultaneously inspected for a break.

Figure 5A:
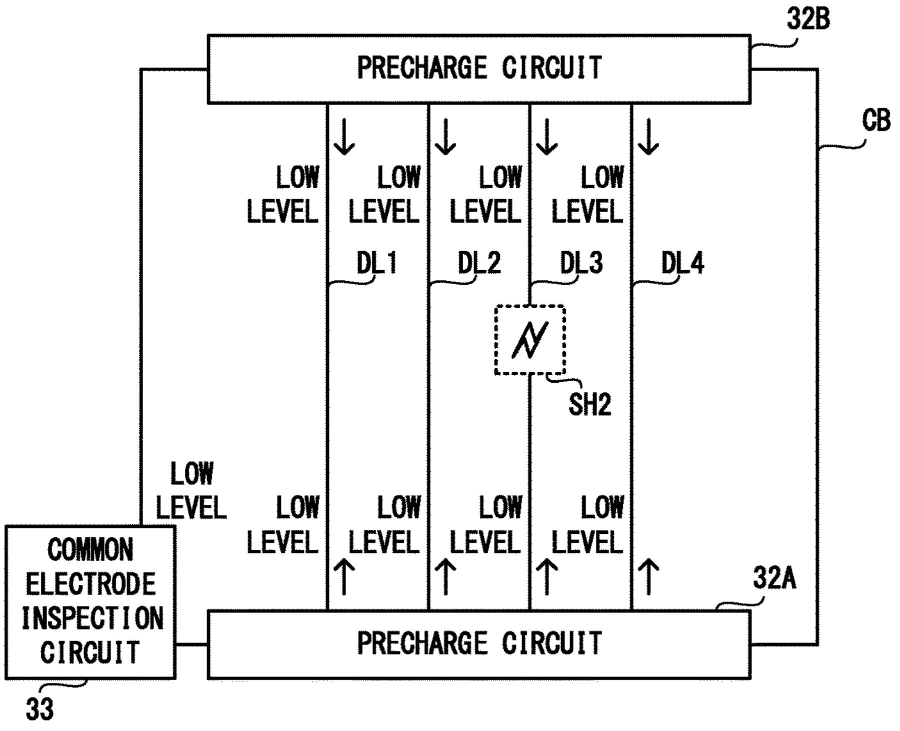
FIGS. 5A and 5B illustrate an example of inspecting for a short circuit between a data line and a common electrode.
Figure 5B:
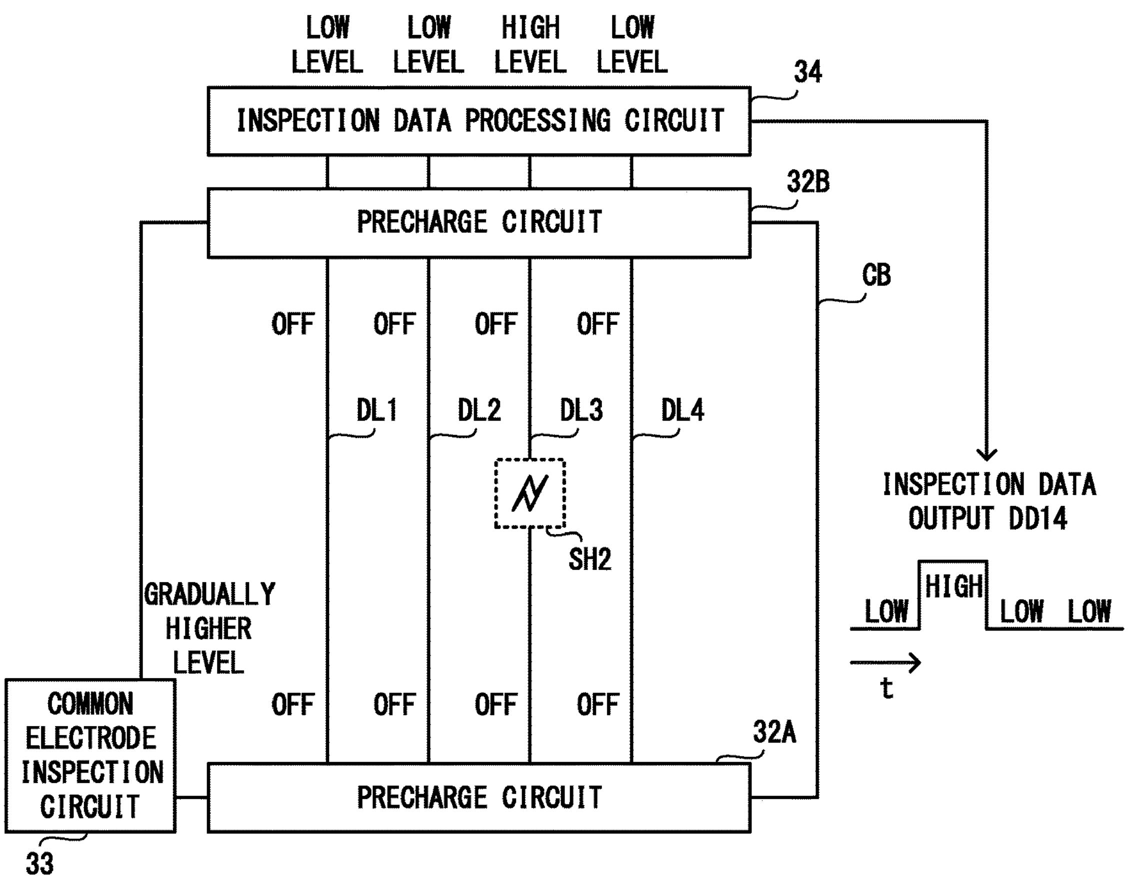

The data lines DL1 to DL4 illustrated in FIGS. 5A and 5B are included in the plurality of data lines DL. FIG. 5A illustrates a first step in a fourth example of inspection. In the fourth example, a line defect due to a short circuit SH2 has occurred between the data line DL3 and the common electrode CB. The precharge circuits 32A and 32B in FIG. 5A supply a low level voltage to the data lines DL1 to DL4. The common electrode inspection circuit 33 in FIG. 5A supplies a low level voltage to the common electrode CB. More generally, the plurality of data lines DL is supplied with low level voltages from the precharge circuits 32A and 32B on both sides as a common voltage for the same period of time. The common electrode CB is supplied with a low level voltage from the common electrode inspection circuit 33. The low level voltages supplied from the precharge circuits 32A and 32B to the data lines DL1 to DL4 in FIG. 5A are included in the first voltage supplied during the first period. The low level voltage supplied from the common electrode inspection circuit 33 to the common electrode CB in FIG. 5A is included in the first voltage supplied during the first period.

FIG. 5B illustrates second and third steps in the fourth example of inspection. The precharge circuits 32A and 32B in FIG. 5B are in an off state and do not supply voltage to the data lines DL1 to DL4. More generally, the data lines DL are in a floating state where voltage is not supplied from the precharge circuits 32A and 32B on both sides. The common electrode inspection circuit 33 in FIG. 5B gradually increases the voltage level to be supplied to the common electrode CB. The increase in voltage at the common electrode CB is slowed down by the pixel capacitance of the pixel array 21 including the holding capacitance of the pixel circuits. Since the voltage of the common electrode CB gradually increases, the common electrode CB is prevented from coupling with the gate lines GL and the data lines DL. The high level voltage supplied from the common electrode inspection circuit 33 to the common electrode CB in FIG. 5B is included in the second voltage supplied during the second period.

Based on the first and second steps in the fourth example described above, the inspection data processing circuit 34 acquires the voltage levels of the data lines DL1 to DL4. For example, when the data lines DL1, DL2, and DL4 are normal, the inspection data processing circuit 34 acquires low level voltages. In contrast, when the data line DL3 includes a line defect due to a short circuit SH2 with the common electrode CB, the inspection data processing circuit 34 acquires a high level voltage. At a third step, the inspection data processing circuit 34 provides an inspection data output DD14 to the determination circuit 13. The determination circuit 13 can determine the occurrence of an abnormality using the inspection data received from the inspection data processing circuit 34.

Figure 6A:
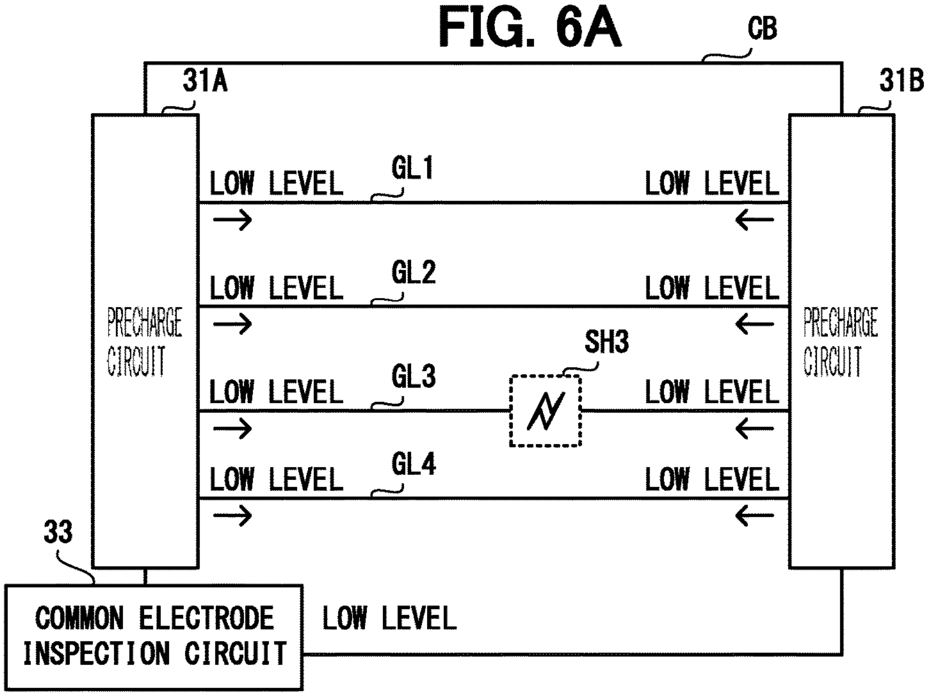
FIGS. 6A and 6B illustrate an example of inspecting for a short circuit between a gate line and the common electrode.
Figure 6B:
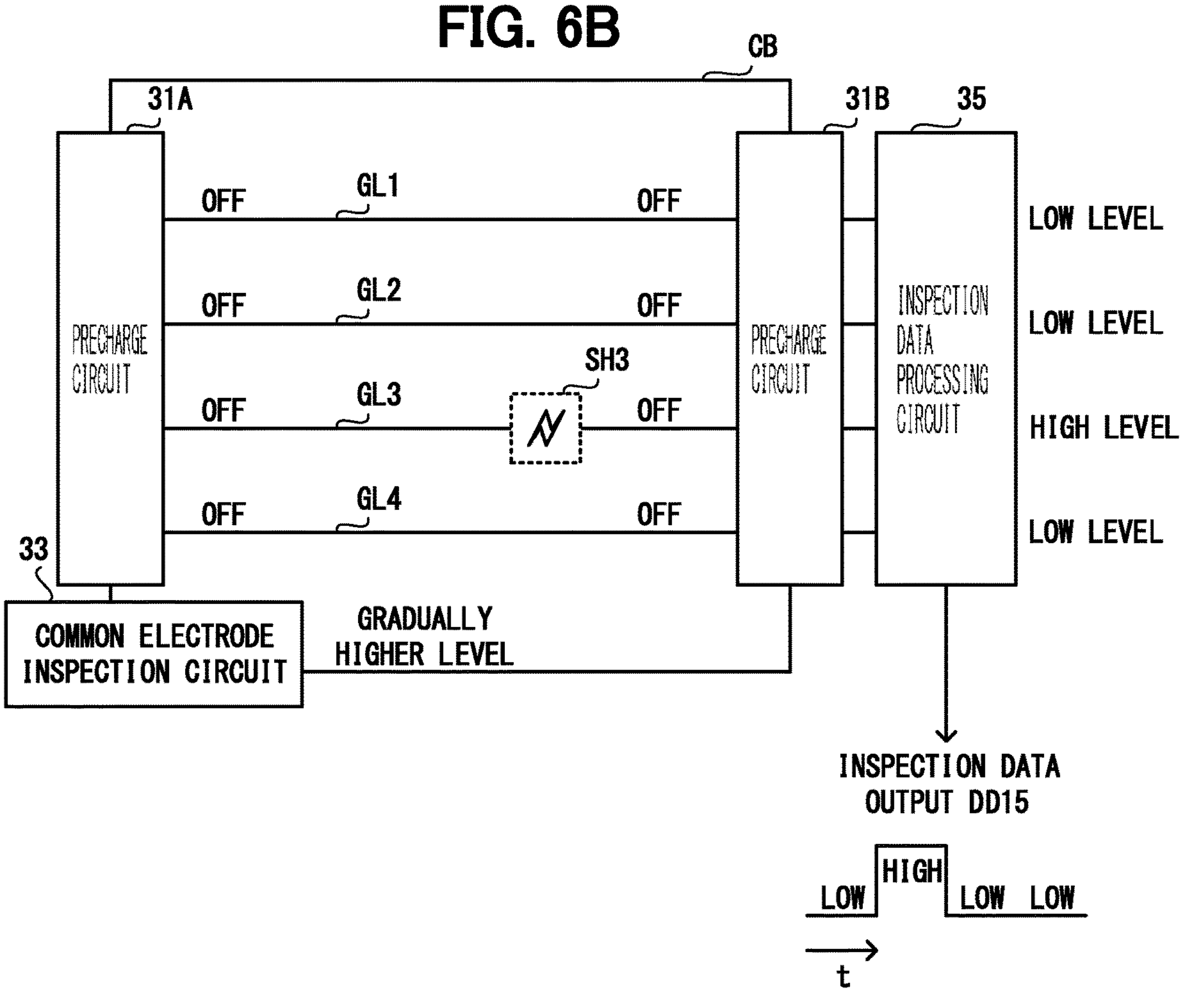

The gate lines GL1 to GL4 illustrated in FIGS. 6A and 6B are included in the plurality of gate lines GL. FIG. 6A illustrates a first step in a fifth example of inspection. In the fifth example, a line defect due to a short circuit SH3 has occurred between the gate line GL3 and the common electrode CB. The precharge circuits 31A and 31B in FIG. 6A supply low level voltages to the gate lines GL1 to GL4. The common electrode inspection circuit 33 in FIG. 6A supplies a low level voltage to the common electrode CB. More generally, the plurality of gate lines GL is supplied with low level voltages from the precharge circuits 31A and 31B on both sides as a common voltage for the same period of time. The common electrode CB is supplied with a low level voltage from the common electrode inspection circuit 33. The low level voltages supplied from the precharge circuits 31A and 31B to the gate lines GL1 to GL4 in FIG. 6A are included in the first voltage supplied during the first period. The low level voltage supplied from the common electrode inspection circuit 33 to the common electrode CB in FIG. 6A is included in the first voltage supplied during the first period.

FIG. 6B illustrates second and third steps in a fifth example of inspection. The precharge circuits 31A and 31B in FIG. 6B are in an off state and do not supply voltage to the gate lines GL1 to GL4. More generally, the gate lines GL are in a floating state where voltage is not supplied from the precharge circuits 31A and 31B on both sides. The common electrode inspection circuit 33 in FIG. 6B gradually increases the voltage to be supplied to the common electrode CB. The high level voltage supplied from the common electrode inspection circuit 33 to the common electrode CB in FIG. 6B is included in the second voltage supplied during the second period.

Based on the first and second steps in the fifth example described above, the inspection data processing circuit 35 acquires the voltage levels of the gate lines GL1 to GL4. For example, when the gate lines GL1, GL2, and GL4 are normal, the inspection data processing circuit 35 acquires low level voltages. In contrast, when the gate line GL3 includes a line defect due to a short circuit SH3 with the common electrode CB, the inspection data processing circuit 35 acquires a high level voltage. At a third step, the inspection data processing circuit 35 provides an inspection data output DD15 to the determination circuit 13. The determination circuit 13 can determine the occurrence of an abnormality using the inspection data received from the inspection data processing circuit 35.

In the fourth example of inspection, the data lines DL are to be inspected. The data lines DL and the common electrode CB are inspected for a short circuit using the inspection data processing circuit 34. In the fourth example, the gate lines GL are not to be inspected. The inspection data processing circuit 35 is not used when the data lines DL and the common electrode CB are inspected for a short circuit. In the fifth example of inspection, the gate lines GL are to be inspected. The gate lines GL and the common electrode CB are inspected for a short circuit using the inspection data processing circuit 35. In the fifth example, the data lines DL are not to be inspected. The inspection data processing circuit 34 is not used when the gate lines GL and the common electrode CB are inspected for a short circuit. Therefore, inspection for a short circuit between the data lines DL and the common electrode CB and inspection for a short circuit between the gate lines GL and the common electrode CB can be simultaneously performed.

The first voltage in the first period includes a common voltage supplied to the plurality of lines to be inspected. Depending on the inspection type, the low level or high level voltages supplied to the plurality of gate lines GL and the low level or high level voltages supplied to the plurality of data lines DL are included in the first voltage in the first period. In contrast, during the display period, the voltage supplied in response to the scanning signal from the scanning circuit 22 and the video signal from the demultiplexer 23 includes different voltages in a plurality of wires. Therefore, the setting of the first voltage in the first period is different from the setting of the voltage in the display period.

The setting of the second voltage in the second period differs from the setting of the first voltage in the first period. Depending on the inspection type, the second voltage in the second period may or may not include a common voltage supplied to a plurality of wires to be inspected. When the high level voltage supplied to the common electrode CB is the second voltage, the gate lines GL and the data lines DL are not supplied with the second voltage and are in a floating state. Therefore, the second voltage in the second period is supplied to one of the wiring and the electrode connected to the pixel array 21 but not to the other.

Figure 7:
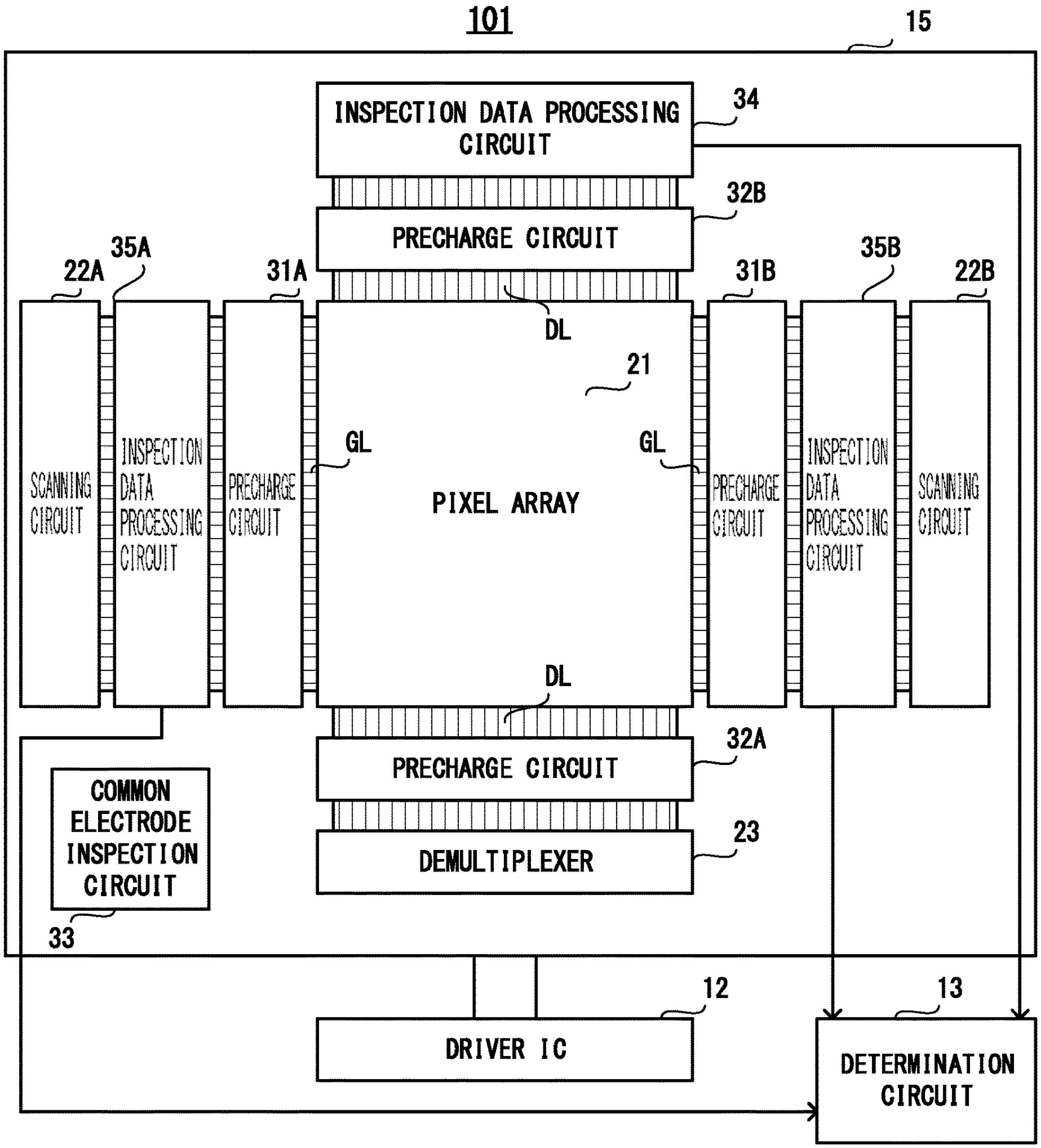
FIG. 7 is a schematic configuration diagram illustrating another configuration of the display device.

FIG. 7 illustrates a schematic configuration of a display device 101 as another configuration example different from the display device 100. In FIG. 7, the same signs are assigned to like components of FIG. 1. The display device 101 includes, as circuit elements mounted on the substrate 15, scanning circuits 22 A and 22B and inspection data processing circuits 35A and 35 B. The scanning circuits 22A and 22B mounted on the substrate 15 are arranged on both sides of the gate lines GL. The pixel array 21 is connected to the gate lines GL between the scanning circuit 22A and the scanning circuit 22B. The scanning circuit 22A is connected to one side of the gate lines GL connected to the pixel array 21, and the scanning circuit 22B is connected to the other side of the gate lines GL connected to the pixel array 21. The outputs of the scanning circuits 22A and 22B are connected to each other via the gate lines GL connected to the pixel array 21. When one of the scanning circuits 22A and 22B outputs a scanning signal, the other does not output a scanning signal. The driver IC 12 may be mounted on the substrate 15 using chip-on-glass (COG) technology. Alternatively, the driver IC 12 may be externally mountable on the substrate 15.

The inspection data processing circuits 35A and 35B mounted on the substrate 15 are arranged on both sides of the gate lines GL. The pixel array 21 is connected to the gate lines GL between the inspection data processing circuits 35A and 35B. The inspection data processing circuit 35A is connected to one side of the gate lines GL connected to the pixel array 21, and the inspection data processing circuit 35B is connected to the other side of the gate lines GL connected to the pixel array 21. The inputs of the inspection data processing circuits 35A and 35B are connected to each other via the gate lines GL connected to the pixel array 21.

Among the inspection examples performed by the inspection circuit of the display device 101, a first example in which a short circuit is detected between a gate line GL and a data line DL is the same as the inspection example performed by the inspection circuit of the display device 100. Among the inspection examples performed by the inspection circuit of the display device 101, a third example in which the data lines DL are inspected for a break is the same as the inspection example by the inspection circuitry of the display device 100. Among the inspection examples performed by the inspection circuit of the display device 101, a fourth example in which a short circuit is detected between a data line DL and the common electrode CB is the same as the inspection example by the inspection circuit of the display device 100. Among the inspection examples performed by the inspection circuit of the display device 101, a fifth example in which a short circuit is detected between a gate line GL and the common electrode CB is the same as the inspection example by the inspection circuit of the display device 100.

Among the inspection examples performed by the inspection circuit of the display device 101, a second example in which the gate lines GL are inspected for a break is different from the inspection example performed by the inspection circuit of the display device 100. For example, when one of the inspection data processing circuits 35A and 35B acquires the voltage level of the gate lines GL, the other does not acquire the voltage level of the gate lines GL. Therefore, when inspection using one of the inspection data processing circuits 35A and 35B arranged on both sides of the gate lines GL is performed, inspection using the other is not performed.

Figure 8:
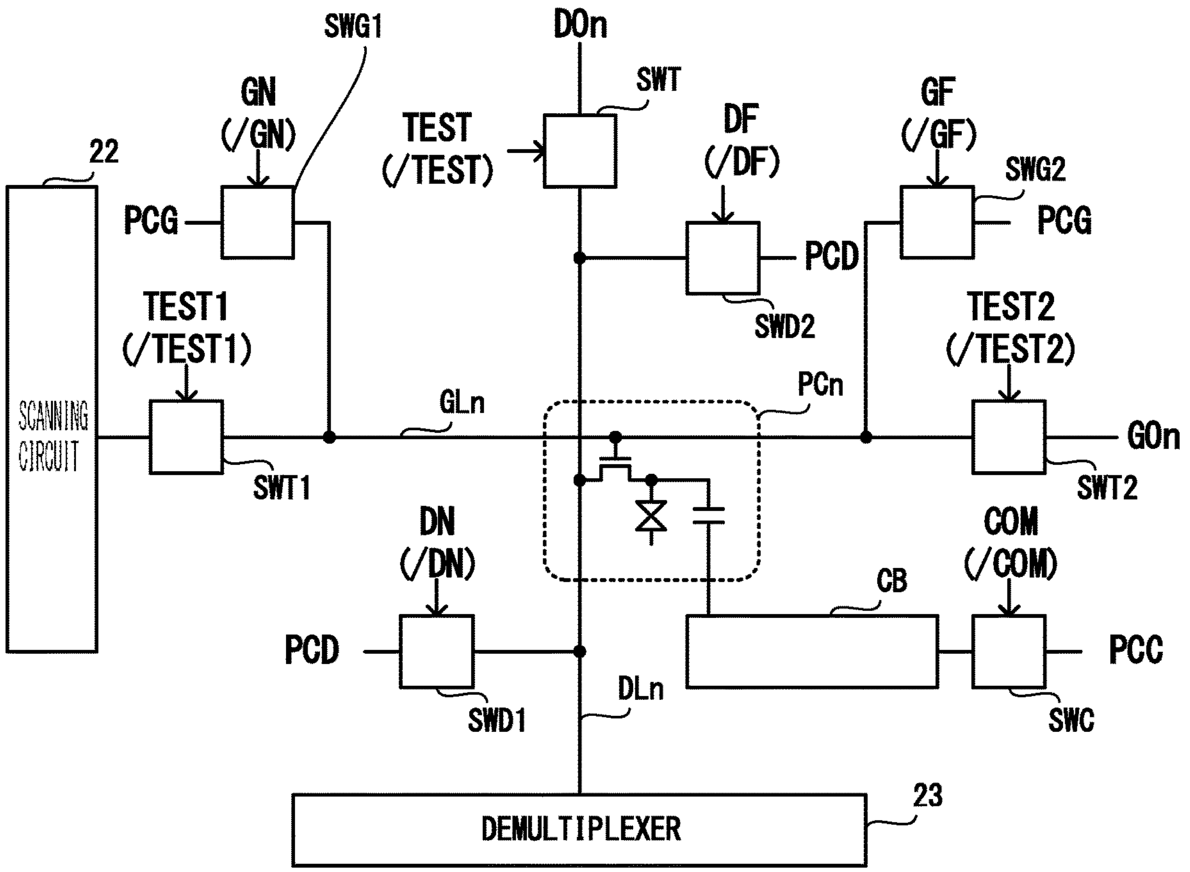
FIG. 8 illustrates a schematic connection of a precharge circuit.

FIG. 8 illustrates a schematic connection of a precharge circuit. The gate line GLn illustrated in FIG. 8 is wiring included in a plurality of gate lines GL. The data line DLn illustrated in FIG. 8 is wiring included in a plurality of data lines DL. The gate line GLn and the data line DLn are connected to the pixel circuit PCn included in the pixel array 21. The pixel circuit PCn is also connected to the common electrode CB.

The gate line GLn is connected to switch circuits SWG1 and SWG2. The switch circuit SWG1 is included in the precharge circuit 31A. The switch circuit SWG2 is included in the precharge circuit 31B. The voltage generators included in the precharge circuits 31A and 31B generate precharge voltages PCG. When the switch circuit SWG1 is on, the precharge voltage PCG generated in the precharge circuit 31A is supplied to the gate line GLn. When the switch circuit SWG1 is off, the precharge voltage PCG generated in the precharge circuit 31A is not supplied to the gate line GLn. When the switch circuit SWG2 is on, the precharge voltage PCG generated in the precharge circuit 31B is supplied to the gate line GLn. When the switch circuit SWG2 is off, the precharge voltage PCG generated in the precharge circuit 31B is not supplied to the gate line GLn.

The data line DLn is connected to switch circuits SWD1 and SWD2. The switch circuit SWD1 is included in the precharge circuit 32A. The switch circuit SWD2 is included in the precharge circuit 32B. The voltage generators included in the precharge circuits 32A and 32B generate precharge voltages PCD. When the switch circuit SWD1 is on, the precharge voltage PCD generated in the precharge circuit 32A is supplied to the data line DLn. When the switch circuit SWD1 is off, the precharge voltage PCD generated in the precharge circuit 32A is not supplied to the data line DLn. When the switch circuit SWD2 is on, the precharge voltage PCD generated in the precharge circuit 32B is supplied to the data line DLn. When the switch circuit SWD2 is off, the precharge voltage PCD generated in the precharge circuit 32B is not supplied to the data line DLn.

The common electrode CB is connected to the switch circuit SWC. The switch circuit SWC is included in the common electrode inspection circuit 33. The voltage generator included in the common electrode inspection circuit 33 generates a precharge voltage PCC. When the switch circuit SWC is on, the precharge voltage PCC generated in the common electrode inspection circuit 33 is supplied to the common electrode CB. When the switch circuit SWC is off, the precharge voltage PCC generated in the common electrode inspection circuit 33 is not supplied to the common electrode CB.

The gate line GLn is connected to the switch circuits SWT1 and SWT2. The switch circuit SWT1 switches off or on the connection between the scanning circuit 22 and the gate line GLn. The switch circuit SWT2 switches off or on the connection between the inspection data processing circuit 35 and the gate line GLn. When the switch circuit SWT2 is on, an output signal GOn indicating the voltage level of the gate line GLn is input to the inspection data processing circuit 35. When the switch circuit SWT2 is off, an output signal GOn indicating the voltage level of the gate line GLn is not input to the inspection data processing circuit 35.

The data line DLn is connected to the switch circuit SWT. The switch circuit SWT switches off or on the connection between the inspection data processing circuit 34 and the data line DLn. When the switch circuit SWT is on, an output signal DOn indicating the voltage level of the data line DLn is input to the inspection data processing circuit 34. When the switch circuit SWT is off, an output signal DOn indicating the voltage level of the data line DLn is not input to the inspection data processing circuit 34.

Figure 9A:
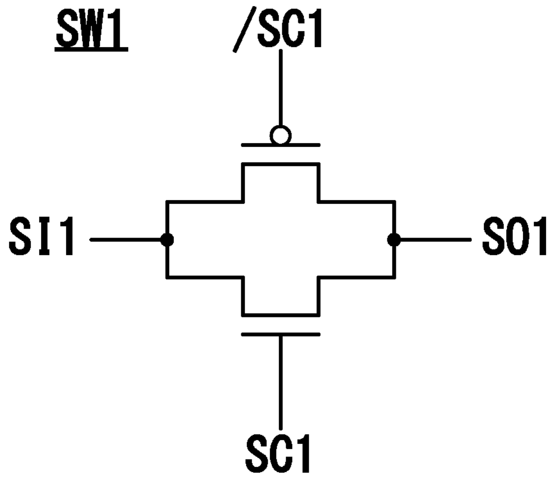
FIGS. 9A to 9C are circuit diagrams illustrating configuration examples of switch circuits.
Figure 9B:
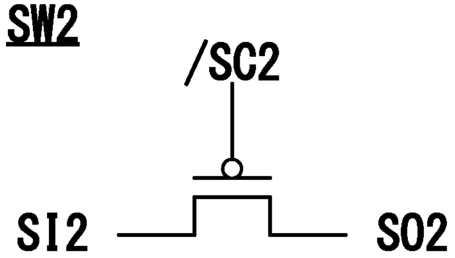
Figure 9C:
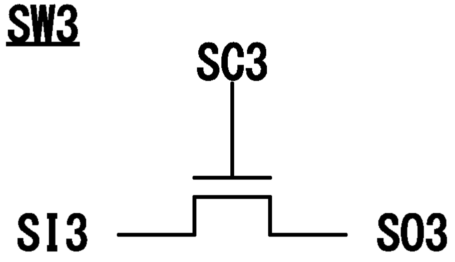

Configuration examples of the switch circuits are illustrated in FIGS. 9A to 9C. The type of switch circuit is selected from a CMOS type, a PMOS type, and an NMOS type. FIG. 9A is a circuit diagram illustrating the switch circuit SW1. The switch circuit SW1 is a CMOS type. FIG. 9B is a circuit diagram illustrating the switch circuit SW2. The switch circuit SW2 is a PMOS type. FIG. 9C is a circuit diagram illustrating the switch circuit SW3. The switch circuit SW3 is an NMOS type. When the PMOS type switch circuit SW2 is used, the transistor for the switch circuit included in the pixel circuit PCn of FIG. 8 is also a PMOS type.

The switch circuit SW1 in FIG. 9A includes a switch input SD and a switch output SO1. The switch circuit SW1 receives a switch control signal SC1 and the inverted signal of the switch control signal SC1. The switch circuit SW1 switches off or on in response to the switch control signal SC1 and the inverted signal thereof. The switch circuit SW2 in FIG. 9B includes a switch input SI2 and a switch output SO2. The switch circuit SW2 receives the inverted signal of a switch control signal SC2. The switch circuit SW2 switches off or on in response to the inverted signal of the switch control signal SC2. The switch circuit SW3 in FIG. 9C includes a switch input SI3 and a switch output SO3. The switch circuit SW3 receives a switch control signal SC3. The switch circuit SW3 switches off or on in response to the switch control signal SC3.

In FIG. 8, the same type is selected for the switch circuits SWG1, SWG2, SWD1, SWD2, SWC, SWT1, SWT2, and SWT. For example, when a thin film transistor is formed using low-temperature polysilicon in which an NMOS transistor and a PMOS transistor are integrated on the same substrate, a CMOS type switch circuit SW1 may be selected. When a thin film transistor is formed using specific single-conductive low-temperature polysilicon or organic TFT, a PMOS type switch circuit SW2 may be selected. When a thin film transistor is formed using different single-conductive low-temperature polysilicon or In—Ga—Zn—O semiconductor (IGZO) or amorphous silicon (a-Si), an NMOS type switch circuit SW3 may be selected. The type to be selected depends on the manufacturing process of the scanning circuit 22 and the demultiplexer 23 that are integrally formed on the substrate 11.

When the switch circuit SWG1 in FIG. 8 is the switch circuit SW1 in FIG. 9A, the switch circuit SWG1 receives a switch control signal GN and the inverted signal of the switch control signal GN. In this case, the switch circuit SWG1 switches off or on in response to the switch control signal GN and the inverted signal. When the switch circuit SWG1 in FIG. 8 is the switch circuit SW2 in FIG. 9B, the switch circuit SWG1 receives the inverted signal of the switch control signal GN. In this case, the switch circuit SWG1 switches off or on in response to the inverted signal of the switch control signal GN. When the switch circuit SWG1 in FIG. 8 is the switch circuit SW3 in FIG. 9C, the switch circuit SWG1 receives a switch control signal GN. In this case, the switch circuit SWG1 switches off or on in response to the switch control signal GN. In this way, the switch circuit SWG1 in FIG. 8 switches off or on in response to one or both of the switch control signal GN and the inverted signal thereof. The switch circuit SWG2 in FIG. 8 switches off or on in response to one or both of the switch control signal GF and the inverted signal thereof.

The switch circuit SWD1 in FIG. 8 switches off or on in response to one or both of the switch control signal DN and the inverted signal thereof. The switch circuit SWD2 in FIG. 8 switches off or on in response to one or both of the switch control signal DF and the inverted signal thereof. The switch circuit SWC in FIG. 8 switches off or on in response to one or both of a switch control signal COM and the inverted signal thereof. The switch circuit SWT1 in FIG. 8 switches off or on in response to one or both of a switch control signal TEST1 and the inverted signal thereof. The switch circuit SWT2 in FIG. 8 switches off or on in response to one or both of a switch control signal TEST2 and the inverted signal thereof. The switch circuit SWT in FIG. 8 switches off or on in response to one or both of a switch control signal TEST and the inverted signal thereof. More generally, the switch circuit switches off or on in response to one or both of a switch control signal and the inverted signal thereof.

Figure 10:
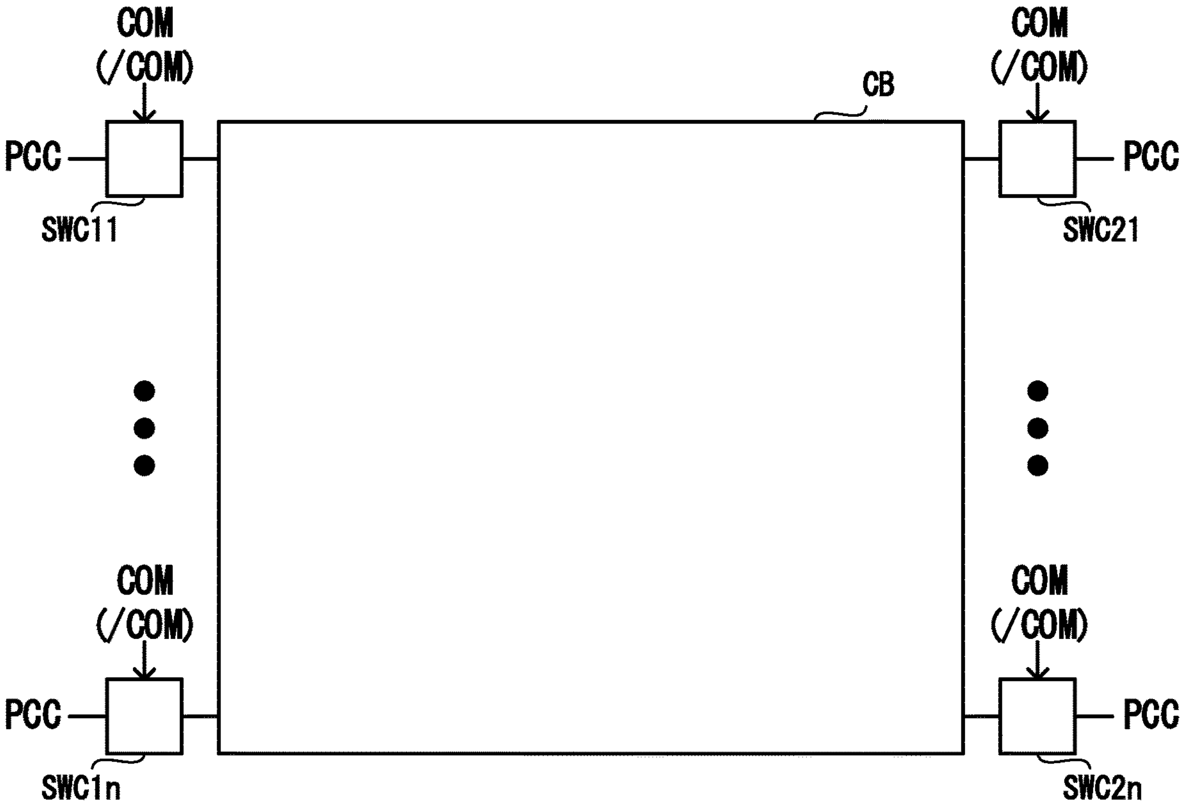
FIG. 10 illustrates a schematic connection of a common electrode inspection circuit.

FIG. 10 illustrates a schematic connection of the common electrode inspection circuit 33. In FIG. 10, the switch circuits SWC11 to SWC1*n* and the switch circuits SWC21 to SWC2*n* are included in the common electrode inspection circuit 33. The switch circuits SWC11 to SWC1*n* are connected to one side of the common electrode CB. The switch circuits SWC21 to SWC2*n* are connected to the other side of the common electrode CB. The common electrode inspection circuit 33 includes a plurality of switch circuits arranged on both sides of the common electrode CB. In FIG. 10, the same type is selected for the switch circuits SWC11 to SWC1*n* and the switch circuits SWC21 to SWC2*n*. The plurality of switch circuit types illustrated in FIG. 10 may be any type that is the same as the type of the switch circuit SWC in FIG. 8.

When the switch circuit SWC11 in FIG. 10 is the switch circuit SW1 in FIG. 9A, the switch circuit SWC11 receives a switch control signal COM and the inverted signal of the switch control signal COM. In this case, the switch circuit SWC11 switches off or on in response to the switch control signal COM and the inverted signal thereof. When the switch circuit SWC 11 in FIG. 10 is the switch circuit SW2 in FIG. 9B, the switch circuit SWC11 receives the inverted signal of the switch control signal COM. In this case, the switch circuit SWC11 switches off or on in response to the inverted signal of the switch control signal COM. When the switch circuit SWC11 in FIG. 10 is the switch circuit SW3 in FIG. 9C, the switch circuit SWC11 receives a switch control signal COM. In this case, the switch circuit SWC11 switches off or on in response to the switch control signal COM. In this way, the switch circuit SWC11 in FIG. 10 switches off or on in response to one or both of the switch control signal COM and the inverted signal thereof. Likewise, the plurality of switch circuits included in the common electrode inspection circuit 33, such as the switch circuits SWC11 to SWC1*n* and SWC21 to SWC2*n* in FIG. 10, switches off or on in response to one or both of the switch control signal COM and the inverted signal thereof.

Figure 11A:
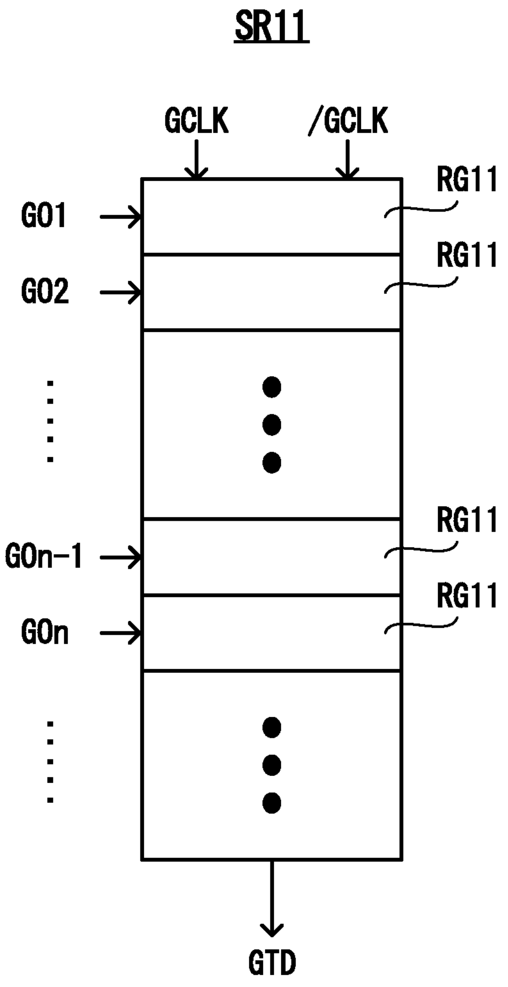
FIGS. 11A and 11B illustrate configuration examples of inspection data processing circuits.
Figure 11B:
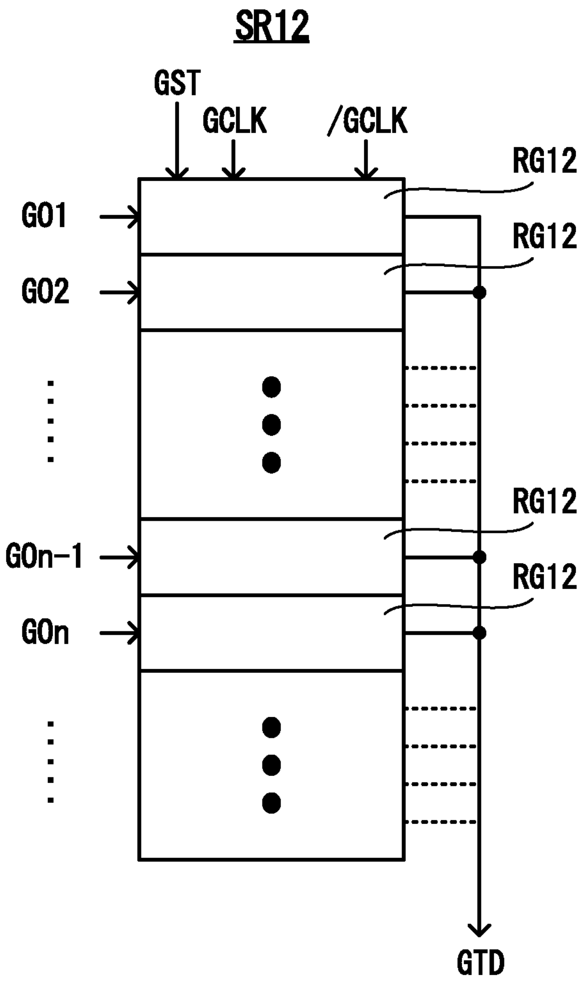

Configuration examples of the inspection data processing circuit 35 are illustrated in FIGS. 11A and 11B. The inspection data processing circuit 35 may be any shift register capable of outputting inspection data corresponding to the voltage levels of the plurality of gate lines GL. The shift register in the inspection data processing circuit 35 can serially output inspection data corresponding to voltage levels that are input in parallel from the plurality of gate lines GL. The shift register SR11 illustrated in FIG. 11A is a CMOS type. The shift register SR12 illustrated in FIG. 11B is a PMOS type or an NMOS type. The type of the shift register in the inspection data processing circuit 35 is the same as the type of the precharge circuits 31A, 31B, 32A, and 32B. The type to be selected depends on the manufacturing process of the scanning circuit 22 and the demultiplexer 23 that are integrally formed on the substrate 11.

The shift register SR11 in FIG. 11A includes a plurality of register circuits RG11 that is cascade connected. Each register circuit RG11 acquires a voltage level from one of the plurality of gate lines GL. For example, the register circuit RG11 may be any D-type flip-flop circuit using a plurality of CMOS inverter circuits and a plurality of transmission gates. The transmission gate is equivalent to the switch circuit SW1 illustrated in FIG. 9A. The plurality of register circuits RG11 in the shift register SR11 transfer inspection data from the previous stage to the next stage using a clock signal GCLK and the inverted signal of the clock signal GCLK. The register circuit RG11 at the last stage supplies an inspection data output GTD to the determination circuit 13.

The shift register SR12 in FIG. 11B includes a plurality of register circuits RG12 that is cascade connected. Each register circuit RG12 acquires a voltage level from one of the plurality of gate lines GL. For example, the register circuit RG12 may be any temporary memory circuit using a plurality of PMOS transistors and a holding capacitance. Alternatively, the register circuit RG12 may be any temporary memory circuit using a plurality of NMOS transistors and a holding capacitance. The plurality of register circuits RG12 in the shift register SR12 transfer an output start signal GST from the previous stage to the next stage using a clock signal GCLK and the inverted signal of the clock signal GCLK. The register circuit RG12 of each stage supplies an inspection data output GTD to the determination circuit 13 at a timing in accordance with the output start signal GST.

Figure 12:
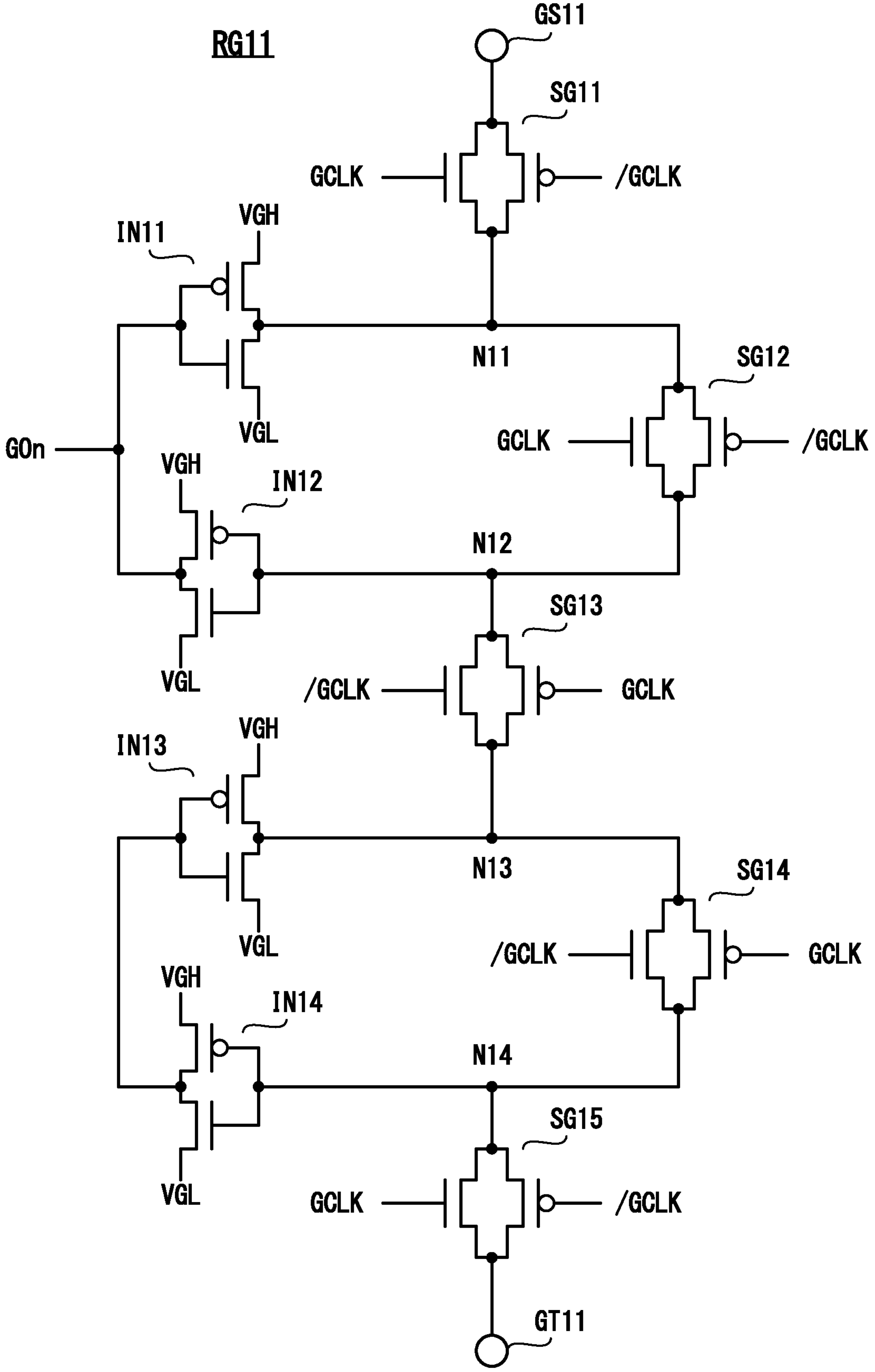
FIG. 12 is a circuit diagram illustrating a CMOS type register circuit.

FIG. 12 is a circuit diagram illustrating a configuration example of the register circuit RG11. The register circuit RG11 constitutes a two-stage latch circuit using transmission gates. The register circuit RG11 includes inverter circuits IN11 to IN14 and transmission gates SG11 to SG15. The inverter circuits IN11 and IN12 and the transmission gates SG11 and SG12 constitute a first stage latch circuit. The inverter circuits IN13 and IN14 and the transmission gates SG13 and SG14 constitute a second stage latch circuit. The clock signal GCLK and the inverted signal thereof supplied to the transmission gates SG13 and SG14 in the second stage latch circuit are in the opposite phase of the clock signal GCLK and the inverted signal thereof supplied to the transmission gates SG11 and SG12 in the first stage latch circuit.

The terminal GS11 is a D input terminal in the register circuit RG11. The terminal GT11 is a Q output terminal in the register circuit RG11. The terminal GS11 is connected to the terminal GT11 in the register circuit RG11 of the previous stage. In the register circuit RG11 of the foremost stage, the terminal GS11 is unused and may be connected to a low level voltage source or a ground terminal. The terminal GT11 is connected to the terminal GS11 in the register circuit RG11 of the subsequent stage. In the register circuit RG11 of the last stage, the terminal GT11 provides an inspection data output GTD.

Figure 13:
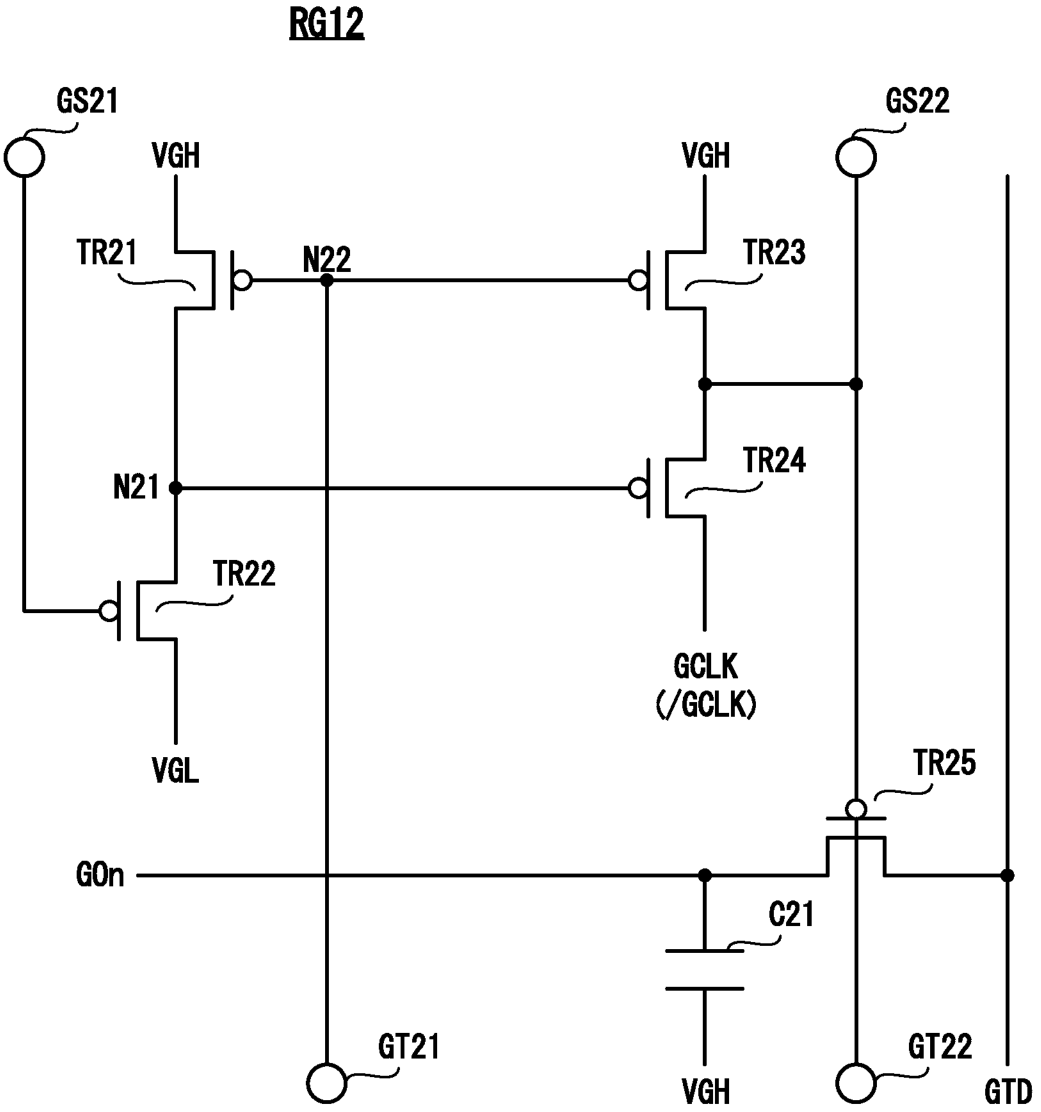
FIG. 13 is a circuit diagram illustrating a PMOS type register circuit.

FIG. 13 is a circuit diagram illustrating a configuration example of a PMOS-type register circuit RG12. The register circuit RG12 in FIG. 13 includes a plurality of PMOS transistors TR21 to TR25 and a holding capacitance C21. The terminal GS21 is connected to the terminal GT22 in the register circuit RG12 of the previous stage. In the register circuit RG12 of the foremost stage, the terminal GS21 is input with an output start signal GST. The terminal GS22 is connected to the terminal GT21 in the register circuit RG12 of the previous stage. In the register circuit RG12 of the foremost stage, the terminal GS22 is unused. The terminal GT21 is connected to the terminal GS22 in the subsequent register circuit RG12. In the register circuit RG12 of the last stage, the terminal GT21 is unused. The terminal GT22 is connected to the terminal GS21 in the register circuit RG12 of the subsequent stage. In the register circuit RG12 of the last stage, the terminal GT22 is unused.

Figure 14:
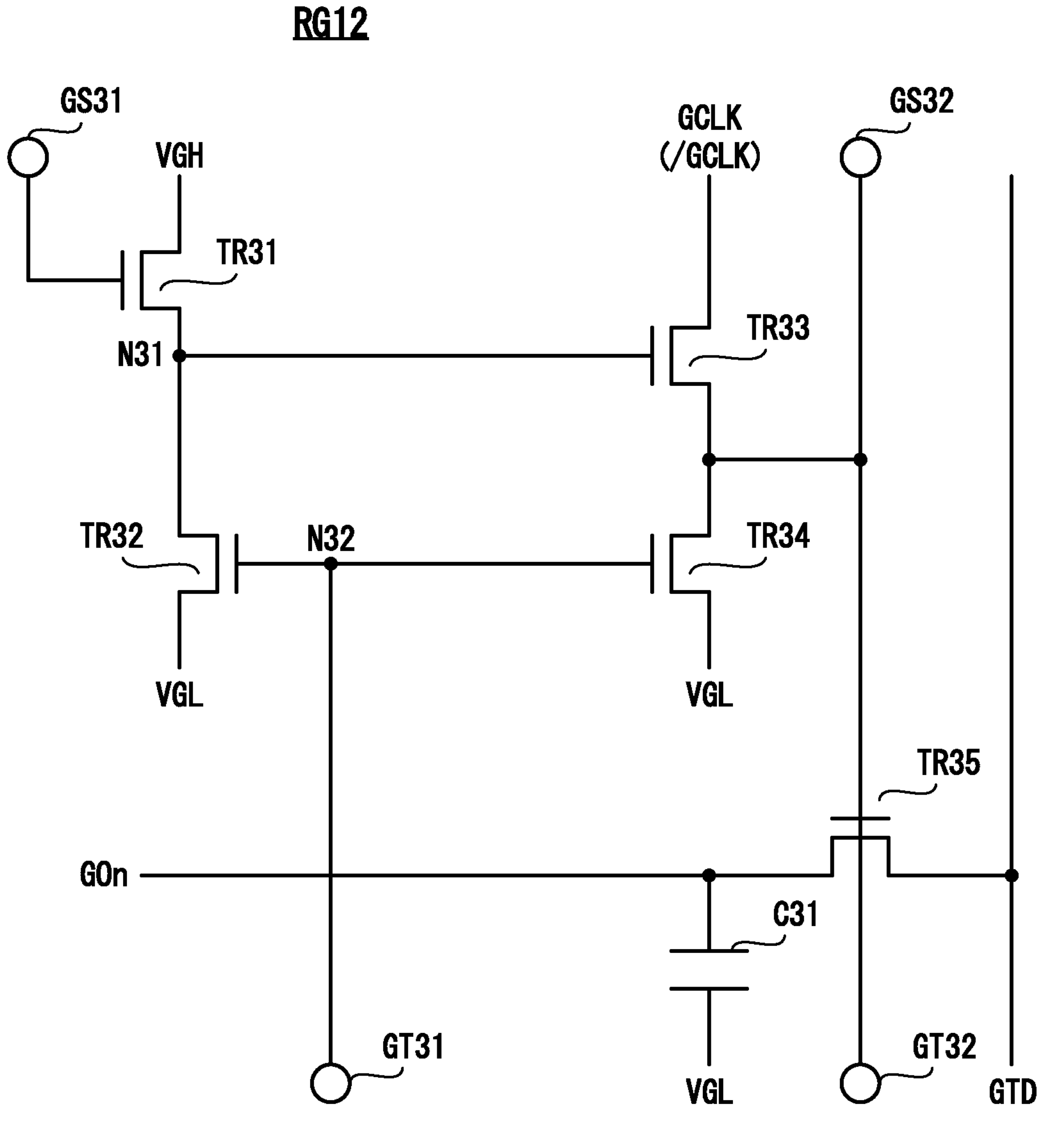
FIG. 14 is a circuit diagram illustrating an NMOS type register circuit.

FIG. 14 is a circuit diagram illustrating a configuration example of an NMOS type register circuit RG12. The register circuit RG12 in FIG. 14 includes a plurality of NMOS transistors TR31 to TR35 and a holding capacitance C31. The terminal GS31 is connected to the terminal GT32 in the register circuit RG12 of the previous stage. In the register circuit RG12 of the foremost stage, the terminal GS31 is input with an output start signal GST. The terminal GS32 is connected to the terminal GT31 in the register circuit RG12 of the previous stage. In the register circuit RG12 of the foremost stage, the terminal GS32 is unused. The terminal GT31 is connected to the terminal GS32 in the register circuit RG12 of the subsequent stage. In the register circuit RG12 of the last stage, the terminal GT31 is unused. The terminal GT32 is connected to the terminal GS31 in the register circuit RG12 of the subsequent stage. In the register circuit RG12 of the last stage, the terminal GT32 is unused.

Figure 15A:
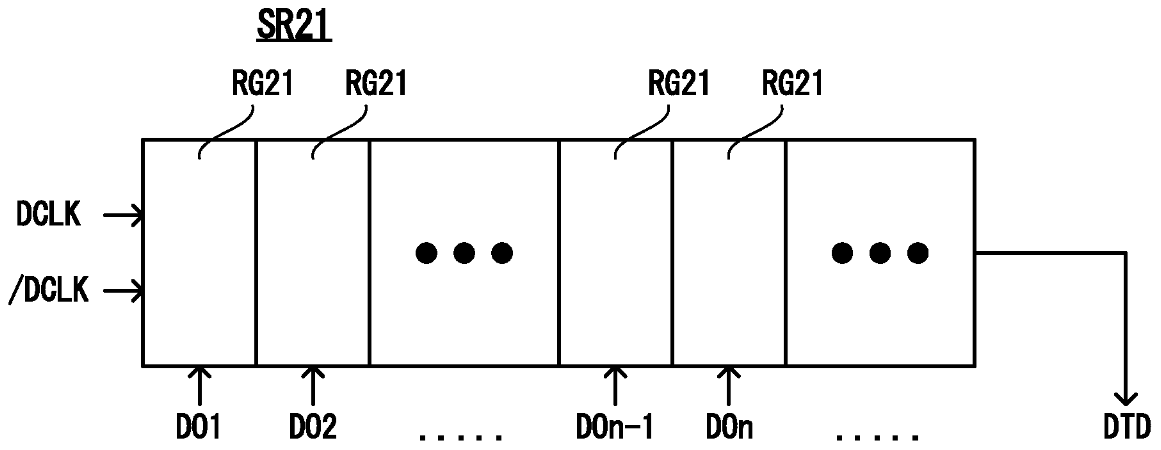
FIGS. 15A and 15B illustrate configuration examples of inspection data processing circuits.
Figure 15B:
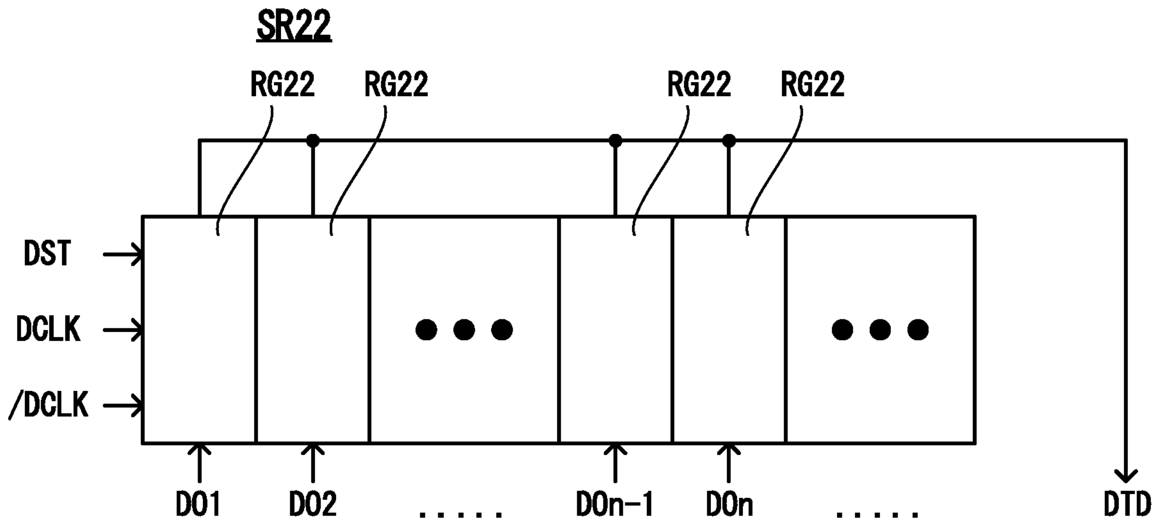

Configuration examples of the inspection data processing circuit 34 are illustrated in FIGS. 15A and 15B. The inspection data processing circuit 34 may be any shift register capable of outputting inspection data corresponding to the voltage levels in the plurality of data lines DL. The shift register in the inspection data processing circuit 34 can serially output inspection data corresponding to voltage levels that are input in parallel from the plurality of data lines DL. The shift register SR21 illustrated in FIG. 15A is a CMOS type. The shift register SR22 illustrated in FIG. 15B is a PMOS type or an NMOS type. The type of the shift register in the inspection data processing circuit 34 is the same as the type of the precharge circuits 31A, 31B, 32A, and 32B, and the inspection data processing circuit 35. The type to be selected depends on the manufacturing process of the scanning circuit 22 and the demultiplexer 23 that are integrally formed on the substrate 11.

The shift register SR21 in FIG. 15A includes a plurality of register circuits RG21 that is cascade connected. Each register circuit RG21 acquires a voltage level from one of the plurality of data lines DL. For example, the register circuit RG21 may be any D-type flip-flop circuit using a plurality of CMOS inverter circuits and a plurality of transmission gates. The transmission gate is equivalent to the switch circuit SW1 illustrated in FIG. 9A. The plurality of register circuits RG21 in the shift register SR21 transfer inspection data from the previous stage to the next stage using a clock signal DCLK and the inverted signal of the clock signal DCLK. The register circuit RG21 in the last stage supplies an inspection data output DTD to the determination circuit 13.

The shift register SR22 in FIG. 15B includes a plurality of register circuits RG22 that is cascade connected. Each register circuit RG22 acquires a voltage level from one of the plurality of data lines DL. For example, the register circuit RG22 may be any temporary memory circuit using a plurality of PMOS transistors and a holding capacitance. Alternatively, the register circuit RG22 may be any temporary memory circuit using a plurality of NMOS transistors and a holding capacitance. The plurality of register circuits RG22 in the shift register SR22 transfer an output start signal DST from the previous stage to the next stage using a clock signal DCLK and the inverted signal of the clock signal DCLK. The register circuit RG22 of each stage supplies an inspection data output DTD to the determination circuit 13 at a timing in accordance with the output start signal DST.

Figure 16:
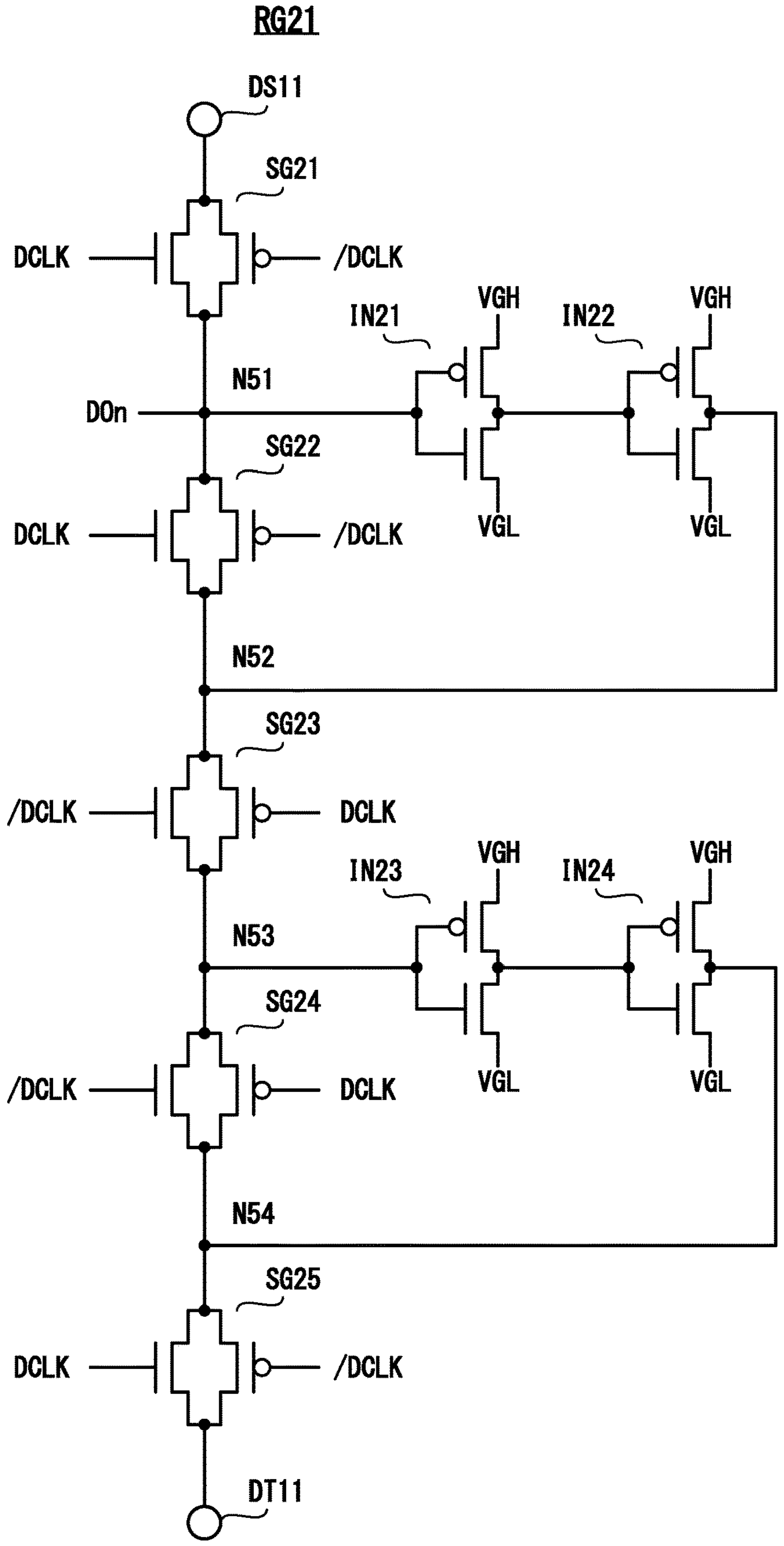
FIG. 16 is a circuit diagram illustrating a CMOS type register circuit.

FIG. 16 is a circuit diagram illustrating a configuration example of the register circuit RG21. The register circuit RG21 constitutes a two-stage latch circuit using transmission gates. The register circuit RG21 includes inverter circuits IN21 to IN24 and transmission gates SG21 to SG25. The inverter circuits IN21 and IN22 and the transmission gates SG21 and SG22 constitute a first stage latch circuit. The inverter circuits IN23 and IN24 and the transmission gates SG23 and SG24 constitute a second stage latch circuit. The clock signal DCLK and the inverted signal thereof supplied to the transmission gates SG23 and SG24 in the second stage latch circuit are in the opposite phase of the clock signal DCLK and the inverted signal thereof supplied to the transmission gates SG21 and SG22 in the first stage latch circuit.

The terminal DS11 is a D input terminal in the register circuit RG21. The terminal DT11 is a Q output terminal in the register circuit RG21. The terminal DS11 is connected to the terminal DT11 in the register circuit RG21 of the previous stage. In the register circuit RG21 of the foremost stage, the terminal DS11 is unused and may be connected to a low level voltage source or a ground terminal. The terminal DT11 is connected to the terminal DS11 in the register circuit RG21 of the subsequent stage. In the register circuit RG21 of the last stage, the terminal DT11 provides an inspection data output DTD.

Figure 17:
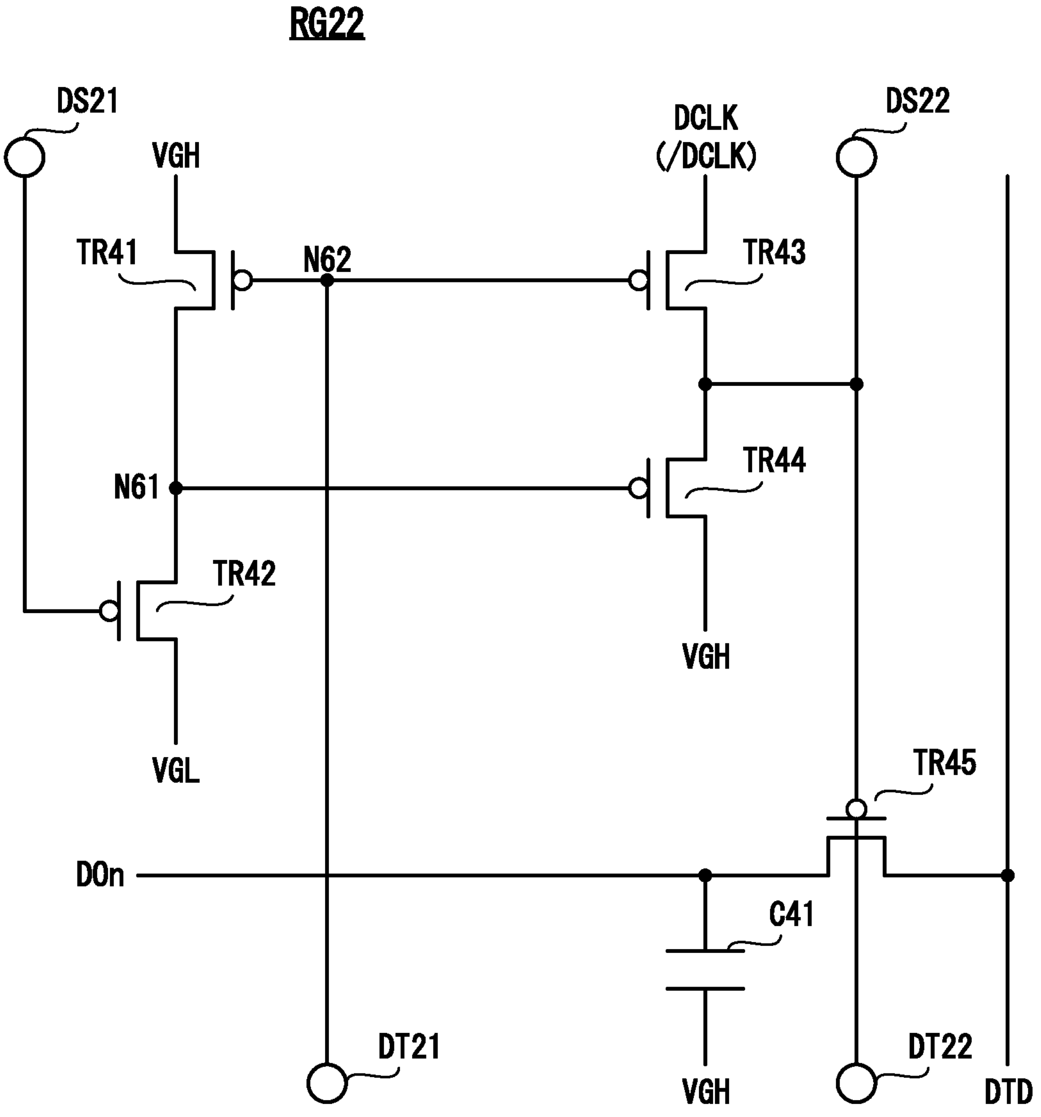
FIG. 17 is a circuit diagram illustrating a PMOS type register circuit.

FIG. 17 is a circuit diagram illustrating a configuration example of a PMOS-type register circuit RG22. The register circuit RG22 in FIG. 17 includes a plurality of PMOS transistors TR41 to TR45 and a holding capacitance C41. The terminal DS21 is connected to the terminal DT22 in the register circuit RG22 of the previous stage. In the register circuit RG22 of the foremost stage, the terminal DS21 is input with an output start signal DST. The terminal DS22 is connected to the terminal DT21 in the register circuit RG22 of the previous stage. In the register circuit RG22 of the foremost stage, the terminal DS22 is unused. The terminal DT21 is connected to the terminal DS22 in the register circuit RG22 of the subsequent stage. In the register circuit RG22 of the last stage, the terminal DT21 is unused. The terminal DT22 is connected to the terminal DS21 in the register circuit RG22 of the subsequent stage. In the register circuit RG22 of the last stage, the terminal DT22 is unused.

Figure 18:
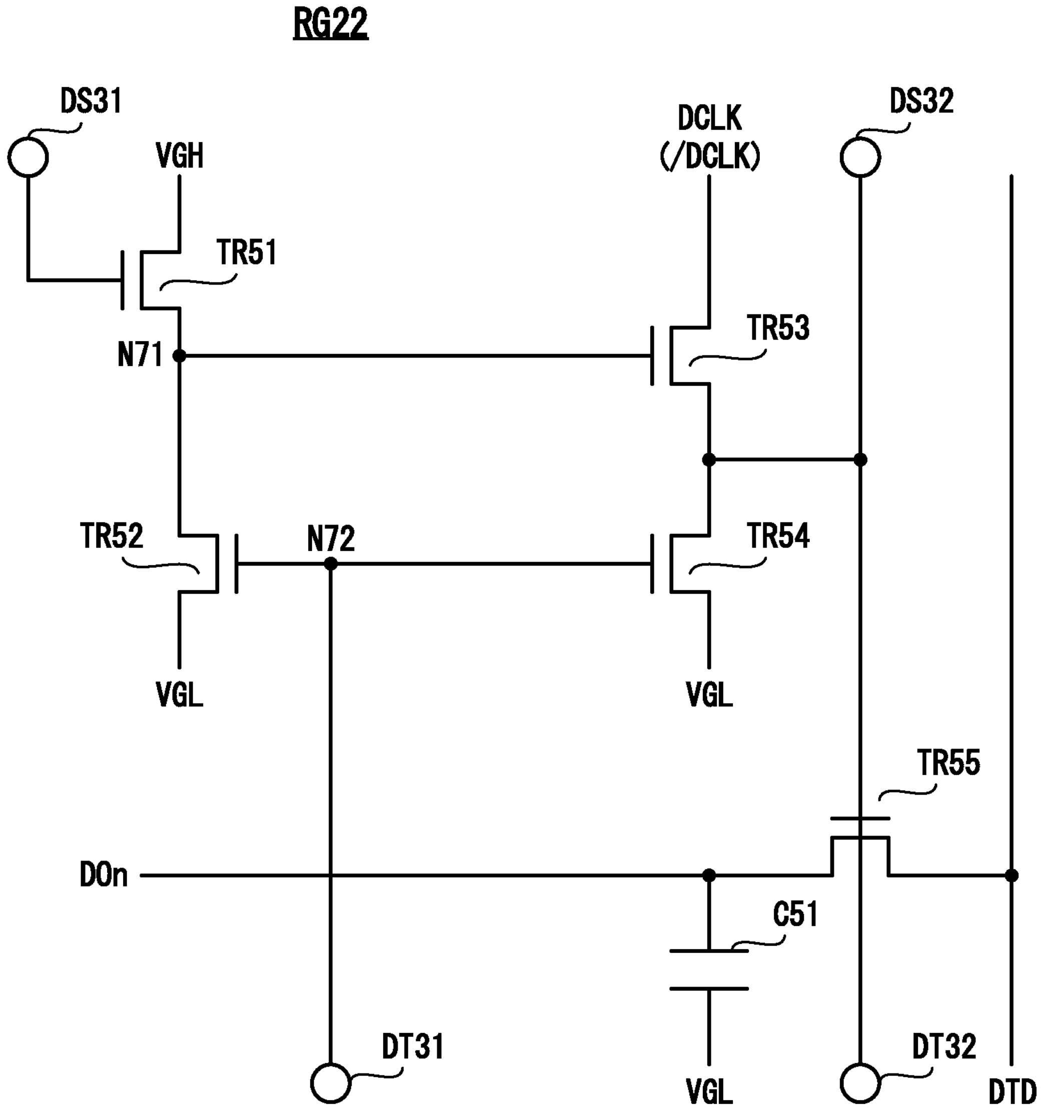
FIG. 18 is a circuit diagram illustrating an NMOS type register circuit.

FIG. 18 is a circuit diagram illustrating a configuration example of an NMOS type register circuit RG22. The register circuit RG22 in FIG. 18 includes a plurality of NMOS transistors TR51 to TR55 and a holding capacitance C51. The terminal DS31 is connected to the terminal DT32 in the register circuit RG22 of the previous stage. In the register circuit RG22 of the foremost stage, the terminal DS31 is input with an output start signal DST. The terminal DS32 is connected to the terminal DT31 in the register circuit RG22 of the previous stage. In the register circuit RG22 of the foremost stage, the terminal DS32 is unused. The terminal DT31 is connected to the terminal DS32 in the register circuit RG22 of the subsequent stage. In the register circuit RG22 of the last stage, the terminal DT31 is unused. The terminal DT32 is connected to the terminal DS31 in the register circuit RG22 of the subsequent stage. In the register circuit RG22 of the last stage, the terminal DT32 is unused.

Inspection of the gate lines GL and the data lines DL is performed when the display device is activated. Further, the inspection of the gate lines GL and the data lines DL is performed during a blanking period of the video display. The blanking period of the video display is arranged after a display period.

Figure 19:
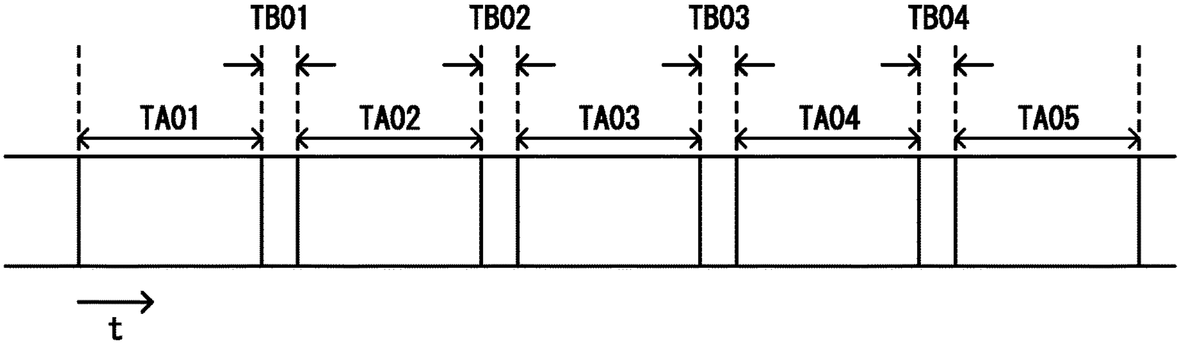
FIG. 19 is a timing chart illustrating display periods and blanking periods.

FIG. 19 is a timing chart illustrating display periods and blanking periods. When the display device displays a video, a plurality of blanking periods is set between a plurality of display periods. The blanking periods TB01 to TB04 in FIG. 19 are set between the display periods TA01 to TA05. Among the first to the fifth examples of inspection described above, the voltage level corresponding to one or a plurality of inspections is acquired in one of the plurality of blanking periods. In the next period of the plurality of blanking periods, inspection data corresponding to the acquired result of voltage level is output.

For example, in the inspection of the first example in FIGS. 2A and 2B, the first step and the second step are performed in the blanking period TB01. The inspection data processing circuit 34 acquires the voltage levels of the plurality of data lines DL during the blanking period TB01. The inspection data processing circuit 34 provides an inspection data output DTD during the blanking period TB02 subsequent to the blanking period TB01.

In the inspection of the second example in FIGS. 3A and 3B and the inspection of the third example in FIGS. 4A and 4B, the first and second steps are performed in the blanking period TB03. The inspection data processing circuit 34 acquires the voltage levels of the plurality of data lines DL during the blanking period TB03. The inspection data processing circuit 35 acquires the voltage levels of the plurality of gate lines GL during the blanking period TB03. The inspection data processing circuit 34 provides an inspection data output DTD during the blanking period TB04 subsequent to the blanking period TB03. The inspection data processing circuit 35 provides an inspection data output GTD during the blanking period TB04 subsequent to the blanking period TB03.

The inspection data output DTD and the inspection data output GTD may be provided over a plurality of display periods. For example, in the first example of inspection in FIGS. 2A and 2B, the first step and the second step are performed in the blanking period TB01. The inspection data processing circuit 34 provides an inspection data output DTD during the display period TA02 following the blanking period TB01. In the second example of inspection in FIGS. 3A and 3B and the third example of inspection in FIGS. 4A and 4B, the first and second steps are performed in the blanking period TB02 subsequent to the blanking period TB01. The inspection data processing circuit 34 provides an inspection data output DTD during the display period TA03 following the blanking period TB02. The inspection data processing circuit 35 provides an inspection data output GTD during the display period TA03 following the blanking period TB02. In the fourth example of inspection in FIGS. 5A and 5B and the fifth example of inspection in FIGS. 6A and 6B, the first and second steps are performed in the blanking period TB03 subsequent to the blanking period TB02. The inspection data processing circuit 34 provides an inspection data output DTD during the display period TA04 following the blanking period TB03. The inspection data processing circuit 35 provides an inspection data output GTD during the display period TA04 following the blanking period TB03.

Figure 20:
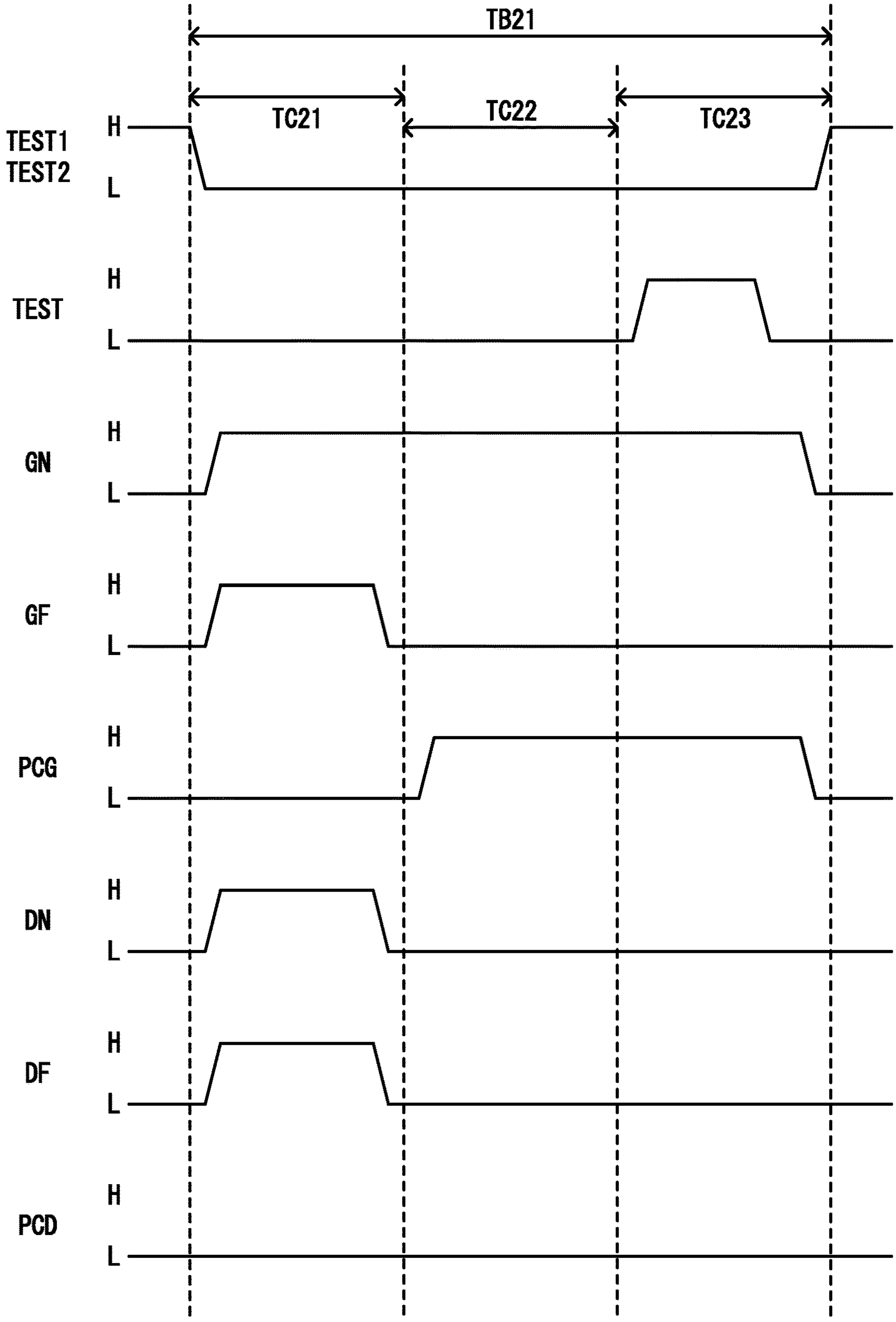
FIG. 20 is a timing chart when a gate line and a data line are inspected for a short circuit.

FIG. 20 is a timing chart when a gate line GL and a data line DL are inspected for a short circuit. The blanking period TB21 in FIG. 20 includes a first period TC21, a second period TC22, and a third period TC23. When the first period TC 21 starts, the switch control signals GN, GF, DN, and DF in FIG. 8 change from a low level to a high level. The inverted signals thereof change from a high level to a low level. The precharge voltages PCG and PCD are set to a low level in the first period TC21. The switch circuits SWG1, SWG2, SWD1, and SWD2 in FIG. 8 are turned on in the first period TC21. The gate line GLn in FIG. 8 is supplied with a low level precharge voltage PCG in the first period TC21. The data line DLn in FIG. 8 is supplied with a low level precharge voltage PCD in the first period TC21. Therefore, in the first period TC21, a low level precharge voltage PCG included in the first voltage is supplied to the gate line GLn from both of the precharge circuits 31A and 31B, and a low level precharge voltage PCD included in the first voltage is supplied to the data line DLn from both of the precharge circuits 32A and 32B. In this way, the voltage levels of the gate line GLn and the data line DLn are initialized. Since the precharge voltage PCG is supplied by the precharge circuits 31A and 31B arranged on both sides of the gate line GLn, the voltage level can be smoothly initialized regardless of the line impedance of the gate line GLn. Since the precharge voltage PCD is supplied by the precharge circuits 32A and 32B arranged on both sides of the data line DLn, the voltage can be smoothly initialized regardless of the line impedance of the data line DLn.

When the first period TC21 in FIG. 20 ends, the switch control signals DN and DF change from a high level to a low level. The inverted signals thereof change from a low level to a high level. When the second period TC22 starts following the first period TC21, the precharge voltage PCG is set to a high level. The switch control signal GN maintains a high level in the second period TC22. The switch circuit SWG1 in FIG. 8 is on in the second period TC22. The switch circuits SWD1 and SWD2 in FIG. 8 are off in the second period TC22. The gate line GLn in FIG. 8 is supplied with a high level precharge voltage PCG in the second period TC22. The data line DLn in FIG. 8 is in a floating state in the second period TC22. Thus, in the second period TC22, a high level precharge voltage PCG is supplied to the gate line GLn from both of the precharge circuits 31A and 31B. Since the precharge voltage PCG is supplied by the precharge circuits 31A and 31B arranged on both sides of the gate line GLn, the second voltage can be smoothly supplied regardless of the line impedance of the gate line GLn.

When the third period TC 23 in FIG. 20 starts, the switch control signal TEST changes from a low level to a high level. The inverted signal thereof changes from a high level to a low level. The switch circuit SWT in FIG. 8 is turned on in the third period TC23. The inspection data processing circuit 34 acquires the voltage level of the data line DLn during the third period TC23. When there is no short circuit between the gate line GLn and the data line DLn, the high level precharge voltage PCG supplied to the gate line GLn does not affect the data line DLn. In this case, the voltage of the data line DLn is at a low level in the third period TC23.

Figure 21:
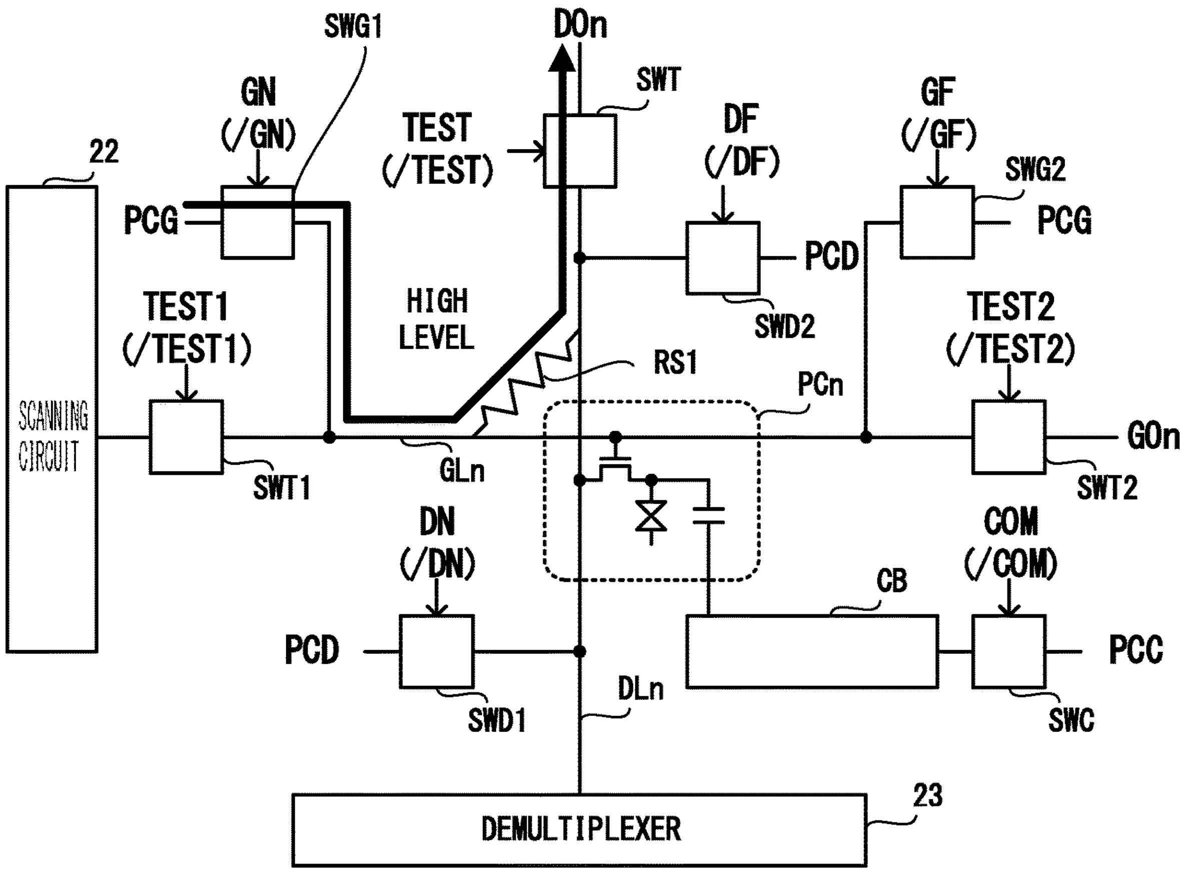
FIG. 21 illustrates an example of a case where a short circuit occurs between a gate line and a data line.

FIG. 21 exemplifies a case where a short circuit has occurred between a gate line GLn and a data line DLn. When there is a short circuit between the gate line GLn and the data line DLn, the high level precharge voltage PCG supplied to the gate line GLn is transmitted to the data line DLn via the short circuit resistance RS1. The short circuit resistance RS1 is the resistance of the short circuit formed between the gate line GLn and the data line DLn. In this case, the voltage of the data line DLn is at a high level in the third period TC23.

Figure 22:
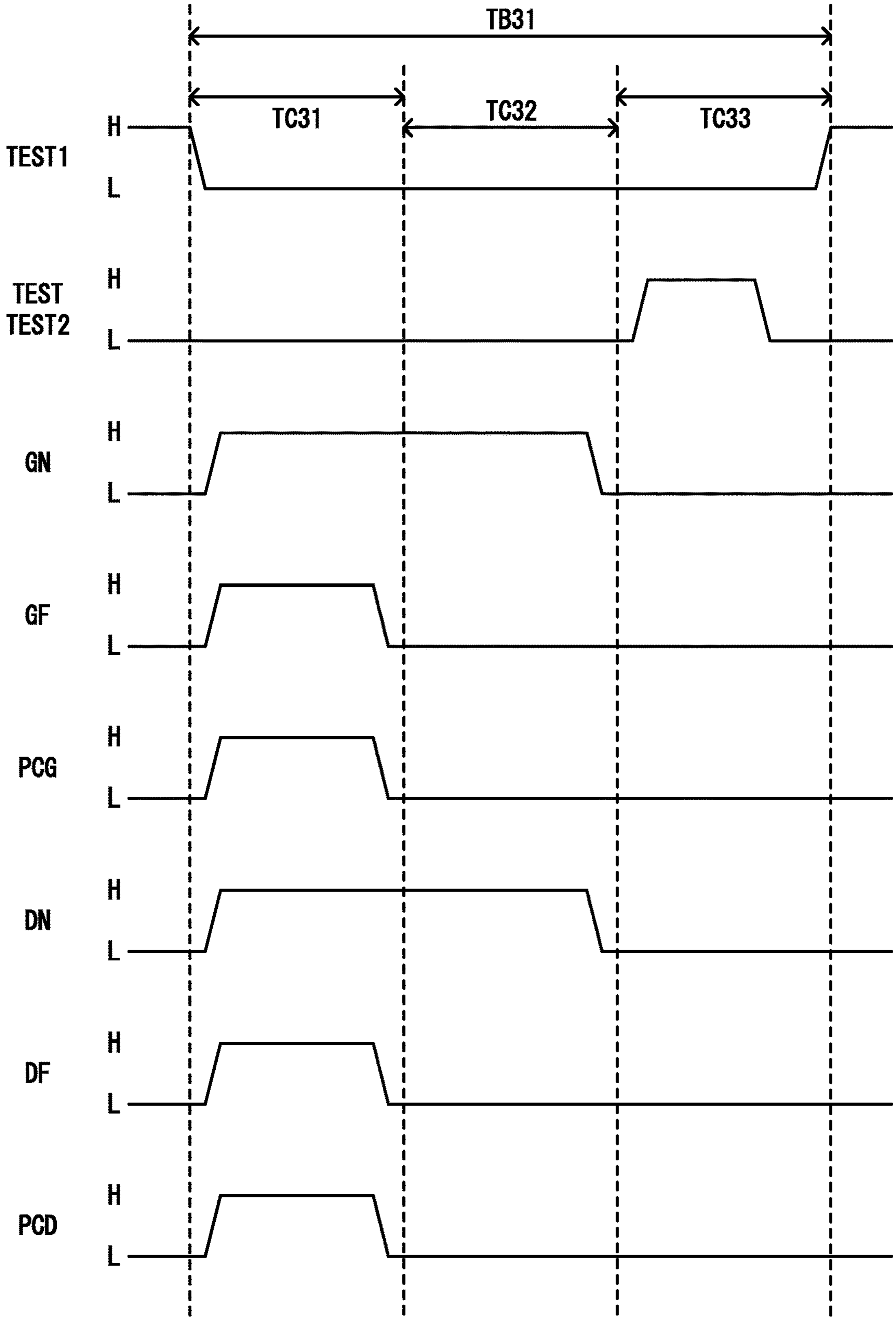
FIG. 22 is a timing chart when a gate line and a data line are inspected for a break.

FIG. 22 is a timing chart when a gate line GL is inspected for a break. In addition, FIG. 22 is also a timing chart when a data line DLn is inspected for a break. The blanking period TB31 in FIG. 22 includes a first period TC31, a second period TC32, and a third period TC33. When the first period TC31 starts, the switch control signals GN and GF in FIG. 8 change from a low level to a high level. The inverted signals thereof change from a high level to a low level. The precharge voltage PCG is set to a high level in the first period TC31. The switch circuits SWG1 and SWG2 in FIG. 8 are turned on during the first period TC31. The gate line GLn in FIG. 8 is supplied with a high level precharge voltage PCG during the first period TC31. Thus, in the first period TC31, a high level precharge voltage PCG is supplied to the gate line GLn from both of the precharge circuits 31A and 31B as the first voltage. In this way, the voltage level of the gate line GLn is initialized. Since the precharge voltage PCG is supplied by the precharge circuits 31A and 31B arranged on both sides of the gate line GLn, the first voltage can be smoothly supplied regardless of the line impedance of the gate line GLn.

When the first period TC31 in FIG. 22 ends, the switch control signal GF changes from a high level to a low level. The inverted signal thereof changes from a low level to a high level. At this time, the precharge voltage PCG is set to a low level. The switch control signal GN maintains a high level in the second period TC32 following the first period TC31. The switch circuit SWG1 in FIG. 8 is on in the second period TC32. The switch circuit SWG2 in FIG. 8 is off in the second period TC32. The gate line GLn in FIG. 8 is supplied with a low level precharge voltage PCG via the switch circuit SWG1 during the second period TC32. Thus, in the second period TC32, a low level precharge voltage PCG is supplied from the precharge circuit 31A to the gate line GLn as the second voltage. In this case, of the precharge circuits 31A and 31B arranged on both sides of the gate line GLn, the precharge circuit 31A arranged on the opposite side of the inspection data processing circuit 35 supplies a precharge voltage PCG to the gate line GLn, while the precharge circuit 31B arranged on the same side as the inspection data processing circuit 35 does not supply a precharge voltage PCG to the gate line GLn. The inspection data processing circuit 35 acquires a low voltage level when there is no break in the gate line GLn, while the inspection data processing circuit 35 acquires a high voltage level when there is a break in the gate line GLn.

When the third period TC33 in FIG. 22 starts, the switch control signal TEST2 changes from a low level to a high level. The inverted signal thereof changes from a high level to a low level. The switch circuit SWT2 in FIG. 8 is turned on in the third period TC33. The inspection data processing circuit 35 acquires the voltage level of the gate line GLn in the third period TC33. When there is no break in the gate line GLn, a low level precharge voltage PCG supplied to the gate line GLn via the switch circuit SWG1 is provided as an output signal GOn.

Figure 23:
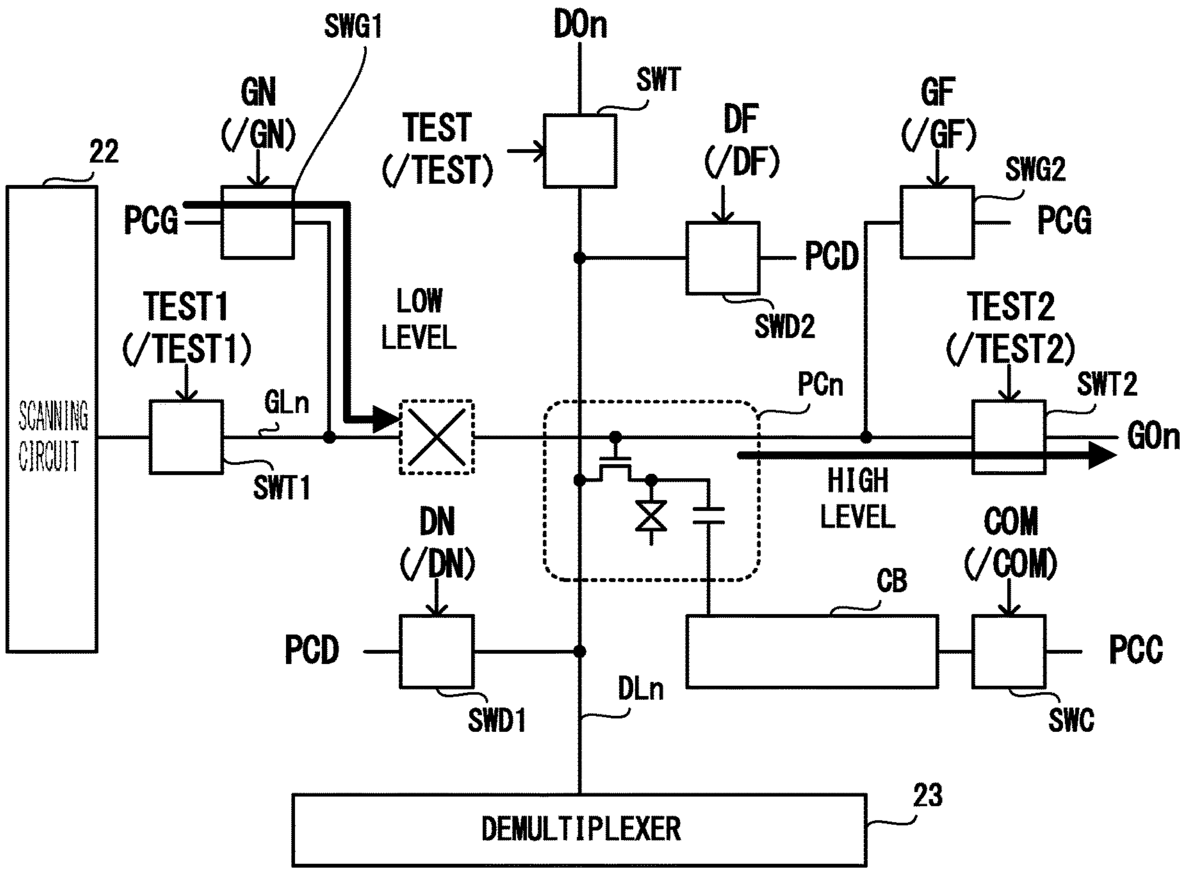
FIG. 23 illustrates an example of a case where there is a break in a gate line.

FIG. 23 exemplifies a case where there is a break in a gate line GLn. When there is a break in the gate line GLn, the low level precharge voltage PCG supplied via the switch circuit SWG1 cannot be provided as an output signal GOn. In this case, the output signal GOn of the gate line GLn is a high level in the third period due to the precharge voltage PCG in the first period TC31.

When the first period TC 31 in FIG. 22 starts, the switch control signals DN and DF in FIG. 8 change from a low level to a high level. The inverted signals thereof change from a high level to a low level. The precharge voltage PCD is set to a high level in the first period TC31. The switch circuits SWD1 and SWD2 in FIG. 8 are turned on in the first period TC31. The data line DLn in FIG. 8 is supplied with a high level precharge voltage PCD in the first period TC31. Thus, in the first period TC31, a high level precharge voltage PCD is supplied to the data line DLn from both of the precharge circuits 32A and 32B as the first voltage. In this way, the voltage level of the data line DLn is initialized. Since the precharge voltage PCD is supplied by the precharge circuits 32A and 32B arranged on both sides of the data line DLn, the first voltage can be smoothly supplied regardless of the line impedance of the data line DLn.

When the first period TC31 in FIG. 22 ends, the switch control signal DF changes from a high level to a low level. The inverted signal thereof changes from a low level to a high level. At this time, the precharge voltage PCD is set to a low level. The switch control signal DN maintains a high level in the second period TC32 following the first period TC31. The switch circuit SWD1 in FIG. 8 is on in the second period TC32. The switch circuit SWD2 in FIG. 8 is off in the second period TC32. The data line DLn in FIG. 8 is supplied with a low level precharge voltage PCD via the switch circuit SWD1 in the second period TC32. Thus, in the second period TC32, a low level precharge voltage PCD is supplied to the data line DLn from the precharge circuit 32A as the second voltage. In this case, of the precharge circuits 32A and 32B arranged on both sides of the data line DLn, the precharge circuit 32A arranged on the opposite side of the inspection data processing circuit 34 supplies a precharge voltage PCD to the data line DLn, while the precharge circuit 32B arranged on the same side as the inspection data processing circuit 34 does not supply a precharge voltage PCD to the data line DLn. The inspection data processing circuit 34 acquires a low voltage level when there is no break in the data line DLn, while the inspection data processing circuit 34 acquires a high voltage level when there is a break in the data line DLn.

When the third period TC 33 in FIG. 22 starts, the switch control signal TEST changes from a low level to a high level. The inverted signal thereof changes from a high level to a low level. The switch circuit SWT in FIG. 8 is turned on in the third period TC33. The inspection data processing circuit 34 acquires the voltage level of the data line DLn in the third period TC33. When there is no break in the data line DLn, a low level precharge voltage PCD supplied to the data line DLn via the switch circuit SWD1 is provided as an output signal DOn. When there is a break in the data line DLn, the low level precharge voltage PCD supplied via the switch circuit SWD1 cannot be provided as an output signal DOn. In this case, the output signal DOn of the data line DLn is at a high level in the third period due to the precharge voltage PCD in the first period TC31.

Figure 24:
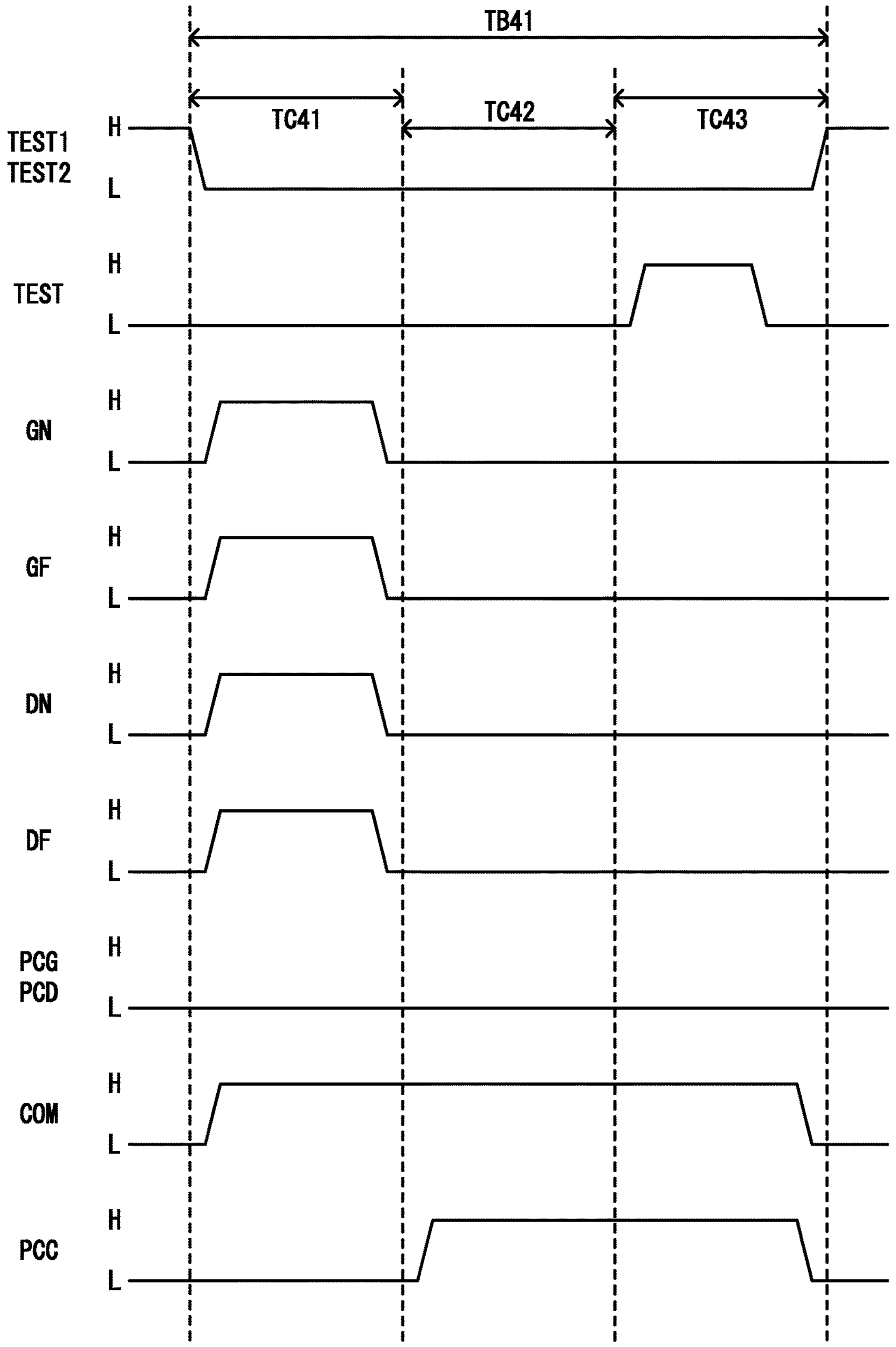
FIG. 24 is a timing chart when a data line or gate line and a common electrode is inspected for a short circuit.

FIG. 24 is a timing chart when a data line DL and a common electrode CB are inspected for a short circuit. In addition, FIG. 24 is also a timing chart when a gate line GL and the common electrode CB are inspected for a short circuit. The blanking period TB41 in FIG. 24 includes a first period TC41, a second period TC42, and a third period TC43. When the first period TC41 starts, the switch control signals DN, DF, and COM in FIG. 8 change from a low level to a high level. The inverted signals thereof change from a high level to a low level. The precharge voltage PCD is set to a low level in the first period TC41. The precharge voltage PCC is set to a low level in the first period TC41. The switch circuits SWD1, SWD2 and SWC in FIG. 8 are turned on in the first period TC41. The data line DLn in FIG. 8 is supplied with a low level precharge voltage PCD in the first period TC41. The common electrode CB in FIG. 8 is supplied with a low level precharge voltage PCC in the first period TC41. Thus, in the first period TC41, a low level precharge voltage PCD included in the first voltage is supplied from the precharge circuits 32A and 32B to the data line DLn, and a low level precharge voltage PCC included in the first voltage is supplied from the common electrode inspection circuit 33 to the common electrode CB. Since the precharge voltage PCD is supplied by the precharge circuits 32A and 32B arranged on both sides of the data line DLn, the voltage level can be smoothly initialized regardless of the line impedance of the data line DLn. Since the common electrode inspection circuit 33 supplies a precharge voltage PCC to the common electrode CB using the plurality of switch circuits SWC11 to SWC1*n* and SWC21 to SWC2*n* in FIG. 10, the voltage level can be smoothly initialized regardless of the line impedance of the common electrode CB.

When the first period TC41 in FIG. 24 ends, the switch control signals DN and DF change from a high level to a low level. The inverted signals thereof change from a low level to a high level. When the second period TC42 starts following the first period TC41, the precharge voltage PCC is set to a high level. The switch control signal COM maintains a high level in the second period TC42. The switch circuit SWC in FIG. 8 is on in the second period TC42. The switch circuits SWD1 and SWD2 in FIG. 8 are off in the second period TC42. The common electrode CB in FIG. 8 is supplied with a high level precharge voltage PCC in the second period TC42. The data line DLn in FIG. 8 is in a floating state in the second period TC42. Thus, in the second period TC42, a high level precharge voltage PCC is supplied to the common electrode CB as the second voltage from the common electrode inspection circuit 33.

When the third period TC 43 in FIG. 24 starts, the switch control signal TEST changes from a low level to a high level. The inverted signal thereof changes from a high level to a low level. The switch circuit SWT in FIG. 8 is turned on in the third period TC43. The inspection data processing circuit 34 acquires the voltage level of the data line DLn in the third period TC43. When there is no short circuit between the data line DLn and the common electrode CB, the high level precharge voltage PCC supplied to the common electrode CB does not affect the data line DLn. In this case, the voltage of the data line DLn is at a low level in the third period TC43.

Figure 25:
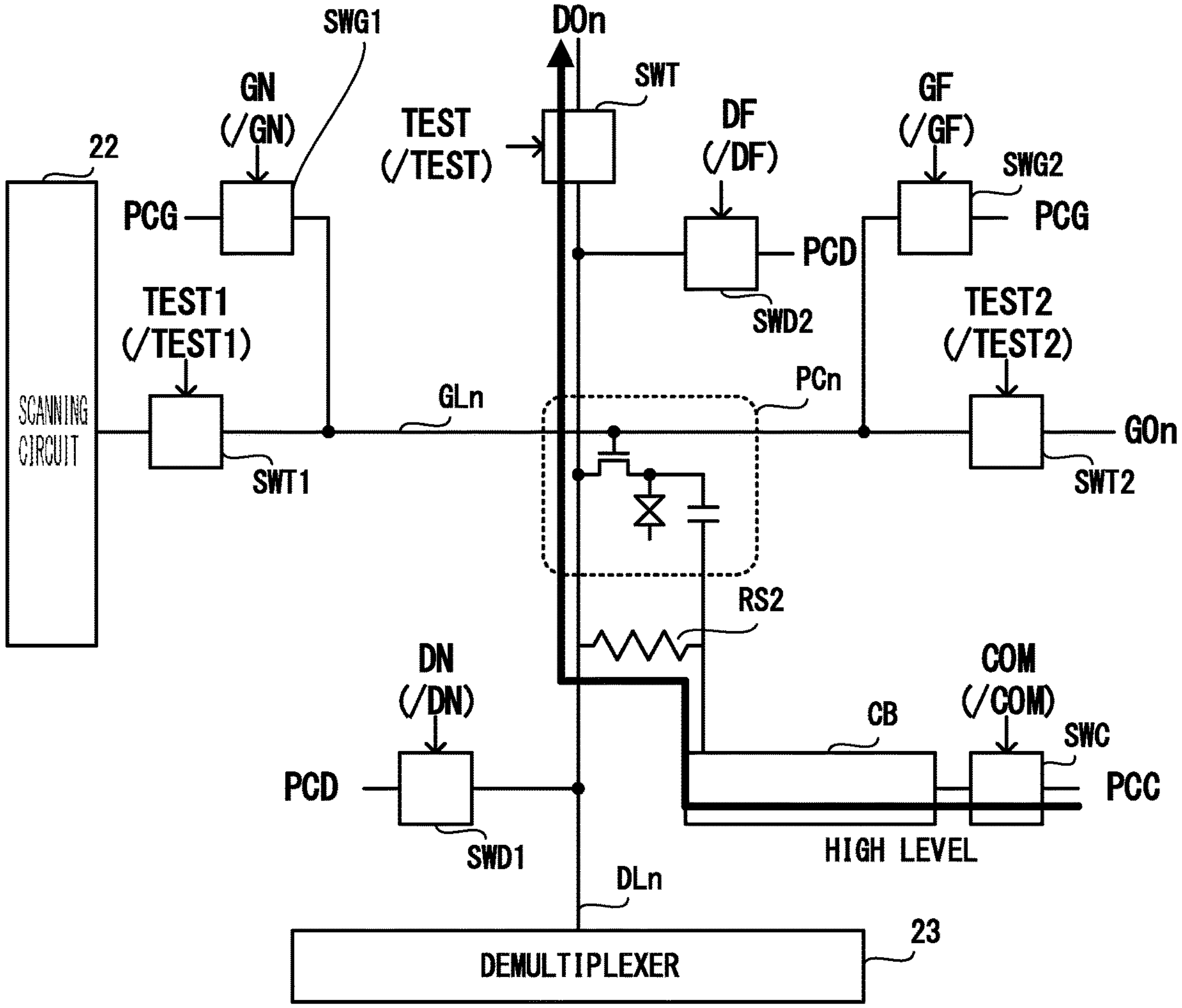
FIG. 25 illustrates an example of a case where a short circuit occurs between a data line and a common electrode.

FIG. 25 exemplifies a case where a short circuit occurs between a data line DLn and a common electrode CB. When there is a short circuit between the data line DLn and the common electrode CB, the high level precharge voltage PCC supplied to the common electrode CB is transmitted to the data line DLn via the short circuit resistance RS2. The short circuit resistance RS2 is the resistance of the short circuit formed between the data line DLn and the common electrode CB. In this case, the voltage of the data line DLn is at a high level in the third period TC43.

When the first period TC41 in FIG. 24 starts, the switch control signals GN, GF, and COM in FIG. 8 change from a low level to a high level. The inverted signals thereof change from a high level to a low level. The precharge voltage PCG is set to a low level in the first period TC41. The precharge voltage PCC is set to a low level in the first period TC41. The switch circuits SWG1, SWG2, and SWC in FIG. 8 are turned on in the first period TC41. The gate line GLn in FIG. 8 is supplied with a low level precharge voltage PCG in the first period TC41. The common electrode CB in FIG. 8 is supplied with a low level precharge voltage PCC in the first period TC41. Thus, in the first period TC41, a low level precharge voltage PCG included in the first voltage is supplied from the precharge circuits 31A and 31B to the gate line GLn, and a low level precharge voltage PCC included in the first voltage is supplied from the common electrode inspection circuit 33 to the common electrode CB. Since the precharge voltage PCG is supplied by the precharge circuits 31A and 31B arranged on both sides of the gate line GLn, the voltage level can be smoothly initialized regardless of the line impedance of the gate line GLn. Since the common electrode inspection circuit 33 supplies the precharge voltage PCC to the common electrode CB using the plurality of switch circuits SWC11 to SWC1*n* and SWC21 to SWC2*n* in FIG. 10, the voltage level can be smoothly initialized regardless of the impedance of the common electrode CB.

When the first period TC41 in FIG. 24 ends, the switch control signals GN and GF change from a high level to a low level. The inverted signals thereof change from a low level to a high level. When the second period TC42 starts following the first period TC41, the precharge voltage PCC is set to a high level. The switch control signal COM maintains a high level in the second period TC42. The switch circuit SWC in FIG. 8 is on in the second period TC42. The switch circuits SWG1 and SWG2 in FIG. 8 are off in the second period TC42. The common electrode CB in FIG. 8 is supplied with a high level precharge voltage PCC in the second period TC42. The gate line GLn in FIG. 8 is in a floating state in the second period TC42. Thus, in the second period TC42, the high level precharge voltage PCC is supplied from the common electrode inspection circuit 33 to the common electrode CB as the second voltage.

When the third period TC43 in FIG. 24 starts, the switch control signal TEST2 changes from a low level to a high level. The inverted signal thereof changes from a high level to a low level. The switch circuit SWT2 in FIG. 8 is turned on in the third period TC43. The inspection data processing circuit 35 acquires the voltage level of the gate line GLn in the third period TC43. When there is no short circuit between the gate line GLn and the common electrode CB, the high level precharge voltage PCC supplied to the common electrode CB does not affect the gate line GLn. In this case, the voltage of the gate line GLn is at a low level in the third period TC43. When there is a short circuit between the gate line GLn and the common electrode CB, the high level precharge voltage PCC supplied to the common electrode CB is transmitted to the gate line GLn via the short circuit resistance. In this case, the voltage of the gate line GLn is at a high level in the third period TC43.

Figure 26:
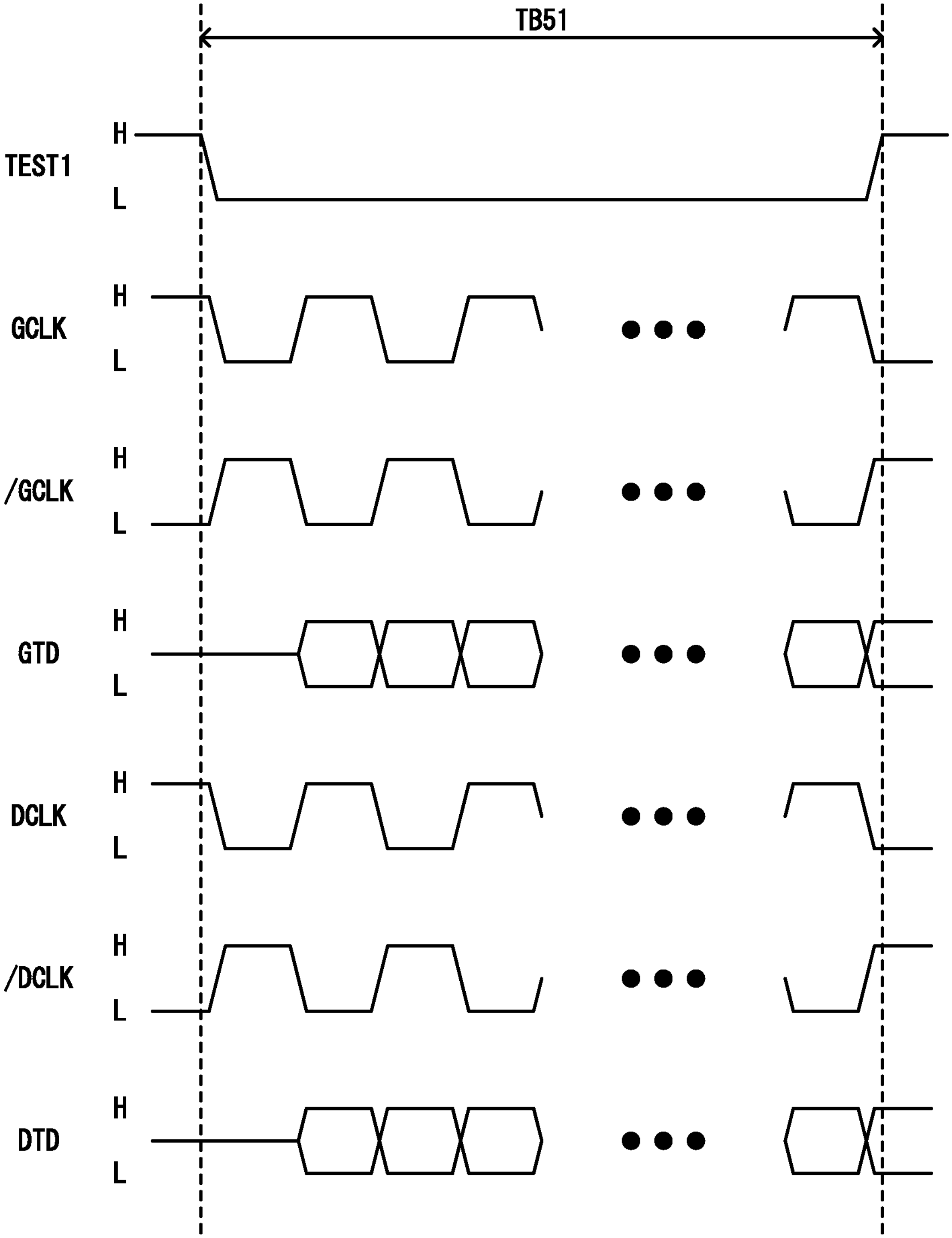
FIG. 26 is a timing chart in an inspection data processing circuit.

FIG. 26 is a timing chart of the inspection data processing circuit 35 including the register circuits RG11 or the inspection data processing circuit 34 including the register circuits RG21. The register circuit RG11 in FIG. 12 constitutes the CMOS type shift register SR11 illustrated in FIG. 11A. The register circuit RG21 in FIG. 16 constitutes the CMOS type shift register SR21 illustrated in FIG. 15A.

When the register circuit RG11 in FIG. 12 receives a signal GOn indicating the voltage level of a gate line GLn, the signal GOn is input to the inverter circuit IN11. The output of the inverter circuit IN11 sets the voltage of a node N11 to a high level voltage VGH or a low level voltage VGL. For example, when the signal GOn is at a low level, the voltage of the node N11 is set to a high level voltage VGH. When the signal GOn is at a high level, the voltage of the node N11 is set to a low level voltage VGL.

When the transmission gate SG12 is on, the voltage of the node N12 is set to be equal to the voltage of the node N11. The voltage of the node N12 is input to the inverter circuit IN12. The output of the inverter circuit IN12 is set to a high level voltage VGH or a low level voltage VGL in accordance with the voltage level of the signal GOn. For example, when the signal GOn is at a low level, the output voltage of the inverter circuit IN12 is set to a low level voltage VGL. When the signal GOn is at a high level, the output voltage of the inverter circuit IN12 is set to a high level voltage VGH. Thus, the first stage latch circuit acquires the voltage level of the gate line GLn indicated by the signal GOn.

Next, when the transmission gate SG12 is turned off, the transmission gates SG13 and SG14 are turned on. When the transmission gate SG13 is on, the voltage of the node N13 is set to be equal to the voltage of the node N12. When the transmission gate SG14 is on, the voltage of the node N14 is set to be equal to the voltage of the node N13. The voltage of the node N14 is input to the inverter circuit IN14. The output voltage of the inverter circuit IN14 is set to a high level voltage VGH or a low level voltage VGL in accordance with the voltage level of the node N14. The output voltage of the inverter circuit IN14 is input to the inverter circuit IN13. The output voltage of the inverter circuit IN13 is set to a high level voltage VGH or a low level voltage VGL in accordance with the output of the inverter circuit IN14. Thus, the output of the first stage latch circuit is acquired by the second stage latch circuit. Then, when the transmission gate SG15 is on, the output voltage of the terminal GT11 is set to be equal to the voltage level of the node N14.

In the register circuit RG11, when the transmission gate SG11 is on, the voltage of the node N11 is set to be equal to the input voltage of the terminal GS11. Since the transmission gate SG12 is also on when the transmission gate SG11 is on, the voltage level of the terminal GS11 is maintained by the latch circuit of the first stage. Thereafter, the output of the first stage latch circuit is acquired by the second stage latch circuit in the same way. When the transmission gate SG15 is on, the output voltage of the terminal GT11 is set to be equal to the voltage level of the node N14. In this way, the plurality of register circuits RG11 included in the shift register SR11 transfers a high level voltage VGH or a low level voltage VGL from the previous stage to the next stage in accordance with the voltage level of the gate line GLn. The register circuit RG11 at the last stage in the shift register SR11 can sequentially supply the inspection data output GTD to the determination circuit 13.

In the register circuit RG21 in FIG. 16, when a signal DOn indicating the voltage level of the data line DLn is acquired, the signal DOn is input to the inverter circuit IN21. The voltage of the node N51 is set to be equal to the voltage level of the signal DOn. The output of inverter circuits IN21 and IN22 sets the voltage of node N52 to a high level voltage VGH or a low level voltage VGL. For example, when the signal DOn is at a low level, the voltage of the node N52 is set to a low level voltage VGL. When the signal DOn is at a high level, the voltage of node N52 is set to a high level voltage VGH. In this way, the voltage of the node N52 corresponds to the voltage of the node N51. Thus, the voltage level of the data line DLn indicated by the signal DOn is acquired by the first stage latch circuit.

Next, when the transmission gates SG23 and SG24 are on, the voltage of the node N53 is set to be equal to the voltage of the node N52. The output of the inverter circuits IN23 and IN24 sets the voltage of the node N54 to a high level voltage VGH or a low level voltage VGL. For example, when the voltage of the node N53 is at a low level, the voltage of the node N54 is set to a low level voltage VGL. When the voltage of the node N53 is at a high level, the voltage of the node N54 is set to a high level voltage VGH. In this way, the voltage of the node N54 corresponds to the voltage of the node N53. Thus, the output of the first stage latch circuit is acquired by the second stage latch circuit. Then, when the transmission gate SG 25 is on, the output voltage of terminal GT11 is set to be equal to the voltage level of the node N54.

In the register circuit RG21, when the transmission gate SG21 is on, the voltage of the node N51 is set to be equal to the input voltage of the terminal DS11. Since the transmission gate SG22 is also on when the transmission gate SG21 is on, the voltage level of the terminal DS11 is maintained by the first stage latch circuit. Thereafter, the output of the first stage latch circuit is acquired by the second stage latch circuit in a similar way. When the transmission gate SG25 is on, the output voltage of the terminal GT11 is set to be equal to the voltage level of the node N54. In this way, the plurality of register circuits RG21 included in the shift register SR21 transmit a high level voltage VGH or a low level voltage VGL from the previous stage to the subsequent stage in accordance with the voltage level of the data line DLn. The register circuit RG21 of the last stage in the shift register SR21 can sequentially supply the inspection data output DTD to the determination circuit 13.

Figure 27:
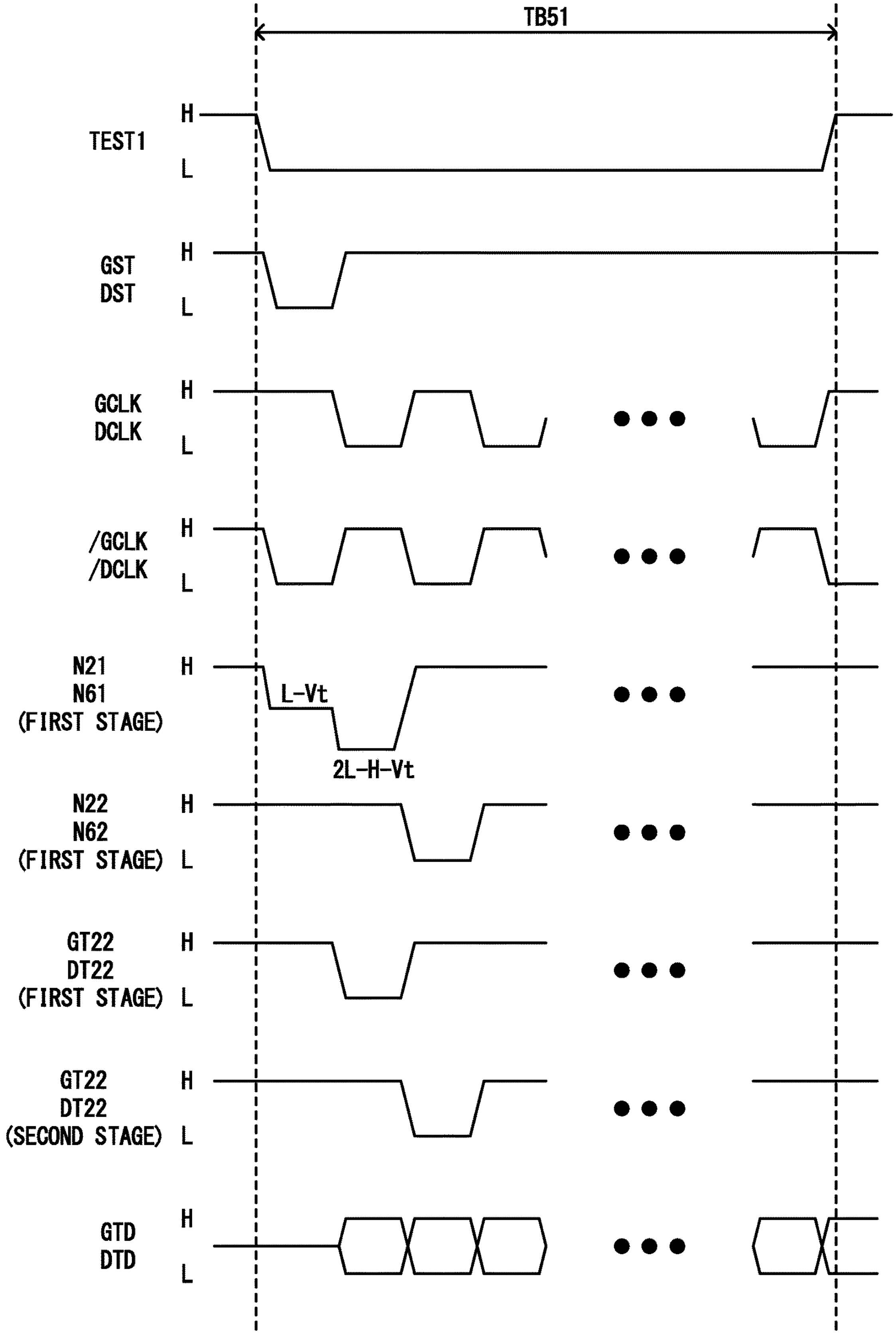
FIG. 27 is a timing chart in the inspection data processing circuit.

FIG. 27 is a timing chart in an inspection data processing circuit 35 including PMOS type register circuits RG12 or an inspection data processing circuit 34 including register circuits RG22. The register circuit RG12 in FIG. 13 constitutes the PMOS type shift register SR12 illustrated in FIG. 11B. The register circuit RG22 in FIG. 17 constitutes the PMOS type shift register SR22 illustrated in FIG. 15B.

When the register circuit RG12 in FIG. 13 acquires a signal GOn indicating the voltage level of the gate line GLn, the register circuit RG12 holds the voltage level by the holding capacitance C21. When the input voltage of the terminal GS21 is at a low level, the voltage at the node N21 is set to a voltage acquired by subtracting the threshold voltage of the PMOS transistor from the low level voltage VGL. In this way, the voltage of the terminal GT22 is set to be equal to a high level clock signal GCLK. Since the PMOS transistor TR21 is off when the voltage of the node N22 is at a high level, the supply of the high level voltage VGH to the node N21 is cut off. When the output voltage of the terminal GT21 is at a high level, the holding capacitance C21 is cut off from the inspection data output GTD. At this time, the inspection data output GTD corresponding to the voltage level of the holding capacitance C21 is not supplied to the determination circuit 13.

Subsequently, when the input voltage of the terminal GS21 changes from a low level to a high level, the clock signal GCLK changes from a high level to a low level. The voltage of the node N21 drops further by a difference acquired by subtracting the low level voltage VGL from the high level voltage VGH due to a bootstrap effect. The low level clock signal GLCK is supplied to the terminal GT22 without a voltage increase. The holding capacitance C21 conducts with the inspection data output GTD. At this time, the inspection data output GTD corresponding to the voltage level of the holding capacitance C21 is supplied to the determination circuit 13.

The terminal GT22 is connected to the terminal GS21 in the register circuit RG12 of the subsequent stage. In the register circuit RG12 of the first stage, the terminal GS21 is input with an output start signal GST. After the output start signal GST has changed from a high level to a low level, when this output start signal GST changes from a low level to a high level, an inspection data output GTD is supplied from the register circuit RG12 of the first stage. The output start signal GST is transferred from the first stage register circuit RG12 to the second stage register circuit RG12. Thereafter, the inspection data output GTD is supplied from the second stage register circuit RG12 in a similar way. In this way, the plurality of register circuits RG12 included in the shift register SR12 can sequentially supply the inspection data output GTD to the determination circuit 13 in response to the output start signal GST transferred from the previous stage to the next stage.

When the register circuit RG22 in FIG. 17 acquires a signal DOn indicating the voltage level of the data line DLn, the register circuit RG22 holds the voltage level by the holding capacitance C41. When the input voltage of the terminal DS21 is at a low level, the voltage of the node N61 is set to a voltage acquired by subtracting the threshold voltage of the PMOS transistor from the low level voltage VGL. In this way, the voltage of the terminal DT22 is set to be equal to the high level clock signal GCLK. Since the PMOS transistor TR41 is off when the voltage of the node N62 is at a high level, the supply of the voltage VGH to the node N61 is cut off. When the output voltage of the terminal DT21 is at a high level, the holding capacitance C41 is cut off from the inspection data output DTD. At this time, the inspection data output DTD corresponding to the voltage level of the holding capacitance C41 is not supplied to the determination circuit 13.

Subsequently, when the input voltage of the terminal DT21 changes from a low level to a high level, the clock signal DCLK changes from a high level to a low level. The voltage of the node N61 drops further by a difference acquired by subtracting the low level voltage from the high level voltage due to the bootstrap effect. The low level clock signal DCLK is supplied to the terminal DT22 without a voltage increase. The holding capacitance C41 conducts with the inspection data output DTD. At this time, the inspection data output DTD corresponding to the voltage level of the holding capacitance C41 is supplied to the determination circuit 13.

The terminal DT22 is connected to the terminal DS21 in the register circuit RG22 of the subsequent stage. In the register circuit RG22 of the first stage, an output start signal DST is input to the terminal DS21. After the output start signal DST has changed from a high level to a low level, when the output start signal DST changes from a low level to a high level, the inspection data output DTD is supplied from the register circuit RG22 of the first stage. The output start signal DST is transferred from the first stage register circuit RG22 to the second stage register circuit RG22. Thereafter, the inspection data output DTD is supplied from the register circuit RG22 of the second stage in a similar manner. Thus, the plurality of register circuits RG22 included in the shift register SR22 can sequentially supply the inspection data output DTD to the determination circuit 13 in response to the output start signal DST transmitted from the previous stage to the next stage.

Figure 28:
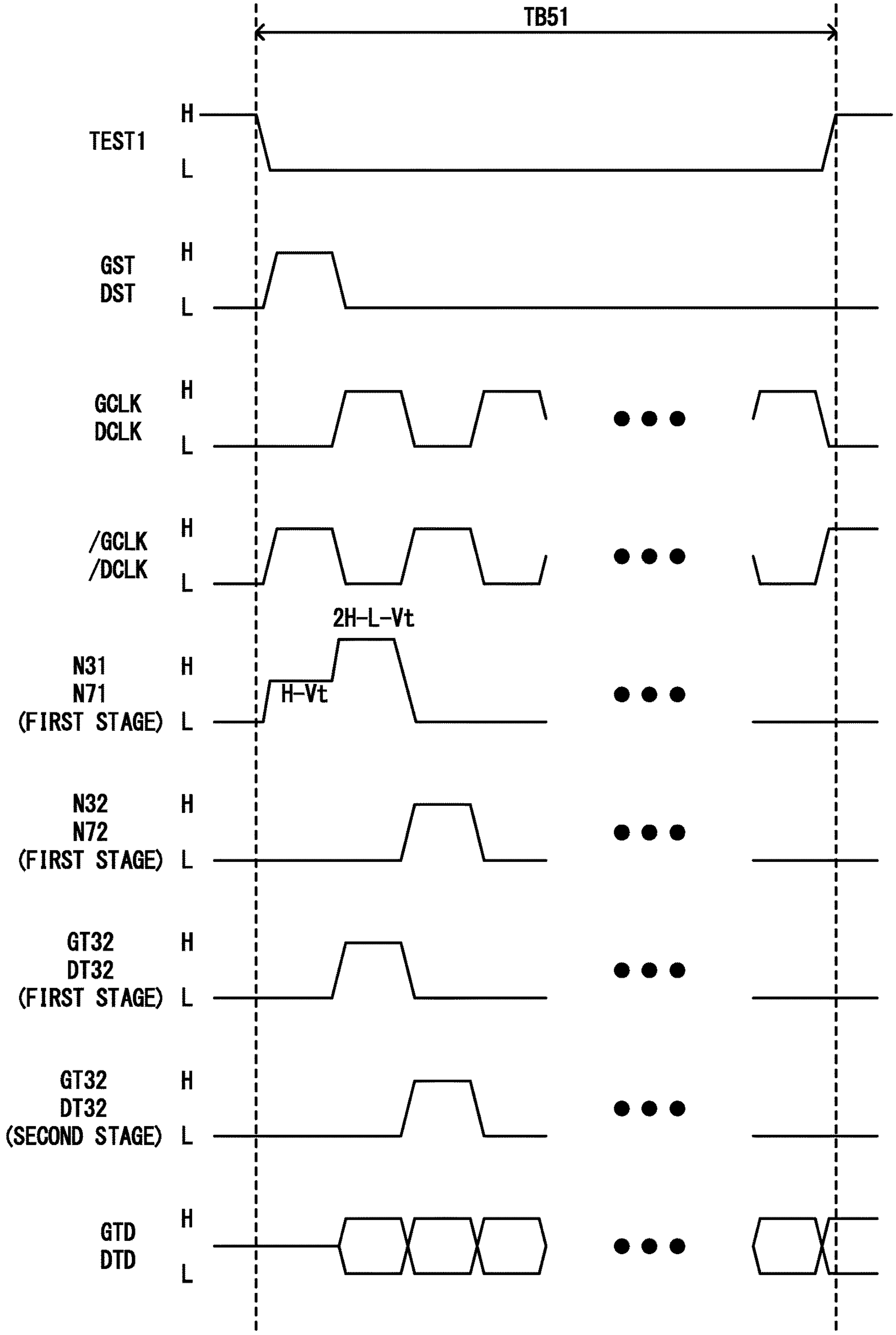
FIG. 28 is a timing chart in the inspection data processing circuit.
Figure 29:
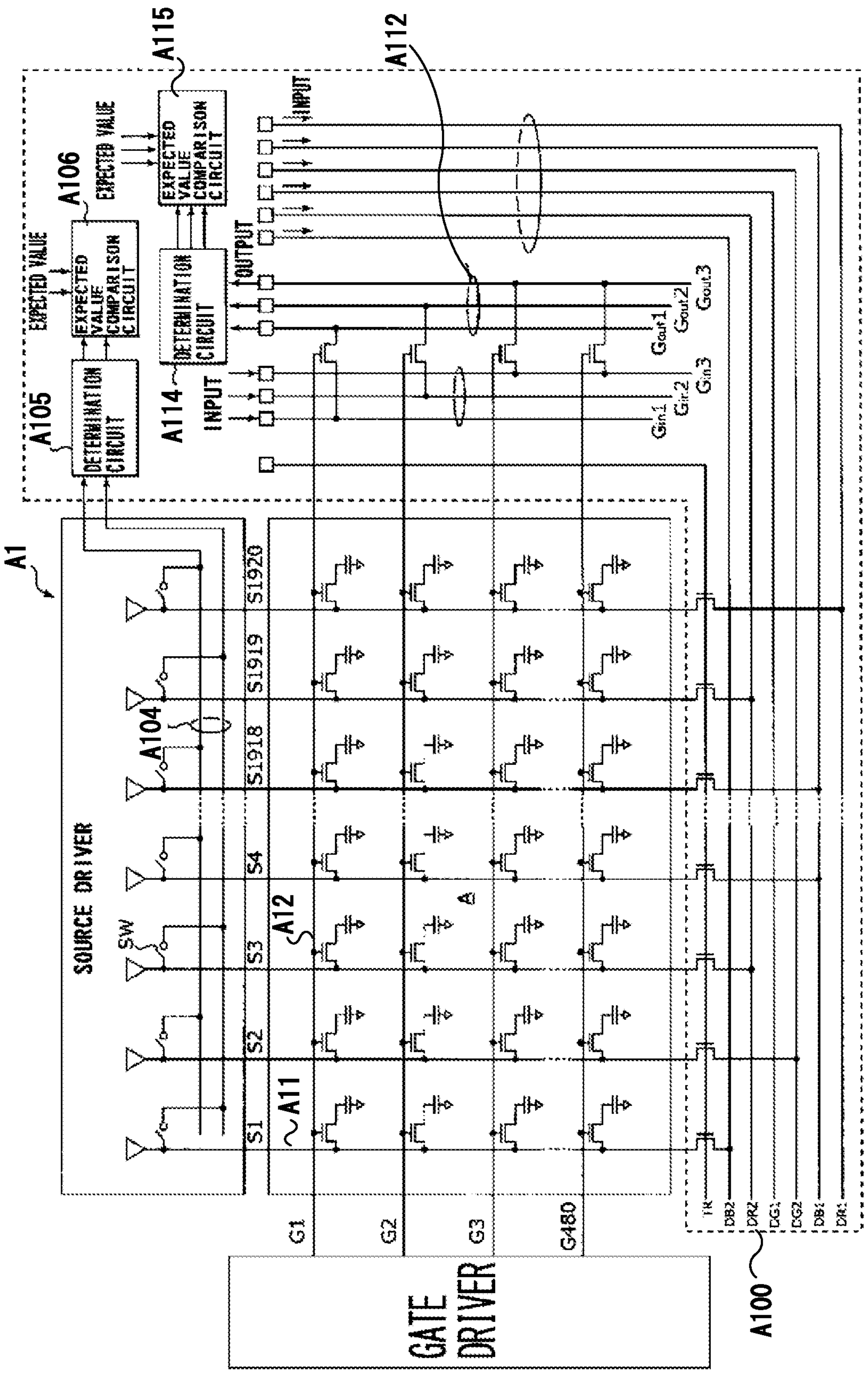
FIG. 29 illustrates a circuit configuration of an active matrix substrate in International Publication No. WO2018/079636.
Figure 30:
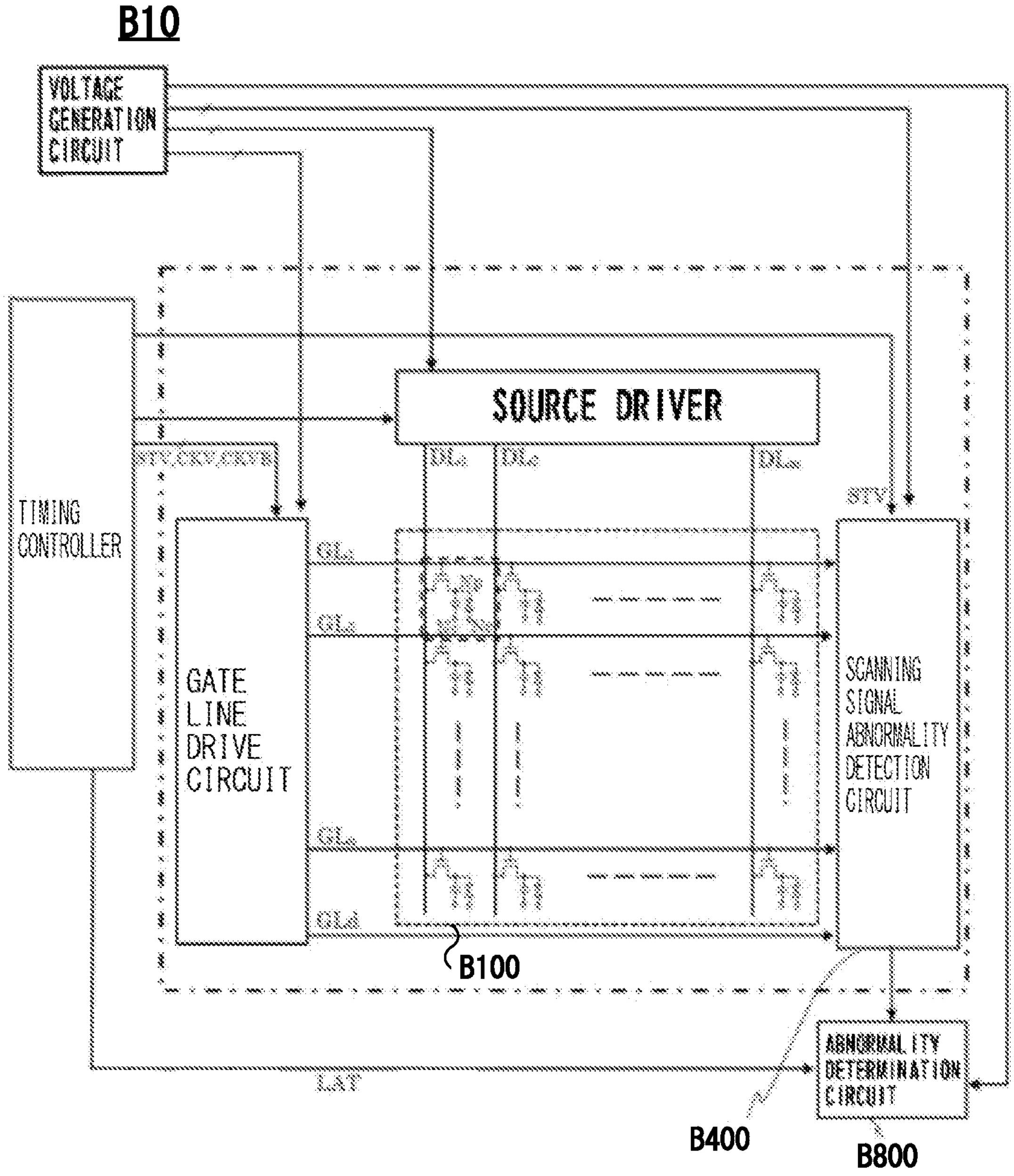
FIG. 30 illustrates a configuration of a liquid crystal display device in Unexamined Japanese Patent Application Publication No. 2019-113710.
Figure 31:
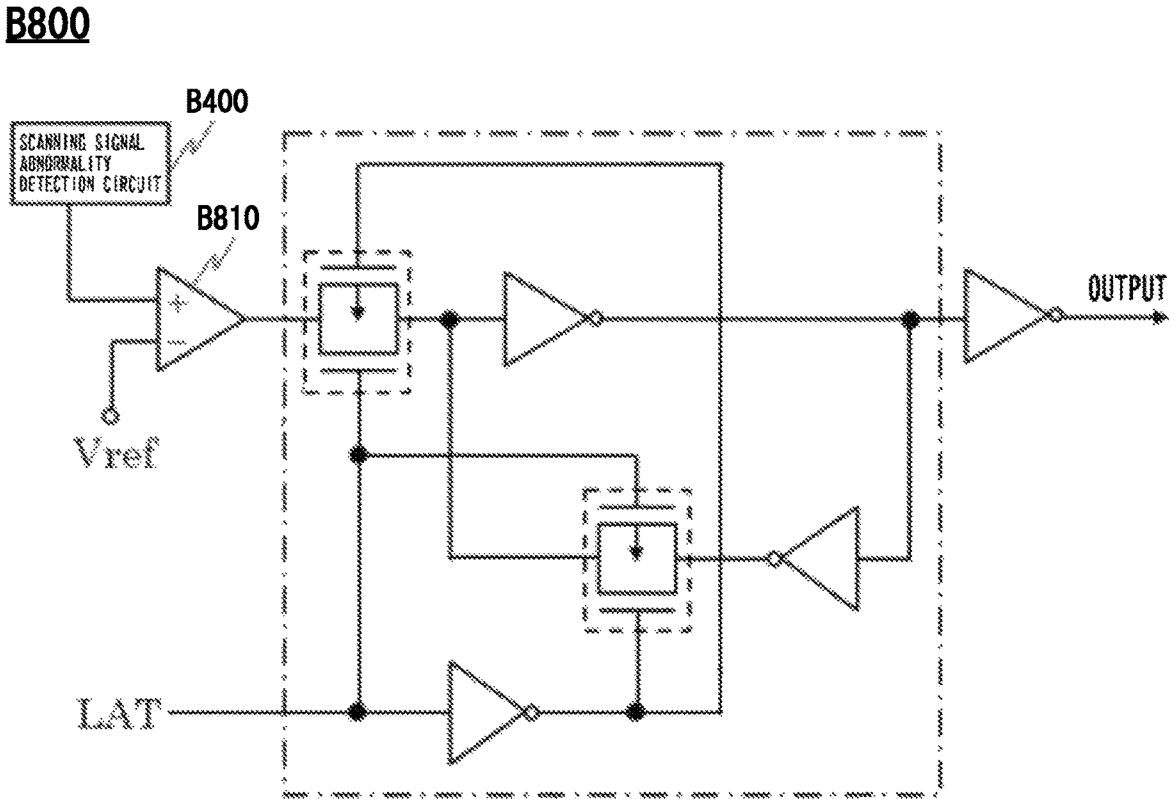
FIG. 31 illustrates a circuit example of an abnormality determination circuit disclosed in Unexamined Japanese Patent Application Publication No. 2019-113710.
Figure 32:
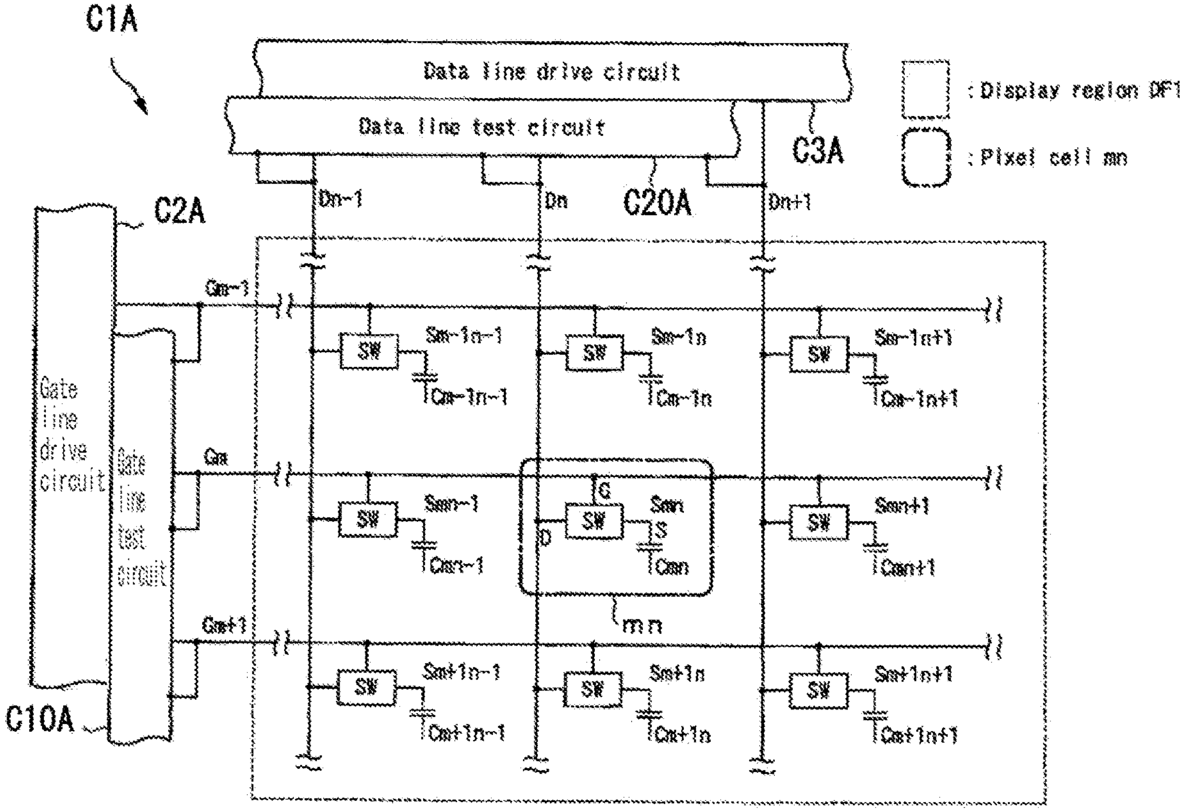
FIG. 32 illustrates a configuration of a liquid crystal display device in U.S. Patent Application Publication No. 2006/0226866.
Figure 33:
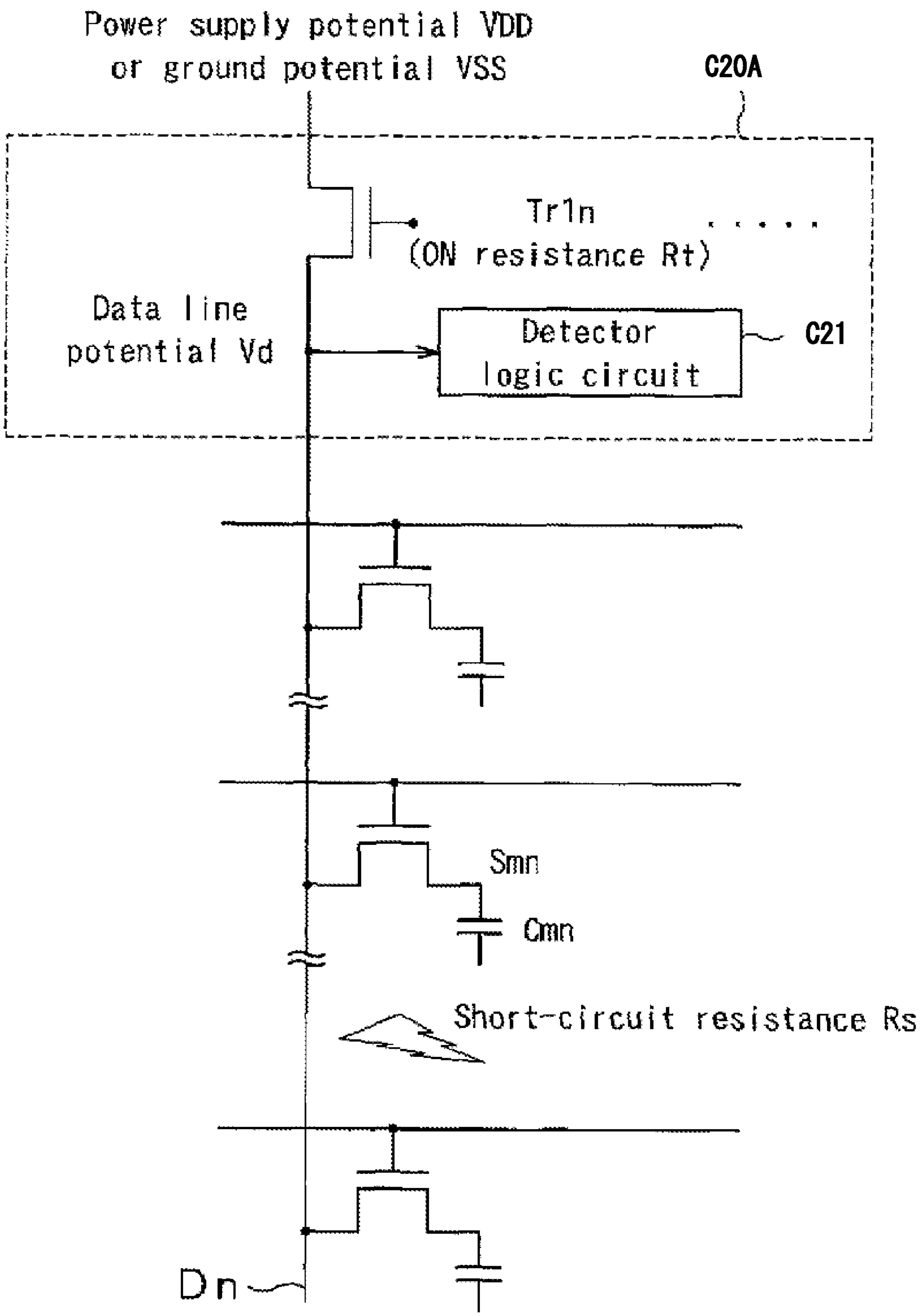
FIG. 33 is a schematic diagram of a data line test circuit in U.S. Patent Application Publication No. 2006/0226866.
Figure 34:
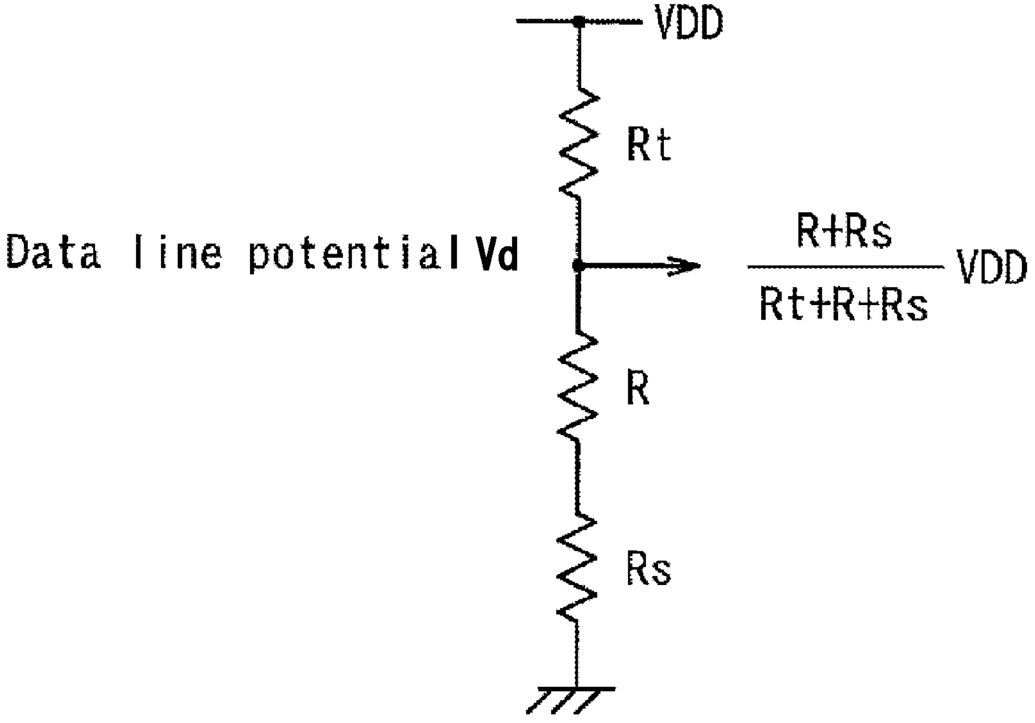
FIG. 34 is a circuit diagram illustrating an equivalent circuit of the data line test circuit in FIG. 33.
Figure 35:
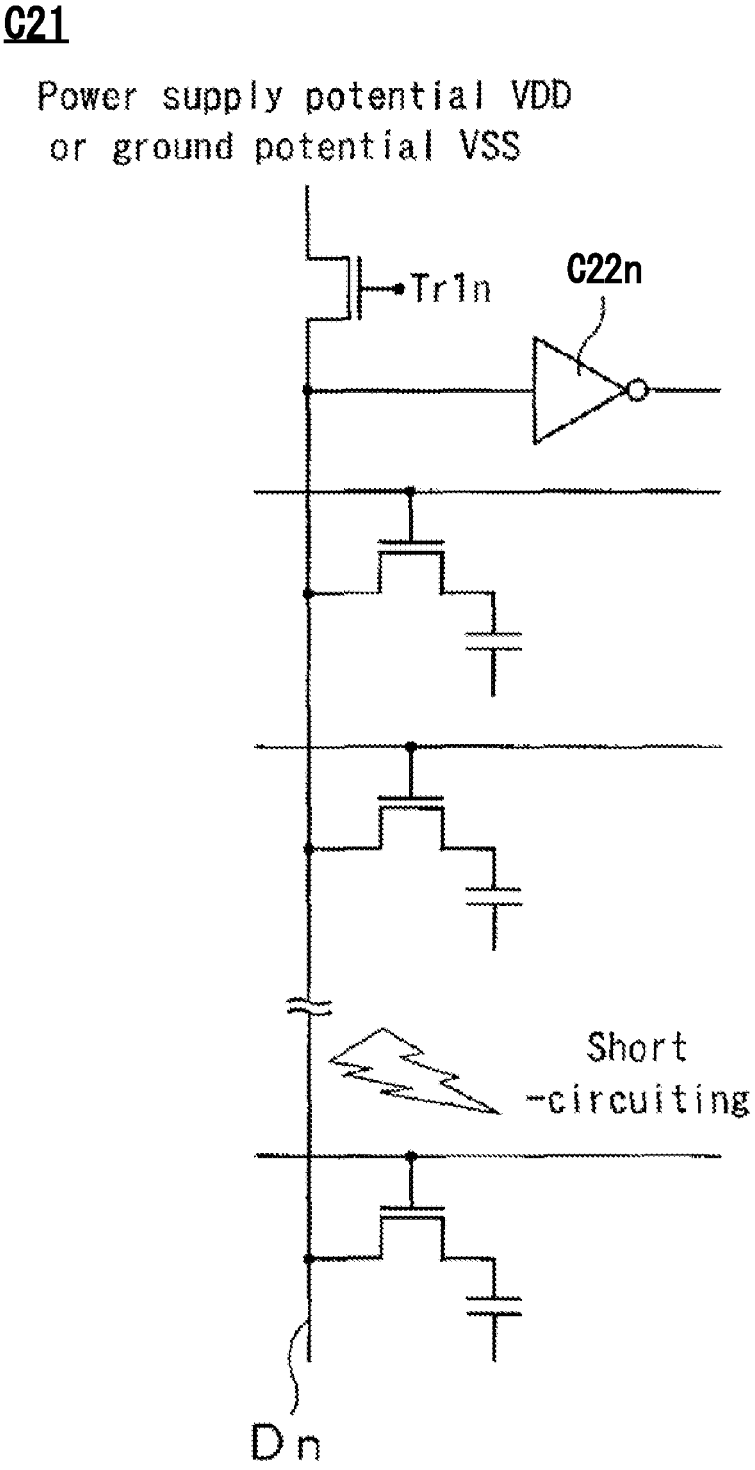
FIG. 35 is a circuit diagram illustrating a detector logic circuit including an inverter circuit.
Figure 36:
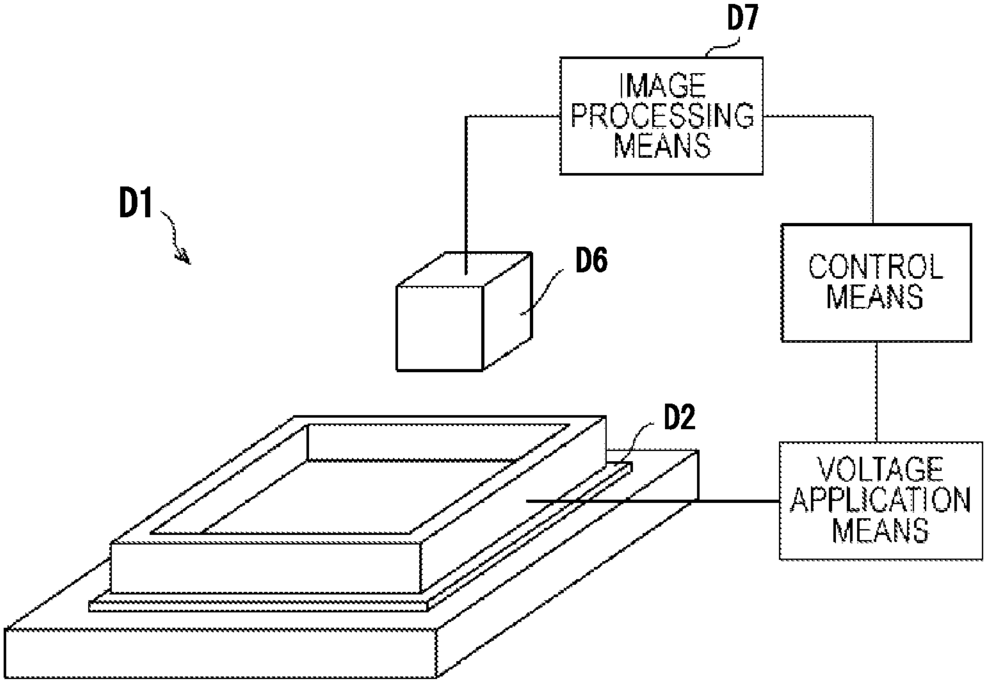
FIG. 36 illustrates a configuration of a wiring inspecting apparatus in U.S. Patent Application Publication No. 2014/0204199.
Figure 37:
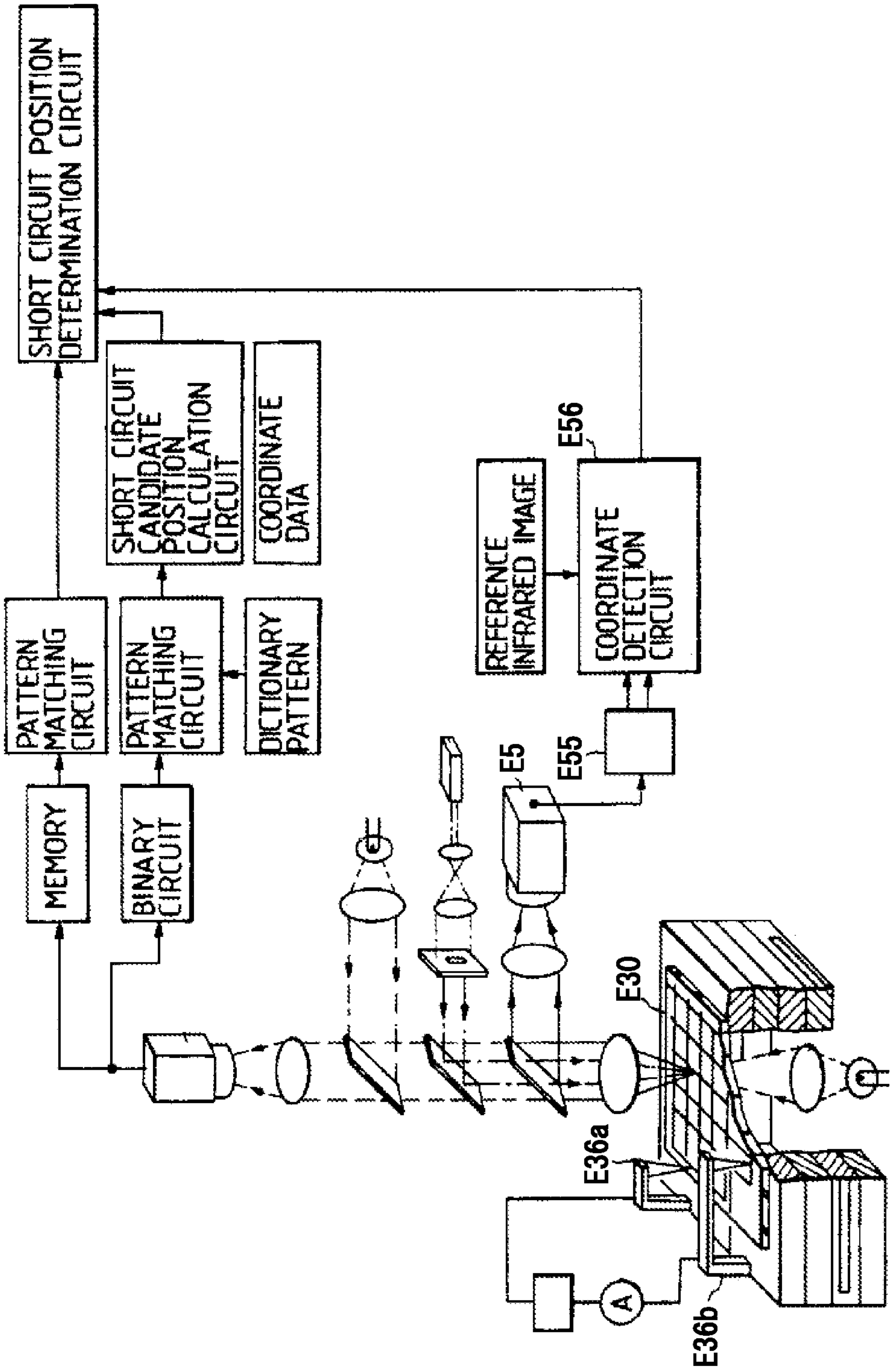
FIG. 37 illustrates a configuration of an inspection apparatus in U.S. Pat. No. 5,309,108.

FIG. 28 is a timing chart in an inspection data processing circuit 35 including NMOS type register circuits RG12 or an inspection data processing circuit 34 including register circuits RG22. The register circuit RG12 in FIG. 14 constitutes an NMOS type shift register SR12 illustrated in FIG. 11B. The register circuit RG22 in FIG. 18 constitutes the NMOS type shift register SR22 illustrated in FIG. 15B.

When the register circuit RG12 in FIG. 14 acquires a signal GOn indicating the voltage level of the gate line GLn, the register circuit RG12 holds the voltage level by the holding capacitance C31. When the input voltage of the terminal GS31 is at a high level, the voltage of the node N31 is set to a voltage acquired by subtracting the threshold voltage of the NMOS transistor from the high level voltage VGH. In this way, the voltage at the terminal GT32 is set to be equal to the low level clock signal GCLK. Since the NMOS transistor TR32 is off when the voltage at node N32 is at a low level, the supply of the low level voltage VGL to the node N31 is cut off. When the output voltage of the terminal GT31 is at a low level, the holding capacitance C31 is cut off from the inspection data output GTD. At this time, the inspection data output GTD corresponding to the voltage level of the holding capacitance C31 is not supplied to the determination circuit 13.

Subsequently, when the input voltage of the terminal GS31 changes from a low level to a high level, the clock signal GCLK changes from a low level to a high level. The voltage of the node N31 further increases by a difference acquired by subtracting the low level voltage VGL from the high level voltage VGH due to a bootstrap effect. The high level clock signal GCLK is supplied to the terminal GT32 without a voltage drop. The holding capacitance C31 conducts with the inspection data output GTD. At this time, the inspection data output GTD corresponding to the voltage level of the holding capacitance C31 is supplied to the determination circuit 13.

The terminal GT32 is connected to the terminal GS31 in the register circuit RG12 of the subsequent stage. In the first stage register circuit RG12, an output start signal GST is input to the terminal GS31. After the output start signal GST has changed from a low level to a high level, when the output start signal GST changes from a high level to a low level, the inspection data output GTD is supplied from the first stage register circuit RG12. The output start signal GST is transferred from the first stage register circuit RG12 to the second stage register circuit RG12. Thereafter, an inspection data output GTD is supplied from the second stage register circuit RG12 in a similar way. In this way, the plurality of register circuits RG12 included in the shift register SR12 can sequentially supply the inspection data output GTD to the determination circuit 13 in response to the output start signal GST transferred from the previous stage to the subsequent stage.

When the register circuit RG22 in FIG. 18 acquires a signal DOn indicating the voltage level of the data line DLn, the register circuit RG22 holds the voltage level by the holding capacitance C51. When the input voltage of the terminal DS31 is at a low level, the voltage of the node N71 is set to a voltage acquired by subtracting the threshold voltage of the NMOS transistor from the high level voltage VGH. In this way, the voltage of the terminal DT32 is set to be equal to the low level clock signal DCLK. Since the NMOS transistor TR52 is off when the voltage of the node N72 is at a low level, the supply of the low level voltage VGL to the node N71 is cut off. When the output voltage of the terminal DT31 is at a low level, the holding capacitance C51 is cut off from the inspection data output DTD. At this time, the inspection data output DTD corresponding to the voltage level of the holding capacitance C51 is not supplied to the determination circuit 13.

Subsequently, when the input voltage of the terminal DS31 changes from a low level to a high level, the clock signal DCLK changes from a low level to a high level. The voltage of the node N71 further increases by a difference acquired by subtracting the low level voltage VGL from the high level voltage VGH due to a bootstrap effect. A high level clock signal DCLK is supplied to the terminal DT32 without a voltage drop. The holding capacitance C51 conducts with the inspection data output DTD. At this time, the inspection data output DTD corresponding to the voltage level of the holding capacitance C51 is supplied to the determination circuit 13.

The terminal DT32 is connected to the terminal DS31 in the register circuit RG22 of the subsequent stage. In the register circuit RG22 of the first stage, the terminal DS31 is input with an output start signal DST. After the output start signal DST has changed from a low level to a high level, when the output start signal DST changes from a high level to a low level, the inspection data output DTD is supplied from the register circuit RG22 of the first stage. The output start signal DST is transferred from the first stage register circuit RG22 to the second stage register circuit RG22. Thereafter, the inspection data output DTD is supplied from the second stage register circuit RG22 in a similar manner. In this way, the plurality of register circuits RG22 included in the shift register RG22 can sequentially supply the inspection data output DTD to the determination circuit 13 in response to the output start signal DST transferred from the previous stage to the next stage.

The determination circuit 13 can detect a wiring abnormality using inspection data outputs GTD and DTD as digital data. Since no comparator as an analog circuit is required, the size of the wiring and circuit can be reduced. The inspection data processing circuits 34 and 35 use shift registers as digital logic circuits, enabling stable inspection along with reduction in the circuit size.

The inspection circuit according to the present disclosure is applicable to any display device having a plurality of wires and electrodes.

The inspection circuit of the display device 100 may be partially or entirely located outside of the substrate 11. The inspection circuit of the display device 101 may be partially or entirely located outside of the substrate 15. For example, some or all of the precharge circuits 31A, 31B, 32A, and 32B, and the inspection data processing circuits 34 and 35 may be externally mounted on the display device 100. Alternatively, some or all of the precharge circuits 31A, 31B, 32A, and 32B and the inspection data processing circuits 34 and 35 may be included in the driver IC 12.

Inspection for a short circuit between the gate line GL and the data line DL can also be conducted by supplying a high level voltage to the data line DL and acquiring the voltage level of the gate line GL that is in a floating state. The gate line GL and the data line DL can also be inspected for a break by supplying a low level voltage from both sides and then supplying a high level voltage from the input end side and acquiring the voltage levels of the gate line GL and the data line DL.

The inspection circuit of the display device according to the invention of the present application supplies a first voltage to one or both of the wiring and the electrode connected to the pixel section in the first period. Further, a second voltage is supplied to one of the wiring and the electrode in the second period following the first period. The occurrence of an abnormality can be detected in accordance with the voltage level of the wiring based on the supply of such a second voltage. In this way, various inspections can be carried out in a stable manner while preventing an increase in the circuit size and inspection cost.

The first voltage in the first period includes an initial voltage for initializing the voltage levels or setting the voltage levels of the plurality of wires to be inspected. The second voltage in the second period is an inspection voltage for differentiating the voltage levels of the plurality of wires to be inspected in accordance with the presence or absence of an abnormality. These initial voltage and inspection voltage are supplied to the plurality of wiring or electrodes to be supplied with the voltages at once for the same period. The voltage levels of the plurality of wires to be inspected are then acquired at once over the same period. The test data corresponding to the acquired result of the voltage levels are output after being converted from parallel data into serial data. In this way, the inspection time can be easily adjusted, and a stable inspection can be conducted with the simple configuration.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. A display device comprising:
a pixel section;
wiring and an electrode that are connected to the pixel section;
an inspection circuit connected to the wiring, and
a determination circuit configured to determine presence or absence of an abnormality based on inspection data output from the inspection circuit, wherein
the wiring includes a plurality of signal lines,
the inspection circuit:
supplies a first voltage to one or both of the wiring and the electrode in a first period, wherein, in a case of supplying the first voltage to the plurality of signal lines included in the wiring, the first voltage is supplied to the plurality of signal lines simultaneously in the first period,
supplies a second voltage to one of the wiring and the electrode in a second period following the first period, wherein, in a case of supplying the second voltage to the plurality of signal lines included in the wiring, the second voltage is supplied to the plurality of signal lines simultaneously in the second period,
acquires, at once over a same period, a voltage level of the plurality of signal lines to be inspected, and
converts the inspection data corresponding to the voltage level of the plurality of signal lines from parallel data into serial data, and outputs to the determination circuit, and
the determination circuit is configured to determine an occurrence of an abnormality by detecting one of a high level voltage or a low level voltage of the wiring based on the supply of the second voltage.

2. The display device according to claim 1, wherein
the wiring includes a plurality of gate lines and a plurality of data lines,
the electrode is a common electrode,
the inspection circuit includes:
a plurality of first voltage supply circuits arranged on both sides of the plurality of gate lines;
a plurality of second voltage supply circuits arranged on both sides of the plurality of data lines;
a first inspection data processing circuit arranged on one side of the plurality of gate lines; and
a second inspection data processing circuit arranged on one side of the plurality of data lines, and
the first inspection data processing circuit and the second inspection data processing circuit are configured using shift registers as digital logic circuits.

3. The display device according to claim 1, wherein
the wiring includes a plurality of gate lines and a plurality of data lines,
the electrode is a common electrode,
the display device further comprises a plurality of scanning circuits arranged on both sides of the plurality of gate lines,
the inspection circuit includes:
a plurality of first voltage supply circuits arranged on both sides of the plurality of gate lines;
a plurality of second voltage supply circuits arranged on both sides of the plurality of data lines;
a plurality of first inspection data processing circuits arranged on both sides of the plurality of gate lines; and
a second inspection data processing circuit arranged on one side of the plurality of data lines, and
the plurality of first inspection data processing circuits and the second inspection data processing circuits are configured using shift registers as digital logic circuits.

4. The display device according to claim 1, wherein
the wiring includes a plurality of gate lines and a plurality of data lines,
the inspection circuit includes:
a plurality of first voltage supply circuits arranged on both sides of the plurality of gate lines;
a plurality of second voltage supply circuits arranged on both sides of the plurality of data lines; and
an inspection data processing circuit arranged on one side of the plurality of data lines,
the plurality of first voltage supply circuits supplies a low level voltage included in the first voltage to the plurality of gate lines,
the plurality of second voltage supply circuits supplies a low level voltage included in the first voltage to the plurality of data lines,
the plurality of first voltage supply circuits supplies a high level voltage to the plurality of gate lines as the second voltage, and
the inspection data processing circuit acquires a voltage level of the plurality of data lines based on the supply of the second voltage and enables the determination circuit to determine an occurrence of an abnormality when the voltage level is at a high level.

5. The display device according to claim 1, wherein
the wiring includes a plurality of gate lines,
the inspection circuit includes:
a plurality of voltage supply circuits arranged on both sides of the plurality of gate lines; and
an inspection data processing circuit arranged on one side of the plurality of gate lines,
the plurality of voltage supply circuits supplies a high level voltage from both sides of the plurality of voltage supply circuits to the plurality of gate lines as the first voltage,
a voltage supply circuit of the plurality of voltage supply circuits that is arranged on an input end side opposite the inspection data processing circuit supplies a low level voltage to the plurality of gate lines as the second voltage with a switch circuit being off, the switching circuit being arranged between the plurality of gate lines and a voltage supply circuit of the plurality of voltage supply circuits that is arranged on an output end side that is a same side as the inspection data processing circuit, and
the inspection data processing circuit acquires a voltage level of the plurality of gate lines in a third period following the second period and enables the determination circuit to determine an occurrence of a break in the plurality of gate lines when the voltage level is at a high level based on the first voltage, despite the supply of the low level voltage as the second voltage.

6. The display device according to claim 1, wherein
the wiring includes a plurality of data lines;
the inspection circuit includes:
a plurality of voltage supply circuits arranged on both sides of the plurality of data lines; and
an inspection data processing circuit arranged on one side of the plurality of data lines,
the plurality of voltage supply circuits supplies a high level voltage from both sides of the plurality of voltage supply circuits to the plurality of data lines as the first voltage,
a voltage supply circuit of the plurality of voltage supply circuits that is arranged on an input end side opposite the inspection data processing circuit supplies a low level voltage to the plurality of data lines as the second voltage with a switch circuit being off, the switching circuit being arranged between the plurality of data lines and a voltage supply circuit of the plurality of voltage supply circuits that is arranged on an output end side that is a same side as the inspection data processing circuit, and
the inspection data processing circuit acquires a voltage level of the plurality of data lines in a third period following the second period and enables the determination circuit to determine an occurrence of a break in the plurality of data lines when the voltage level is at a high level based on the first voltage, despite the supply of the low level voltage as the second voltage.

7. The display device according to claim 1, wherein
the wiring includes a plurality of data lines,
the electrode is a common electrode,
the inspection circuit includes:
a plurality of first voltage supply circuits arranged on both sides of the plurality of data lines;
a plurality of second voltage supply circuits connected to the common electrode; and
an inspection data processing circuit arranged on one side of the plurality of data lines,
the plurality of first voltage supply circuits supplies a low level voltage included in the first voltage to the plurality of data lines,
the plurality of second voltage supply circuits supplies a low level voltage included in the first voltage to the common electrode, the plurality of second voltage supply circuits supplies a high level voltage to the common electrode as the second voltage, and the inspection data processing circuit acquires a voltage level of the plurality of data lines based on the supply of the second voltage and enables the determination circuit to determine an occurrence of an abnormality when the voltage level is at a high level.

8. The display device according to claim 1, wherein the wiring includes a plurality of gate lines, the electrode is a common electrode, the inspection circuit includes:

a plurality of first voltage supply circuits arranged on both sides of the plurality of gate lines;

a plurality of second voltage supply circuits connected to the common electrode; and an inspection data processing circuit arranged on one side of the plurality of gate lines, the plurality of first voltage supply circuits supplies a low level voltage included in the first voltage to the plurality of gate lines, the plurality of second voltage supply circuits supplies a low level voltage included in the first voltage to the common electrode, the plurality of second voltage supply circuits supplies a high level voltage to the common electrode as the second voltage, and the inspection data processing circuit acquires a voltage level of the plurality of gate lines based on the supply of the second voltage and enables the determination circuit to determine an occurrence of an abnormality when the voltage level is at a high level.

9. The display device according to claim 1, wherein the wiring includes a plurality of gate lines and a plurality of data lines, the electrode is a common electrode, the inspection circuit includes:

a first inspection data processing circuit that acquires a voltage level of the plurality of gate lines; and a second inspection data processing circuit that acquires a voltage level of the plurality of data lines, and the inspection circuit acquires, by one or both of the first inspection data processing circuit and the second inspection data processing circuit, a voltage level of one or both of the plurality of gate lines and the plurality of data lines in a first blanking period between a plurality of display periods, and outputs inspection data corresponding to the voltage level acquired by one or both of the first inspection data processing circuit and the second inspection data processing circuit in a second blanking period after the first blanking period between the plurality of display periods.

10. The display device according to claim 1, wherein the wiring includes a plurality of gate lines and a plurality of data lines, the electrode is a common electrode, the inspection circuit includes:

a first inspection data processing circuit that acquires a voltage level of the plurality of gate lines; and a second inspection data processing circuit that acquires a voltage level of the plurality of data lines, and the inspection circuit acquires, by one or both of the first inspection data processing circuit and the second inspection data processing circuit, a voltage level of one or both of the plurality of gate lines and the plurality of data lines during a blanking period between a plurality of display periods, and outputs inspection data corresponding to the voltage level acquired by one or both of the first inspection data processing circuit and the second inspection data processing circuit during a display period following the blanking period among the plurality of display periods.

11. The display device according to claim 1, wherein the inspection circuit is mounted on a same substrate as the pixel section.

12. The display device according to claim 11, wherein the inspection circuit includes a type of switch circuit selected from a CMOS transmission gate, a PMOS transistor and an NMOS transistor depending to a thin film transistor formed on the same substrate.

13. A method for inspecting a display device, the method comprising:

supplying, by an inspection circuit for wiring including a plurality of signal lines and an electrode that are connected to a pixel section of the display device, a first voltage to one or both of the wiring and the electrode in a first period, wherein, in a case of supplying the first voltage to the plurality of signal lines included in the wiring, the first voltage is supplied to the plurality of signal lines simultaneously in the first period;

supplying, by the inspection circuit, a second voltage to one of the wiring and the electrode in a second period following the first period wherein, in a case of supplying the second voltage to the plurality of signal lines included in the wiring, the second voltage is supplied to the plurality of signal lines simultaneously in the second period;

acquiring, by the inspection circuit, at once over a same period, a voltage level of the plurality of signal lines to be inspected;

by the inspection circuit, converting the inspection data corresponding to the voltage level of the plurality of signal lines from parallel data into serial data, and outputting to the determination circuit; and determining, by the determination circuit, an occurrence of an abnormality by detecting one of a high level voltage or a low level voltage of the wiring based on the supply of the second voltage.

14. The method according to claim 13, further comprising:

supplying, by a plurality of first voltage supply circuits arranged on both sides of a plurality of gate lines included in the wiring, a low level voltage included in the first voltage to the plurality of gate lines;

supplying, by a plurality of second voltage supply circuits arranged on both sides of a plurality of data lines included in the wiring, a low level voltage included in the first voltage to the plurality of data lines;

supplying, by the plurality of first voltage supply circuits, a high level voltage to the plurality of gate lines as the second voltage; and acquiring, by an inspection data processing circuit arranged on one side of the plurality of data lines, a voltage level of the plurality of data lines based on the supply of the second voltage, and enabling the determination circuit to determine an occurrence of an abnormality when the voltage level is at a high level.

15. The method according to claim 13, further comprising:

supplying, by a plurality of voltage supply circuits arranged on both sides of a plurality of gate lines included in the wiring, a high level voltage included in the first voltage to the plurality of gate lines;

supplying, by a voltage supply circuit of the plurality of voltage supply circuits that is arranged on an input end side opposite an inspection data processing circuit arranged on one side of the plurality of gate lines, a low level voltage to the plurality of gate lines as the second voltage; and acquiring, by the inspection data processing circuit, a voltage level of the plurality of gate lines based on the supply of the second voltage and enabling the determination circuit to determine an occurrence of an abnormality when the voltage level is at a high level.

16. The method according to claim 13, further comprising:

supplying, by a plurality of voltage supply circuits arranged on both sides of a plurality of data lines included in the wiring, a high level voltage to the plurality of data lines as the first voltage;

supplying, by a voltage supply circuit of the plurality of voltage supply circuits that is arranged on an input end side opposite an inspection data processing circuit arranged on one side of the plurality of data lines, a low level voltage to the plurality of data lines as the second voltage; and acquiring, by the inspection data processing circuit, a voltage level of the plurality of data lines based on the supply of the second voltage and enabling the determination circuit to determine an occurrence of an abnormality when the voltage level is at a high level.

17. The method according to claim 13, further comprising:

supplying, by a plurality of first voltage supply circuits arranged on both sides of a plurality of data lines included in the wiring, a low level voltage included in the first voltage to the plurality of data lines;

supplying, by a plurality of second voltage supply circuits connected to a common electrode as the electrode, a low level voltage included in the first voltage to the common electrode;

supplying, by the plurality of second voltage supply circuits, a high level voltage to the common electrode as the second voltage; and acquiring, by an inspection data processing circuit arranged on one side of the plurality of data lines, a voltage level of the plurality of data lines based on the supply of the second voltage, and enabling the determination circuit to determine an occurrence of an abnormality when the voltage level is at a high level.

18. The method according to claim 13, further comprising:

supplying, by a plurality of first voltage supply circuits arranged on both sides of a plurality of gate lines included in the wiring, a low level voltage included in the first voltage to the plurality of gate lines;

supplying, by a plurality of second voltage supply circuits connected to a common electrode as the electrode, a low level voltage included in the first voltage to the common electrode;

supplying, by the plurality of second voltage supply circuits, a high level voltage to the common electrode as the second voltage; and acquiring, by an inspection data processing circuit arranged on one side of the plurality of gate lines, a voltage level of the plurality of gate lines based on the supply of the second voltage and enabling the determination circuit to determine an occurrence of an abnormality when the voltage level is at a high level.

19. The method according to claim 13, further comprising:

acquiring, as the voltage level of the wiring, a voltage level of one or both of a plurality of gate lines and a plurality of data lines included in the wiring in a first blanking period between a plurality of display periods; and outputting inspection data corresponding to the voltage level of the wiring in a second blanking period after the first blanking period between the plurality of display periods.

20. The method according to claim 13, further comprising:

acquiring, as the voltage level of the wiring, a voltage level of one or both of a plurality of gate lines and a plurality of data lines included in the wiring during a blanking period between a plurality of display periods, and outputting inspection data corresponding to the voltage level of the wiring during a display period following the blanking period among the plurality of display periods.

* * * * *